United States Patent
Horne et al.

(10) Patent No.: US 8,785,023 B2
(45) Date of Patent: Jul. 22, 2014

(54) CASCADE REDOX FLOW BATTERY SYSTEMS

(75) Inventors: Craig R. Horne, Sunnyvale, CA (US); Kim Kinoshita, Cupertino, CA (US); Darren B. Hickey, Santa Clara, CA (US); Jay E. Sha, Mountain View, CA (US); Deepak Bose, Fremont, CA (US)

(73) Assignee: Enervault Corparation, Sunnyvale, CA (US)

( * ) Notice: Subject to any disclaimer, the term of this patent is extended or adjusted under 35 U.S.C. 154(b) by 452 days.

(21) Appl. No.: 12/986,892

(22) Filed: Jan. 7, 2011

(65) Prior Publication Data

US 2011/0223450 A1 Sep. 15, 2011

Related U.S. Application Data

(60) Continuation-in-part of application No. 12/883,511, filed on Sep. 16, 2010, which is a division of application No. 12/498,103, filed on Jul. 6, 2009, now Pat. No. 7,820,321.

(60) Provisional application No. 61/078,691, filed on Jul. 7, 2008, provisional application No. 61/093,017, filed on Aug. 29, 2008.

(51) Int. Cl.
| | |
|---|---|
| H01M 4/36 | (2006.01) |
| H01M 8/00 | (2006.01) |
| H01M 6/18 | (2006.01) |
| B60L 11/18 | (2006.01) |
| H01M 8/20 | (2006.01) |
| H01M 2/40 | (2006.01) |

(52) U.S. Cl.
CPC ............. *H01M 8/20* (2013.01); *B60L 2230/22* (2013.01); *H01M 6/188* (2013.01); *H01M 2/40* (2013.01); *B60L 2230/30* (2013.01); *Y02T 10/7005* (2013.01); *Y02T 10/705* (2013.01); *Y02T 10/7088* (2013.01); *Y02E 60/528* (2013.01); *B60L 2230/24* (2013.01); *B60L 2230/28* (2013.01); *B60L 11/1824* (2013.01); *B60L 11/1879* (2013.01); *Y02T 10/7241* (2013.01); *Y02T 90/127* (2013.01); *B60L 2210/40* (2013.01); *Y02T 90/12* (2013.01); *Y02T 90/14* (2013.01)
USPC ............................. 429/105; 429/101; 429/120

(58) Field of Classification Search
None
See application file for complete search history.

(56) References Cited

U.S. PATENT DOCUMENTS

| | | | |
|---|---|---|---|
| 2,946,836 A | 7/1960 | Justi et al. | |
| 3,540,934 A | 11/1970 | Boeke | 136/86 |
| 3,934,624 A | 1/1976 | Eberle | 141/100 |
| 3,996,064 A | 12/1976 | Thaller | 320/2 |
| 3,999,581 A | 12/1976 | Eberle | 141/1 |
| 4,010,780 A | 3/1977 | Eberle | 141/168 |
| 4,018,971 A | 4/1977 | Sheibley et al. | 429/105 |
| 4,062,807 A | 12/1977 | Suzuki | 252/443 |
| 4,071,660 A | 1/1978 | Hart | 429/15 |
| 4,117,204 A | 9/1978 | Zito, Jr. | 429/19 |
| 4,133,941 A | 1/1979 | Sheibley | 429/33 |
| 4,147,843 A | 4/1979 | Hakkinen | 429/109 |
| 4,159,366 A | 6/1979 | Thaller | 429/15 |
| 4,162,351 A | 7/1979 | Putt et al. | 429/15 |
| 4,192,910 A | 3/1980 | Giner et al. | 429/101 |
| 4,200,684 A | 4/1980 | Bro | 429/51 |
| 4,203,065 A * | 5/1980 | Whitford | 320/137 |
| 4,264,686 A | 4/1981 | Frank | 429/44 |
| 4,270,984 A | 6/1981 | Giner et al. | 204/2.1 |
| 4,307,159 A | 12/1981 | Hammond et al. | 429/105 |
| 4,309,372 A | 1/1982 | Sheibley | 264/45.3 |
| 4,362,791 A | 12/1982 | Kaneko et al. | 429/101 |
| 4,370,392 A | 1/1983 | Savinell et al. | 429/15 |
| 4,377,623 A | 3/1983 | Parker et al. | 429/15 |
| 4,382,116 A | 5/1983 | Gahn et al. | 429/34 |
| 4,399,200 A | 8/1983 | Galloway | 429/23 |
| 4,407,902 A | 10/1983 | Kummer et al. | 429/15 |
| 4,414,090 A | 11/1983 | D'Agostino et al. | 204/252 |
| 4,454,649 A | 6/1984 | Jalan et al. | 29/623.5 |
| 4,468,441 A | 8/1984 | D'Agostino et al. | 429/105 |
| 4,469,760 A | 9/1984 | Giner et al. | 429/21 |
| 4,485,154 A | 11/1984 | Remick et al. | 429/14 |
| 4,492,741 A | 1/1985 | Struthers | 429/34 |

| Patent No. | Date | Inventor | Class |
|---|---|---|---|
| 4,496,637 A | 1/1985 | Shimada et al. | 429/44 |
| 4,543,302 A | 9/1985 | Gahn et al. | 429/15 |
| 4,576,878 A | 3/1986 | Gahn | 429/15 |
| 4,578,323 A | 3/1986 | Hertl et al. | 429/15 |
| 4,615,108 A | 10/1986 | Tomazic | 29/623.2 |
| 4,650,732 A | 3/1987 | Weber | 429/120 |
| 4,652,501 A | 3/1987 | Bennetto et al. | 429/2 |
| 4,711,828 A | 12/1987 | Ishida et al. | 429/12 |
| 4,714,663 A | 12/1987 | Arnold, Jr. et al. | 429/101 |
| 4,784,924 A | 11/1988 | Savinell et al. | 429/15 |
| 4,786,567 A | 11/1988 | Skyllas-Kazacos et al. | 429/19 |
| 4,797,566 A | 1/1989 | Nozaki et al. | 307/43 |
| 4,814,241 A | 3/1989 | Nagashima et al. | 429/199 |
| 4,874,483 A | 10/1989 | Wakabayashi et al. | 204/94 |
| 4,882,241 A | 11/1989 | Heinzel | 429/19 |
| 4,945,019 A | 7/1990 | Bowen et al. | 429/72 |
| 4,956,244 A | 9/1990 | Shimizu et al. | 429/17 |
| 5,061,578 A | 10/1991 | Kozuma et al. | 429/3 |
| 5,135,820 A | 8/1992 | Jones | 429/49 |
| 5,162,168 A | 11/1992 | Downing et al. | 429/51 |
| 5,188,911 A | 2/1993 | Downing et al. | 429/70 |
| 5,250,158 A | 10/1993 | Kaneko et al. | 204/86 |
| 5,258,241 A | 11/1993 | Ledjeff et al. | 429/42 |
| 5,308,718 A | 5/1994 | Eidler et al. | 429/152 |
| 5,316,643 A | 5/1994 | Ahn et al. | 204/265 |
| 5,318,865 A | 6/1994 | Kaneko et al. | 429/193 |
| 5,366,824 A | 11/1994 | Nozaki et al. | 429/34 |
| 5,368,762 A | 11/1994 | Sato et al. | 252/62.2 |
| 5,391,973 A | 2/1995 | Tomazic | 320/21 |
| 5,436,087 A | 7/1995 | Tomazic | 429/50 |
| 5,445,905 A | 8/1995 | Marsh et al. | 429/105 |
| 5,459,390 A | 10/1995 | Tomazic | 320/30 |
| 5,587,132 A | 12/1996 | Nakajima et al. | 423/62 |
| 5,601,943 A | 2/1997 | Eidler et al. | 429/163 |
| 5,605,771 A | 2/1997 | Eidler et al. | 429/72 |
| 5,607,788 A | 3/1997 | Tomazic | 429/72 |
| 5,610,802 A | 3/1997 | Eidler et al. | 361/831 |
| 5,612,148 A | 3/1997 | Zito | 429/15 |
| 5,626,986 A | 5/1997 | Jahns et al. | 429/210 |
| 5,650,239 A | 7/1997 | Lex et al. | 429/49 |
| 5,656,390 A | 8/1997 | Kageyama et al. | 429/44 |
| 5,665,212 A | 9/1997 | Zhong et al. | 304/297 R |
| 5,702,842 A | 12/1997 | Tomazic | 429/105 |
| 5,716,733 A | 2/1998 | Tomazic | 429/130 |
| 5,759,711 A | 6/1998 | Miyabayashi et al. | 429/15 |
| 5,798,180 A | 8/1998 | Chowdhury et al. | 428/411.1 |
| 5,804,329 A | 9/1998 | Amendola | 429/34 |
| 5,851,694 A | 12/1998 | Miyabayashi et al. | 429/105 |
| 5,910,366 A | 6/1999 | Chowdhury et al. | 428/379 |
| 6,005,183 A | 12/1999 | Akai et al. | 136/244 |
| 6,040,075 A | 3/2000 | Adcock et al. | 429/32 |
| 6,086,643 A | 7/2000 | Clark et al. | 29/623.2 |
| 6,096,179 A | 8/2000 | Fajt et al. | 204/294 |
| 6,143,443 A | 11/2000 | Kazacos et al. | 429/204 |
| 6,242,125 B1 | 6/2001 | Eidler et al. | 429/51 |
| 6,261,714 B1 | 7/2001 | Eidler et al. | 429/70 |
| 6,455,187 B1 | 9/2002 | Tomazic | 429/72 |
| 6,461,772 B1 | 10/2002 | Miyake et al. | 429/247 |
| 6,468,688 B2 | 10/2002 | Kazacos et al. | 429/101 |
| 6,475,661 B1 | 11/2002 | Pellegri et al. | 429/105 |
| 6,497,973 B1 | 12/2002 | Amendola | 429/19 |
| 6,509,119 B1 | 1/2003 | Kobayashi et al. | 429/231.8 |
| 6,555,267 B1 | 4/2003 | Broman et al. | 429/210 |
| 6,558,833 B2 | 5/2003 | McCoy | 429/70 |
| 6,562,514 B1 | 5/2003 | Kazacos et al. | 429/204 |
| 6,613,298 B2 | 9/2003 | Tanaka et al. | 423/62 |
| 6,624,383 B1 | 9/2003 | Lichtenstein et al. | 219/121.69 |
| 6,652,819 B2 | 11/2003 | Shiroto et al. | 423/62 |
| 6,692,862 B1 | 2/2004 | Zocchi | 429/50 |
| 6,711,036 B2 | 3/2004 | Winter | 363/65 |
| 6,759,158 B2 | 7/2004 | Tomazic | 429/61 |
| 6,761,945 B1 | 7/2004 | Adachi et al. | 428/346.1 |
| 6,764,663 B2 | 7/2004 | Monaghan et al. | 423/62 |
| 6,764,789 B1 | 7/2004 | Sekiguchi et al. | 429/105 |
| 6,812,171 B2 | 11/2004 | Shimazaki et al. | 442/337 |
| 6,864,012 B2 | 3/2005 | Tomazic | 429/72 |
| 6,872,376 B2 | 3/2005 | Tanaka et al. | 423/544 |
| 6,905,797 B2 | 6/2005 | Broman et al. | 429/235 |
| 6,986,966 B2 | 1/2006 | Clarke et al. | 429/210 |
| 7,046,531 B2 | 5/2006 | Zocchi et al. | 363/65 |
| 7,060,738 B2 | 6/2006 | Jing et al. | 522/187 |
| 7,060,756 B2 | 6/2006 | Jing et al. | 525/327.4 |
| 7,061,205 B2 | 6/2006 | Shigematsu et al. | 320/101 |
| 7,071,271 B2 | 7/2006 | Thaler et al. | 526/243 |
| 7,078,123 B2 | 7/2006 | Kazacos et al. | 429/105 |
| 7,112,614 B2 | 9/2006 | Jing et al. | 521/27 |
| 7,173,067 B2 | 2/2007 | Guerra | 521/31 |
| 7,181,183 B1 | 2/2007 | Hennessy | 455/289 |
| 7,184,903 B1 | 2/2007 | Williams et al. | 702/60 |
| 7,199,550 B2 | 4/2007 | Tsutsui et al. | 320/101 |
| 7,220,515 B2 | 5/2007 | Ito et al. | 429/72 |
| 7,227,275 B2 | 6/2007 | Hennessy et al. | 290/55 |
| 7,258,947 B2 | 8/2007 | Kubata et al. | 429/122 |
| 7,259,208 B2 | 8/2007 | Guerra et al. | 525/178 |
| 7,265,162 B2 | 9/2007 | Yandrasits et al. | 522/156 |
| 7,265,456 B2 | 9/2007 | Hennessy | 290/44 |
| 7,270,911 B2 | 9/2007 | Clarke et al. | 429/105 |
| 7,297,437 B2 | 11/2007 | Clarke et al. | 429/105 |
| 7,309,540 B2 | 12/2007 | Wang | 429/33 |
| 7,314,761 B2 | 1/2008 | Winter | 436/151 |
| 7,320,844 B2 | 1/2008 | Skyllas-Kazacos | 429/105 |
| 7,326,737 B2 | 2/2008 | Guerra | 521/31 |
| 7,332,065 B2 | 2/2008 | Shimamune | 204/290.13 |
| 7,353,083 B2 | 4/2008 | Hennessy | 700/286 |
| 7,389,189 B2 | 6/2008 | Williams et al. | 702/60 |
| 7,411,022 B2 | 8/2008 | Guerra et al. | 525/178 |
| 7,517,608 B2 | 4/2009 | Brereton et al. | 429/71 |
| 7,537,859 B2 | 5/2009 | Samuel et al. | 429/101 |
| 7,554,220 B2 | 6/2009 | Sugawara | 307/64 |
| 7,557,531 B2 | 7/2009 | Willets et al. | 320/101 |
| 7,670,719 B2 | 3/2010 | Nakaishi et al. | 429/163 |
| 7,682,728 B2 | 3/2010 | Harper | 429/101 |
| 7,687,193 B2 | 3/2010 | Harper | 429/101 |
| 7,704,634 B2 | 4/2010 | Deguchi et al. | 429/105 |
| 7,740,977 B2 | 6/2010 | Lepp et al. | 429/72 |
| 7,820,321 B2 | 10/2010 | Horne et al. | 429/149 |
| 7,855,005 B2 | 12/2010 | Sahu | 429/51 |
| 7,919,204 B2 | 4/2011 | Sahu | 429/105 |
| 7,923,965 B2 | 4/2011 | Ritter et al. | 320/127 |
| 7,927,731 B2 | 4/2011 | Sahu | 429/101 |
| 7,939,190 B2 | 5/2011 | Colello et al. | 429/61 |
| 7,976,974 B2 | 7/2011 | Kazacos et al. | 429/105 |
| 7,993,932 B2 | 8/2011 | Winter | 436/151 |
| 8,008,808 B2 | 8/2011 | Seeker et al. | 307/72 |
| 8,029,944 B2 | 10/2011 | Yau et al. | 429/523 |
| 8,039,161 B2 | 10/2011 | Winter | 429/447 |
| 8,048,555 B2 | 11/2011 | Darcy et al. | 429/122 |
| 8,137,830 B2 | 3/2012 | Whitacre | 429/50 |
| 8,137,831 B1 | 3/2012 | La O' et al. | 429/51 |
| 8,168,337 B2 | 5/2012 | Friesen et al. | 429/402 |
| 8,182,940 B2 | 5/2012 | Ridley | 429/210 |
| 8,202,641 B2 | 6/2012 | Winter et al. | 429/80 |
| 8,221,911 B2 | 7/2012 | Kumamoto et al. | 429/51 |
| 8,222,043 B2 | 7/2012 | Winter | 436/151 |
| 2001/0055713 A1 | 12/2001 | Eidler et al. | 429/81 |
| 2002/0110717 A1* | 8/2002 | Basel et al. | 429/32 |
| 2003/0007370 A1 | 1/2003 | Winter | 363/37 |
| 2003/0008204 A1 | 1/2003 | Winter et al. | 429/81 |
| 2003/0113615 A1 | 6/2003 | Tomazic | 429/70 |
| 2003/0143456 A1 | 7/2003 | Kazacos et al. | 429/31 |
| 2003/0165741 A1 | 9/2003 | Maly-Schreiber et al. | 429/235 |
| 2004/0070370 A1 | 4/2004 | Emura | 320/128 |
| 2004/0170893 A1 | 9/2004 | Nakaishi et al. | 429/185 |
| 2004/0202915 A1 | 10/2004 | Nakaishi et al. | 429/34 |
| 2004/0241544 A1 | 12/2004 | Nakaishi et al. | 429/210 |
| 2004/0241552 A1 | 12/2004 | Skyllas-Kazacos | 429/304 |
| 2005/0074653 A1 | 4/2005 | Broman et al. | 429/33 |
| 2005/0074665 A1 | 4/2005 | Spaziante et al. | 429/50 |
| 2005/0118494 A1 | 6/2005 | Choi | |
| 2005/0158614 A1* | 7/2005 | Hennessy | 429/61 |
| 2005/0158615 A1 | 7/2005 | Samuel et al. | 429/81 |
| 2005/0164075 A1 | 7/2005 | Kumamoto et al. | 429/50 |
| 2005/0244707 A1 | 11/2005 | Skyllas-Kazacos et al. | 429/105 |
| 2005/0287436 A1 | 12/2005 | Kawashige et al. | 429/189 |
| 2006/0063065 A1 | 3/2006 | Clarke et al. | 429/105 |
| 2006/0183016 A1 | 8/2006 | Kazacos et al. | 429/105 |
| 2007/0021300 A1 | 1/2007 | Farant | 502/430 |
| 2007/0035135 A1 | 2/2007 | Yoshida | 290/44 |

| | | | | | | | |
|---|---|---|---|---|---|---|---|
| 2007/0072067 A1 | 3/2007 | Symons et al. ............... 429/101 | | 2011/0318644 A1 | 12/2011 | Zhai et al. ..................... 429/249 |
| 2007/0246352 A1 | 10/2007 | Keister ...................... 204/278.5 | | 2012/0009491 A1 | 1/2012 | Friesen et al. ................ 429/418 |
| 2008/0193828 A1 | 8/2008 | Sahu | | 2012/0015264 A1 | 1/2012 | Friesen et al. ................ 429/415 |
| 2008/0292964 A1 | 11/2008 | Kazacos et al. ............ 429/231.5 | | 2012/0021303 A1 | 1/2012 | Amendola et al. ........... 429/406 |
| 2008/0299439 A1 | 12/2008 | Wang ............................... 429/34 | | 2012/0040254 A1 | 2/2012 | Amendola et al. ........... 429/406 |
| 2009/0017379 A1 | 1/2009 | Inatomi et al. ................ 429/213 | | 2012/0045669 A1 | 2/2012 | Darcy et al. ..................... 429/51 |
| 2009/0110998 A1 | 4/2009 | Miyachi et al. ................. 429/33 | | 2012/0045680 A1 | 2/2012 | Dong et al. ................... 429/109 |
| 2009/0130525 A1 | 5/2009 | Miyachi et al. ................. 429/33 | | 2012/0052347 A1 | 3/2012 | Wilson et al. ................... 429/72 |
| 2009/0197151 A1 | 8/2009 | Kumamoto et al. ............ 429/51 | | 2012/0052404 A1 | 3/2012 | Friesen et al. ................ 429/409 |
| 2009/0208807 A1 | 8/2009 | Miyachi et al. ................. 429/33 | | 2012/0058370 A1 | 3/2012 | Kell et al. ........................ 429/51 |
| 2009/0212262 A1 | 8/2009 | Elson et al. .................... 252/500 | | 2012/0064388 A1 | 3/2012 | Whitacre et al. .............. 429/160 |
| 2009/0225573 A1 | 9/2009 | Sugawara .................. 363/56.01 | | 2012/0068667 A1 | 3/2012 | Friesen et al. ................ 320/135 |
| 2009/0253025 A1 | 10/2009 | Whitacre ......................... 429/50 | | 2012/0077067 A1 | 3/2012 | Li et al. .......................... 429/107 |
| 2009/0295162 A1 | 12/2009 | Oohara et al. .................. 290/44 | | 2012/0077068 A1 | 3/2012 | Wang et al. .................. 429/107 |
| 2010/0003545 A1 | 1/2010 | Horne et al. ..................... 429/12 | | 2012/0077079 A1 | 3/2012 | Li et al. .......................... 429/199 |
| 2010/0047671 A1 | 2/2010 | Chiang et al. ................... 429/50 | | 2012/0077095 A1 | 3/2012 | Roumi et al. ................. 429/405 |
| 2010/0086829 A1 | 4/2010 | Ridley ............................. 429/36 | | 2012/0107660 A1 | 5/2012 | Li et al. .......................... 429/105 |
| 2010/0089480 A1 | 4/2010 | Sahu et al. ...................... 138/121 | | 2012/0107661 A1 | 5/2012 | Lee et al. ....................... 429/107 |
| 2010/0090651 A1 | 4/2010 | Sahu et al. .................... 320/132 | | 2012/0115069 A1 | 5/2012 | Noack et al. .................. 429/498 |
| 2010/0092757 A1 | 4/2010 | Nair et al. .................... 428/306.6 | | 2012/0129021 A1 | 5/2012 | Winter ............................ 429/67 |
| 2010/0092807 A1 | 4/2010 | Sahu et al. ....................... 429/10 | | 2012/0135278 A1 | 5/2012 | Yoshie et al. ...................... 429/7 |
| 2010/0092843 A1 | 4/2010 | Conway ........................... 429/51 | | 2012/0139496 A1 | 6/2012 | Krishnan et al. .............. 320/134 |
| 2010/0094468 A1 | 4/2010 | Sahu et al. ..................... 700/281 | | 2012/0156535 A1 | 6/2012 | Harrer et al. ................... 429/82 |
| 2010/0112391 A1 | 5/2010 | Salloum et al. ................. 429/14 | | 2012/0164498 A1 | 6/2012 | Vincent et al. ................. 429/80 |
| 2010/0119895 A1 | 5/2010 | Friesen ............................ 429/17 | | 2012/0168975 A1 | 7/2012 | Perry et al. ................... 264/29.6 |
| 2010/0119937 A1 | 5/2010 | Winter .......................... 429/185 | | 2012/0171530 A1 | 7/2012 | Lee et al. ........................ 429/70 |
| 2010/0136455 A1 | 6/2010 | Winter .......................... 429/458 | | 2012/0171531 A1 | 7/2012 | Park et al. ....................... 429/70 |
| 2010/0143781 A1 | 6/2010 | Keshavarz et al. ............ 429/107 | | 2012/0171541 A1 | 7/2012 | Park et al. ..................... 429/107 |
| 2010/0178533 A1 | 7/2010 | Whitehead et al. ............... 429/7 | | 2012/0183816 A1 | 7/2012 | Keshavarz et al. .............. 429/51 |
| 2010/0188045 A1 | 7/2010 | Colello et al. ................. 320/118 | | 2012/0183872 A1 | 7/2012 | Keshavarz et al. ............ 429/429 |
| 2010/0216006 A1 | 8/2010 | Rennebeck .................... 429/105 | | 2012/0185187 A1 | 7/2012 | Parakulam et al. .............. 702/63 |
| 2010/0243459 A1 | 9/2010 | Friesen et al. ................... 205/50 | | 2012/0185572 A1 | 7/2012 | Parakulam et al. ............ 709/219 |
| 2010/0261070 A1 | 10/2010 | Keshavarz et al. ............ 429/345 | | | | |
| 2010/0285375 A1 | 11/2010 | Friesen et al. ................ 429/405 | | | FOREIGN PATENT DOCUMENTS | |
| 2010/0316935 A1 | 12/2010 | Friesen et al. ................ 429/512 | | | | |
| 2010/0323264 A1 | 12/2010 | Chiang et al. ................. 429/449 | | CN | 101213700 A | 7/2008 |
| 2010/0330437 A1 | 12/2010 | Burchardt et al. ............ 429/406 | | JP | 57-9072 A | 1/1982 |
| 2011/0014527 A1 | 1/2011 | Ohlsen .......................... 429/408 | | JP | 59-205165 A | 11/1984 |
| 2011/0045332 A1 | 2/2011 | Horne et al. ................... 429/107 | | JP | 60-070672 U | 4/1985 |
| 2011/0052945 A1 | 3/2011 | Whitacre ......................... 429/50 | | JP | 60-115174 A | 6/1985 |
| 2011/0070483 A1 | 3/2011 | Keshavarz et al. ............ 429/188 | | JP | 60-148068 A | 8/1985 |
| 2011/0070506 A1 | 3/2011 | Friesen et al. ................ 429/404 | | JP | 61-173468 A | 8/1986 |
| 2011/0074357 A1 | 3/2011 | Parakulam et al. ........... 320/134 | | JP | 61-269866 A | 11/1986 |
| 2011/0076526 A1 | 3/2011 | Zu et al. .......................... 429/51 | | JP | 62-52861 A | 3/1987 |
| 2011/0079074 A1 | 4/2011 | Sahu ............................ 73/25.03 | | JP | 62-108465 A | 5/1987 |
| 2011/0080143 A1 | 4/2011 | Parakulam et al. ........... 320/162 | | JP | 62-119874 A | 6/1987 |
| 2011/0081561 A1 | 4/2011 | Keshavarz et al. .............. 429/49 | | JP | 63-24565 A | 2/1988 |
| 2011/0081562 A1 | 4/2011 | Parakulam et al. ........... 429/50 | | JP | 63-76268 A | 4/1988 |
| 2011/0086247 A1 | 4/2011 | Keshavarz et al. ............... 429/9 | | JP | 63-148563 A | 6/1988 |
| 2011/0086278 A1 | 4/2011 | Friesen et al. ................ 429/402 | | JP | 63-150867 U | 6/1988 |
| 2011/0117411 A1 | 5/2011 | Horne et al. ................... 429/120 | | JP | 64-12466 A | 1/1989 |
| 2011/0189520 A1 | 8/2011 | Carter et al. .................. 429/107 | | JP | 64-82465 A | 3/1989 |
| 2011/0189538 A1 | 8/2011 | Sun et al. ...................... 429/338 | | JP | 1-176227 A | 7/1989 |
| 2011/0189551 A1 | 8/2011 | Friesen et al. ................ 429/405 | | JP | 1-176228 A | 7/1989 |
| 2011/0195283 A1 | 8/2011 | Sun et al. ........................ 429/80 | | JP | 6-79491 B2 | 10/1994 |
| 2011/0200853 A1 | 8/2011 | Winter ............................ 429/51 | | JP | 6-325784 A | 11/1994 |
| 2011/0200890 A1 | 8/2011 | Kocherginsky ............... 429/402 | | JP | 8-78042 A | 3/1996 |
| 2011/0200893 A1 | 8/2011 | Friesen et al. ................ 429/404 | | JP | 09-101286 A | 4/1997 |
| 2011/0204637 A1 | 8/2011 | Ritter et al. ..................... 290/44 | | JP | 10-162852 A | 6/1998 |
| 2011/0206960 A1 | 8/2011 | Winter ............................ 429/70 | | JP | 3242205 B2 | 12/2001 |
| 2011/0223450 A1 | 9/2011 | Horne et al. ..................... 429/72 | | JP | 2002-329523 A | 11/2002 |
| 2011/0223451 A1 | 9/2011 | Winter et al. ................... 429/80 | | JP | 2003-173812 A | 6/2003 |
| 2011/0244277 A1 | 10/2011 | Gordon, II et al. .............. 429/51 | | JP | 2004-335158 A | 11/2004 |
| 2011/0250512 A1 | 10/2011 | Friesen et al. ................ 429/405 | | JP | 3642697 B2 | 4/2005 |
| 2011/0256435 A1 | 10/2011 | Kim et al. ........................ 429/94 | | JP | 2005-142056 A | 6/2005 |
| 2011/0269055 A1 | 11/2011 | Perry ............................ 429/480 | | JP | 2005-209525 A | 8/2005 |
| 2011/0273022 A1 | 11/2011 | Dennis et al. ................... 307/22 | | JP | 2005-228617 A | 8/2005 |
| 2011/0273129 A1 | 11/2011 | Coe et al. ...................... 320/101 | | JP | 2005-228622 A | 8/2005 |
| 2011/0274950 A1 | 11/2011 | Whitacre ......................... 429/50 | | JP | 2005-228633 A | 8/2005 |
| 2011/0281169 A1 | 11/2011 | Zheng et al. ................. 429/231.8 | | JP | 2005-228645 A | 8/2005 |
| 2011/0281184 A1 | 11/2011 | Friesen et al. ................ 429/405 | | JP | 2005-243326 A | 9/2005 |
| 2011/0282807 A1 | 11/2011 | Colello et al. ................. 705/412 | | JP | 2005-322447 A | 11/2005 |
| 2011/0300417 A1 | 12/2011 | Mou et al. ....................... 429/50 | | JP | 2005-322448 A | 11/2005 |
| 2011/0305959 A1 | 12/2011 | Friesen et al. ................ 429/405 | | JP | 2005-340029 A | 12/2005 |
| 2011/0311846 A1 | 12/2011 | Whitacre ......................... 429/50 | | JP | 2005-340030 A | 12/2005 |
| 2011/0311896 A1 | 12/2011 | Harper et al. ................. 429/447 | | JP | 2005-347106 A | 12/2005 |
| 2011/0315934 A1 | 12/2011 | Ma et al. ....................... 252/511 | | JP | 2005-347107 A | 12/2005 |
| 2011/0316485 A1 | 12/2011 | Krishnan et al. .............. 320/137 | | JP | 3729296 B2 | 12/2005 |
| 2011/0318619 A1 | 12/2011 | Winter .......................... 429/72 | | JP | 2006-12425 A | 1/2006 |

| | | | |
|---|---|---|---|
| JP | 3738227 B2 | 1/2006 |
| JP | 2006-40591 A | 2/2006 |
| JP | 2006-40648 A | 2/2006 |
| JP | 2006-73471 A | 3/2006 |
| JP | 2006-93016 A | 4/2006 |
| JP | 2006-107988 A | 4/2006 |
| JP | 2006-114359 A | 4/2006 |
| JP | 2006-114360 A | 4/2006 |
| JP | 2006-147306 A | 6/2006 |
| JP | 2006-147374 A | 6/2006 |
| JP | 2006-147375 A | 6/2006 |
| JP | 2006-147376 A | 6/2006 |
| JP | 2006-156029 A | 6/2006 |
| JP | 3797578 B2 | 7/2006 |
| JP | 2006-253023 A | 9/2006 |
| JP | 2006-254682 A | 9/2006 |
| JP | 2006-302643 A | 11/2006 |
| JP | 2006-351346 A | 12/2006 |
| JP | 2006351346 A | 12/2006 |
| JP | 2009-16216 A | 1/2009 |
| JP | 2009-16217 A | 1/2009 |
| JP | 2009-16218 A | 1/2009 |
| JP | 2009-16219 A | 1/2009 |
| JP | 2010-86935 A | 4/2010 |
| JP | 2010-170782 A | 8/2010 |
| JP | 2010-244972 A | 10/2010 |
| JP | 2010-277810 A | 12/2010 |
| JP | 2010-277811 A | 12/2010 |
| JP | 2011-119283 A | 6/2011 |
| WO | 90/03666 A1 | 4/1990 |
| WO | 99/39397 A1 | 8/1999 |
| WO | 2005/001981 A2 | 1/2005 |
| WO | 2005/014484 A1 | 2/2005 |
| WO | 2006135958 A1 | 12/2006 |
| WO | 2007/101284 A1 | 9/2007 |
| WO | 2007/130659 A2 | 11/2007 |
| WO | 2009/106452 A1 | 9/2009 |
| WO | 2009/156259 A1 | 12/2009 |
| WO | 2010/094657 A1 | 8/2010 |
| WO | 2010/118060 A1 | 10/2010 |
| WO | 2010/142080 A1 | 12/2010 |
| WO | 2010/143634 A1 | 12/2010 |
| WO | 2011/022390 A2 | 2/2011 |
| WO | 2011/044778 A1 | 4/2011 |
| WO | 2011/075135 A1 | 6/2011 |
| WO | 2011/080334 A2 | 7/2011 |
| WO | 2011/088761 A1 | 7/2011 |
| WO | 2011/111254 A1 | 9/2011 |
| WO | 2011/111717 A1 | 9/2011 |
| WO | 2011/123102 A1 | 10/2011 |
| WO | 2011/129215 A1 | 10/2011 |
| WO | 2011/136256 A1 | 11/2011 |
| WO | 2011/137895 A2 | 11/2011 |
| WO | 2011/149624 A1 | 12/2011 |
| WO | 2012/006479 A2 | 1/2012 |
| WO | 2012/020277 A1 | 2/2012 |
| WO | 2012/022532 A1 | 2/2012 |
| WO | 2012/038497 A2 | 3/2012 |
| WO | 2012/051156 A2 | 4/2012 |
| WO | 2012/051973 A1 | 4/2012 |
| WO | 2012/097286 A1 | 7/2012 |

OTHER PUBLICATIONS

International Search Report & Written Opinion issued in PCT Application No. PCT/US2011/063787, mailed on Jul. 30, 2012.
International Search Report & Written Opinion issued in PCT Application No. PCT/US2012/031174, mailed on Nov. 7, 2012.
International Bureau of WIPO. International Preliminary Report on Patentability, Intl. Application PCT/US09/49789. Jan. 20, 2011.
Intl. Searching Authority/Korean Intellectual Property Office (ISA/KR). International Search Report and Written Opinion, Intl. Application PCT/US09/49789. Feb. 25, 2010.
International Search Report & Written Opinion issued in PCT Application No. PCT/US2009/049789, mailed on Feb. 25, 2010.
International Preliminary Report on Patentability issued in PCT Application No. PCT/US2009/049789, mailed on Jan. 20, 2011.
International Search Report & Written Opinion issued in PCT Application No. PCT/US2012/020656, mailed on Jun. 27, 2012.
International Search Report & Written Opinion issued in PCT Application No. PCT/US2012/020668, mailed on Jun. 27, 2012.
International Search Report & Written Opinion issued in PCT Application No. PCT/US2012/021095, mailed on Jun. 27, 2012.
Sano, Noriaki, et al. "Synthesis of carbon nanotubes in graphite microchannels in gas-flow and submerged-in-liquid reactors"; Materials Chemistry and Physics; vol. 122; pp. 474-479; Apr. 18, 2010.
Chieng, S.C. et al., "Modification of Daramic, mircoporous separator, for redox flow battery applications"; Univ. New South Wales, School of Chemical Eng. Industrial Chemistry, Kensington N.S.W. 2033, Australie; vol. 75; No. 1-2; pp. 81-91; 1992.
Codina, G. et al., "Development of a 0.1 kW power accumulation pilot plant based on a Fe/Cr redox flow battery Part 1. Considerations on flow-distribution design"; Journal of Power Sources; vol. 48; pp. 293-302; Jul. 23, 1993.
Codina, G. et al., "Scale-up studies of an Fe/Cr redox flow battery based on shunt current analysis"; Journal of Applied Electrochemistry; vol. 22; pp. 668-674; Sep. 1, 1991.
Cunningham, Brent et al., "Development of bipolar plates for fuel cells from graphite filled wet-lay material and a thermoplastic laminate skin layer"; ScienceDirect; Journal of Power Sources; vol. 165; pp. 764-773; Aug. 7, 2006.
Cunningham, Brent; "Development of Compression Moldable Polymer Composite Bipolar Plates for Fuel Cells"; Virginia Polytechnic Institute and State University Dissertation; Macromolecular Science and Engineering; Feb. 5, 2007.
Demopoulos, George et al., "New Technologies for HCI Regeneration in Chloride Hydrometallurgy"; World of Metallurgy—ERZMETALL 61; No. 2; 2008.
Dolle, Mickael et al., "Synthesis of nanosized zirconium carbide by a sol-gel route"; Journal of European Ceramic Society; ISSN 0955-2219; 2007.
Erkoc, E. et al., "Effect of pulsed flow on the performance of carbon felt electrode"; Chemical Engineering Journal; vol. 85; pp. 153-160; Feb. 7, 2001.
Faith, Khalid et al., "Advancements in the Direct Hydrogen Redox Fuel Cell"; Electrochemical and Solid-State Letters; 11 (2) B11-B15; Aug. 16, 2007.
Fedkiw, Peter et al., "Mathematical Model for the Iron/Chromium Redox Battery"; Department of Chemical Engineering, North Carolina State University, Admittance Study of The Pb Electrode; Apr. 1984.
Friedrich J.M. et al., "Reticulated vitreous carbon as an electrode material"; Journal of Electroanalytical Chemistry; Apr. 10, 2003.
Gahn, Randall et al., "Cycling Performance of the Iron-Chromium Redox Energy Storage System"; National Aeronautics and Space Administration; Cleveland, Ohio; Aug. 18-23, 1985.
Gahn, Randall et al., "Preformance of Advanced Chromium Electrodes for the NASA Redox Energy Storage System"; National Aeronautics and Space Administration; Cleveland, Ohio; Nov. 1981.
Gahn, Randall et al., "Single Cell Preformance Studies on the Fe/Cr Redox Energy Storage System using Mixed Reactant Solutions at Elevated Temperature"; Intersociety Energy Conversion Engineering Conference; vol. 4; Aug. 21-26, 1983.
Giner, J. et al., "Advanced Screening of Electrode Couples"; National Aeronautics and Space Administration; Cleveland, Ohio; Feb. 1980.
Giner, J. et al., "Screening of Redox Couples and Electrode Materials"; Giner, Inc., National Aeronautics and Space Administration; Cleveland, Ohio; Sep. 1976.
Gonzalez-Garcia, Jose et al., "Hydrodynamic Behavior of a Filter-Press Electrochemical Reactor with Carbon Felt as a Three-Dimensional Electrode"; American Chemical Society; vol. 37; pp. 4501-4511; 1998.
Gonzalez-Garcia, Jose et al., "Characterization of a carbon felt electrode: structural and physical properties"; Journal of Materials Chemistry; Received Jul. 27, 1998, Accepted Nov. 13, 1998.
Hagg, Ch. M. et al., "Novel bipolar electrodes for battery applications"; Journal of Applied Electrochemistry; vol. 32; pp. 1063-1069; Received Apr. 5, 2001; accepted in revised form Jun. 12, 2002.
Hamamoto, Osamu et al., "Research and Development of 10kw Class Redox Flow Battery"; NEDO; Proceedings of the 20th Intersociety Energy Conversion Engineering Conference; vol. 2; Aug. 1985.

Hodgson, Isaac; "Pressure Drop, Liquid Holdup and Mass Transfer in a Graphite Fiber Bed with Upward Co-Current Gas-Liquid Flow"; B. Sc (Hons) University of Science and Technology; Ghana; Aug. 1993.

Hollax, E. et al., "The Influence of Oxidative Pretreatment of Graphite Electrodes on the Catalysis of the Cr3/Cr2 and Fe2/Fe2 Redox Reactions"; Carbon; vol. 23; No. 6; pp. 655-664; Received Oct. 8, 1984; Revised Dec. 17, 1984.

Inoue, M. et al., "Carbon Fiber Electrode for Redox Flow Battery"; Journal of the Electrochemical Society; Accelerated Brief Communications; Mar. 1987.

Izawa, Hidetaka, "Research and Development of 10kw Class Redox Flow Battery"; 21st Intersociety Energy Conversion Engineering Conference; Advancing Toward Technology Breakout in Energy Conversion; Aug. 25-29, 1986.

Jain, Anubhav, "Systhesis and Processing of Nanocrystalline Zirconium Carbide Formed by Carbothermal Reducation"; A Thesis presented to the Academic Faculty; Georgia Institute of Technology; Aug. 2004.

Jalan, Vinod et al., "Optimization and Fabrication of Porous Carbon Elecrodes for Fe/Cr Redox Flow Cells"; U.S. Department of Energy Conservation and Renewable Energy Division of Energy Storage Systems; Jul. 1982.

Jalan, Vinod et al., "Requirements for Optimization of Electrodes and Electrolyte for the Iron/Chromium Redox Flow Cell"; National Aeronautics and Space Administration; Sep. 1981.

Joerissen, Ludwig et al., "Possible use of vanadium redox-flow batteries for energy storage in small grids and stand-alone photovoltaic systems"; Science Direct; Journal of Power Sources; vol. 127; pp. 98-104; 2004.

Johnson, David et al., "Chemical and Electrochemical Behavior of the Cr(III)/Cr(II) Half-Cell in the Iron-Chromium Redox Energy Storage System"; J. Electrochem. Soc.; Electrochemical Science and Technology; May 1985.

Jones, Janet et al., "Ligand Bridging in the Oxidation of Chromium (II) at Mercury Electrodes"; California Institute of Technology; Pasadena, CA; Jan. 24, 1964.

Kim, Jun Gyu et al., "Microstructure and mechanical properties of chemical vapor deposited ZrC film on SiC/graphite substrate"; Journal of Ceramic Processing Research; vol. 10; No. 1; pp. 21-24; 2009.

Kuhn, A.T. et al., "Electrical leakage currents in bipolar cell stacks"; Journal of Applied Electrochemisty; vol. 10; pp. 233-237; Mar. 27, 1979.

Lampitt, L.H. et al., "The photochemical oxidation of ascorbic acid in solutions containing oxalic acid. II—Mechanism of the reaction"; Journal of the Science of Food and Agriculture; vol. 7; issue 2; pp. 120-124; http://online.library.wiley.com; published online May 8, 2006.

Leong, Chia-ken al, "Pressure Electrical Contact Improved by Carbon Black Paste"; Journal of Electronic Materials; vol. 33; No. 3; 2004.

Lopez-Atalaya, M. et al., "Behavior of the Cr(III)/Cr)II) reaction on fold-graphite electrodes. Application to redox flow storage cell"; Journal of Power Sources; vol. 35; pp. 225-234; Oct. 5, 1990.

Lopez-Atalaya, M. et al., "Optimization studies on a Fe/Cr redox flow battery"; Journal of Power Sources; vol. 39; pp. 147-154; Nov. 15, 1991.

Cnobloch, H et al., "Redox Ion Flow Cell for Solar Energy Storage"; Siemens Forsch—u. ENtwickl.-Ber. Bd. 12; 1983.

Mayer, Peter et al., "Electocatalysis of redox reactions by metal nanoparticles on graphite electrodes"; Journal of Solid State Electrochem; vol. 5; pp. 402-411; published online May 16, 2001.

Middelman, E. et al., "Bipolar plates for PEM fuel cells"; Science Direct; Journal of Power Sources; vol. 118; pp. 44-46; 2003.

Mohammadi, Touraj et al., "Modification of a Composite Membrane for Redox Flow Battery Applications"; Iranian Palyn er Animal I, vol. 6, No. I; School of Chem. Eng. and Ind. Chem.; Unvi. Of New South Wales; Received Apr. 2, 1996, accepted Nov. 17, 1996.

Mohammadi, F. et al., "Overcharge in the vanadium redox battery and changes in electrical resistivity and surface functionality of graphite-felt electrode"; Journal of Power Sources; vol. 52; pp. 61-68; Received Feb. 2, 1994; accepted Apr. 25, 1994.

Muller, A. et al., "Injection moulding of graphite composite bipolar plates"; Science Direct; Journal of Power Sources; vol. 154; pp. 467-471; available online Dec. 28, 2005.

Nava, J.L. et al., "Mass Transport and Potential Studies in a Flow-through Porous Electrode Reactor. A Comparative Study of Reticulated Vitreous Carbon and Graphite Felt Used as Cathode"; Portugaliae Electrochimica Acta ISSN 1647-1571; Nov. 20, 2008.

Noah, Karl et al., "Hydrogen Reduction of Ferric Ions for Use in Copper Electrowinning"; Idaho National Engineering and Environmental Laboratory; Jan. 2005.

Nozaki, Ken et al. "Performance of ETL 1 KW Redox Flow Cell"; 18th Intersociety Energy Conversion Engineering Conference; vol. 4; Aug. 21-26, 1983.

Nozaki, Ken et al., "Performance of ETL new 1 KW Redox Flow Cell System"; 19th Intersociety Energy Conversion Engineering Conference; vol. 2; Aug. 19-24, 1984.

Nozaki, Ken et al., "Research and Development of Redox-Flow Battery"; 17th Intersociety Energy Conversion Engineering Conference; Aug. 8-12, 1982.

Oei, Djong-Gie, "Permeation of vanadium cations through anionic and cationic membranes"; Journal of Applied Electrochemistry; vol. 15; No. 2; pp. 231-235; Mar. 1985.

Ozdemir, T. et al., "Treatment of Waste Pickling Liquors: Process Synthesis and Economic Analysis"; Chemical Engineering Communications; vol. 193; Issue 5; May 2006.

Pecsok, R.L. et al., "Metal Ammine Formation in Solution XI. Stability of Ethylenediamine Complexes and the Coordination Number of Chromium (II)"; Univ. of Denmark; Acta Chem. Scand.; vol. 11; No. 8; 1957.

Petrii, O.A. et al., "The nature of anomalous cathodic behavior of metals with high hydrogen overpotential: thallium in acidic solutions"; Russian Journal of Electrochemistry; vol. 31; pp. 921-929; 1995.

Ponce De Leon, C. et al., "Redox flow cells for energy conversion"; Science Direct; Journal of Power Sources; vol. 60; pp. 716-732; Oct. 19, 2005.

O'Donnell, Patricia et al., "The Redox Flow System for Solar Photovoltaic Energy Storage"; E-9006; STAR Category 44; National Aeronautics and Space Administration; Lewis Research Center; Cleveland, Ohio; 1976.

Office Action issued by the State Intellectual Property Office of the People's Republic of China; Chinese application No. 200980126611.8; issued on Jan. 14, 2013.

International Preliminary Report on Patentability issued in International Application No. PCT/US2011/063787, having a mailing date of Jun. 20, 2013.

International Preliminary Report on Patentability issued in International Application No. PCT/US2012/020656, having a mailing date of Jun. 18, 2013.

International Preliminary Report on Patentability issued in International Application No. PCT/US2012/020668, having a mailing date of Jun. 18, 2013.

International Preliminary Report on Patentability issued in International Application No. PCT/US2012/021095, having a mailing date of Jul. 25, 2013.

International Preliminary Report on Patentability issued in International Application No. PCT/US2012/031174, having a mailing date of Oct. 10, 2013.

* cited by examiner

*Primary Examiner* — Barbara Gilliam
*Assistant Examiner* — Adam A Arciero
(74) *Attorney, Agent, or Firm* — The Marbury Law Group, PLLC

(57) ABSTRACT

A reduction/oxidation ("redox") flow battery system includes a series of electrochemical cells arranged in a cascade, whereby liquid electrolyte reacts in a first electrochemical cell (or group of cells) before being directed into a second cell (or group of cells) where it reacts before being directed to subsequent cells. The cascade includes 2 to n stages, each stage having one or more electrochemical cells. During a charge reaction, electrolyte entering a first stage will have a lower state-of-charge than electrolyte entering the nth stage. In some embodiments, cell components and/or characteristics may be configured based on a state-of-charge of electrolytes expected at each cascade stage. Such engineered cascades provide redox flow battery systems with higher energy efficiency over a broader range of current density than prior art arrangements.

22 Claims, 31 Drawing Sheets

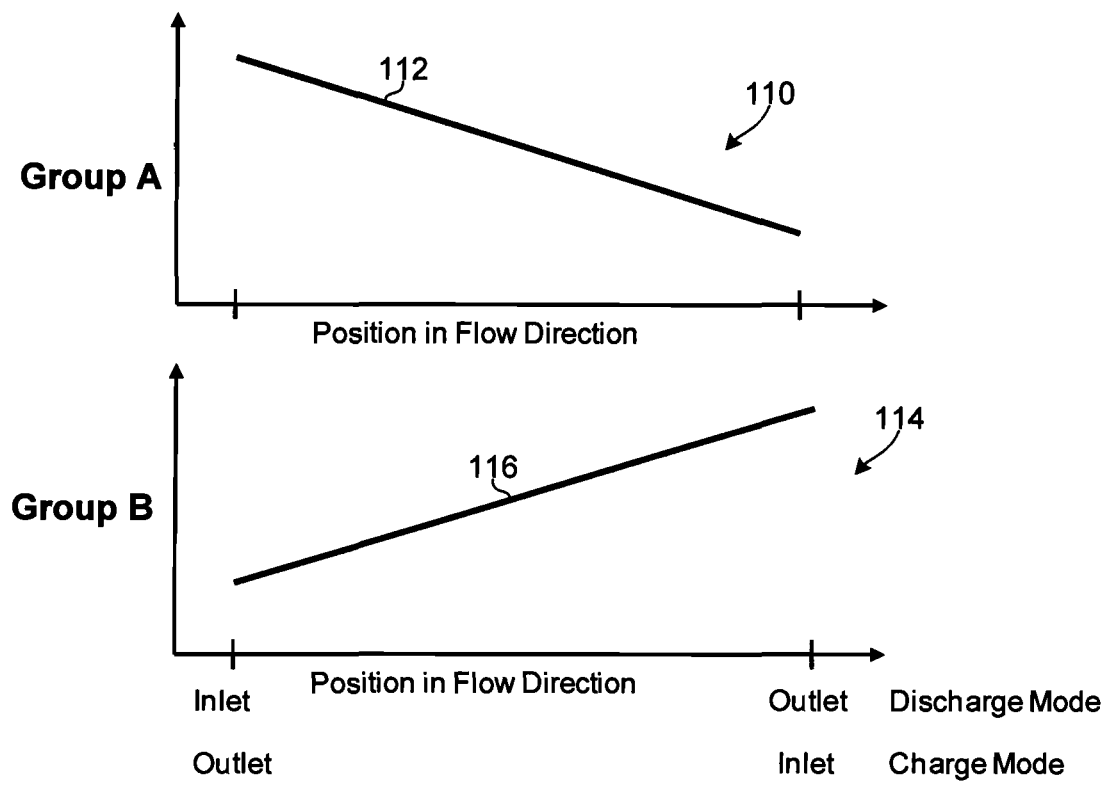

Group A:
membrane selectivity
charge catalyst loading
charge catalyst activity
temperature (when optimizing charging)
chamber volume (when optimizing charging)
mass transport (when optimizing charging)

Group B:
ionic conducivity
dicharge catalyst loading
dicharge catalyst activity
temperature (when optimizing discharging)
chamber volume (when optimizing discharging)
mass transport (when optimizing discharging)

FIG. 5

| Storage Tank | Weight Empty (lbs) | Weight Full (lbs) | Actual Volume (gallons) |
|---|---|---|---|
| TST-50 | 181 | 578 | 47.55 |
| TST-80 | 333 | 994 | 79.25 |
| Collector | Weight Empty (lbs) | Weight Full (lbs) | Collector Area (ft²) |
| AE-21 | 74 | 79.8 | 20.8 |
| AE-26 | 90 | 97.5 | 25.3 |

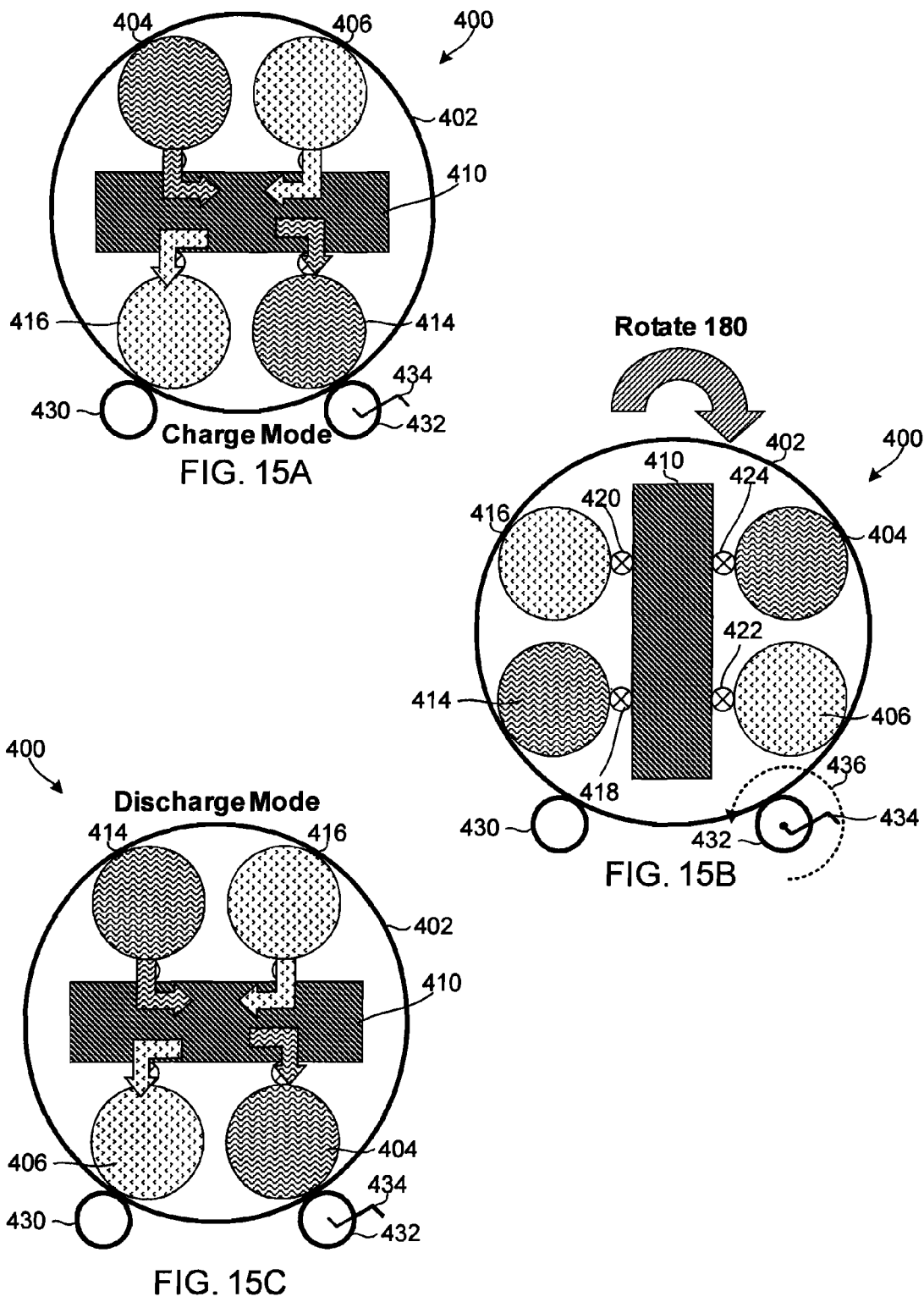

1

CASCADE REDOX FLOW BATTERY SYSTEMS

RELATED APPLICATIONS

This application is a Continuation-In-Part of U.S. patent application Ser. No. 12/883,511 filed Sep. 16, 2010, which is a Divisional of U.S. patent application Ser. No. 12/498,103, filed on Jul. 6, 2009, now U.S. Pat. No. 7,820,321, which claimed the benefit of priority to U.S. Provisional Patent Application No. 61/078,691 filed Jul. 7, 2008 and U.S. Provisional Application No. 61/093,017 filed Aug. 29, 2008, the entire contents of all four of which are hereby incorporated herein by reference.

STATEMENT REGARDING FEDERALLY SPONSORED RESEARCH

Inventions conceived after the filing of the priority application (U.S. patent application Ser. No. 12/498,103, filed on Jul. 6, 2009) that are included in this continuation-in-part patent application were made with Government support under DE-OE0000225 "Recovery Act—Flow Battery Solution For Smart Grid Renewable Energy Applications" awarded by the US Department of Energy (DOE). The Government has certain rights in such inventions. However, the Government does not have rights in U.S. Pat. No. 7,820,321 which was conceived and filed without Government support, nor in the direct continuation and divisional applications thereof.

FIELD OF INVENTION

This invention generally relates to energy storage technologies, and more particularly to redox flow battery energy storage systems and applications.

BACKGROUND

Many renewable energy technologies, while economically viable and environmentally beneficial, suffer from the disadvantage of periodic and unpredictable power generation. To enable such renewable energy technologies to expand, large scale energy storage systems are required. Additionally, many conventional electric generation technologies, such as coal and nuclear power plants, as well as promising alternative energy generation technologies, such as fuel cells, function best when operated at constant power, and thus can benefit from energy storage systems that can deliver peak power when needed and store energy during off-peak hours.

SUMMARY

Reduction/oxidation (redox) flow batteries of the various embodiments offer one large-capacity energy storage solution. Redox flow batteries are electrochemical energy storage systems which store electrical energy in chemical reactants dissolved in liquids. Thus, the energy storage capacity of a flow battery is theoretically limited only by tank size. An efficient and cost-effective redox flow battery system of the various embodiments would provide a needed addition to electrical grid systems.

A redox flow battery storage system of the various embodiments store electrical energy in electrolyte species. The redox flow battery storage system includes at least one redox flow battery stack assembly including a number of layers with each layer including multiple independent cells in a cascade orientation along the reactant flow path. The cells of the redox flow battery stack assembly may configured to increase electrical storage efficiency with the state-of-charge of reactants expected in each cell. Reactants may be heated to increase battery efficiency, with waste heat from energy sources or uses of energy from the battery or system providing the thermal energy to heat the reactants. By adjusting the size of tanks for storing the reactants and adding redox flow battery stack assemblies, the storage system can be sized to support multi-megawatt implementations suitable for use with power grid applications. Thermal integration with energy generating systems, such as fuel cell, wind and solar systems, further maximizes total energy efficiency. The redox flow battery system of the various embodiments can also be scaled down to smaller applications, such as a gravity feed system suitable for small and remote site applications.

Redox flow battery stack assemblies of the various embodiments comprise a plurality of electrochemical cells arranged in hydraulic series to form a cascade arrangement. In some embodiments, such cascade arrangements comprise cells configured for a portion of a state-of-charge gradient that the cell is expected to experience.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 5 is a graph of design parameters that may be implemented within a redox battery system embodiment.

FIGS. 15A-15C are a series of cross sectional component block diagrams of a gravity driven redox flow battery embodiment illustrating a transition from charging mode to discharging mode.

DETAILED DESCRIPTION

Figure 1:
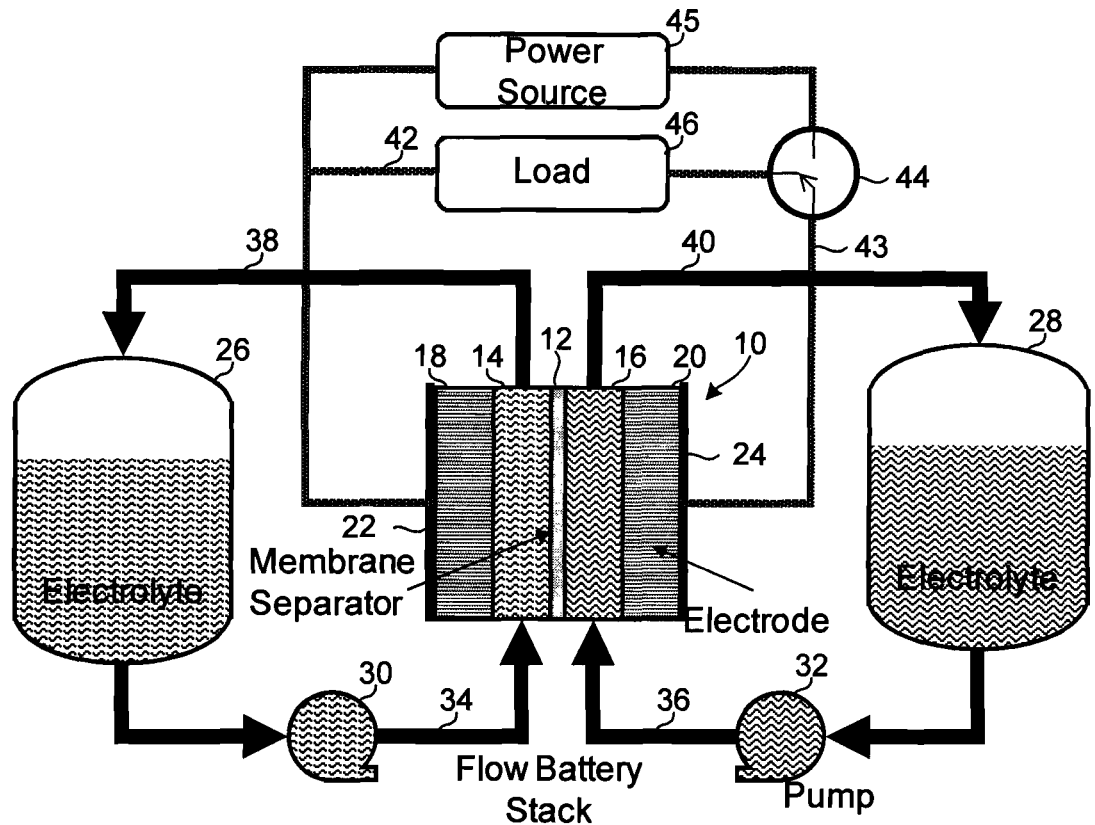
FIG. 1 is a system diagram of an embodiment large stack redox battery system showing a cross sectional schematic illustration of a redox battery stack from a first viewing perspective.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "about" or "approximately" for any numerical values or ranges indicates a suitable temperature or dimensional tolerance that allows the part or collection of components to function for its intended purpose as described herein.

The term "engineered cascade flow battery" is used herein to refer generally to a cascade flow battery in which cells, stages and/or arrays within the battery are configured in terms of materials, design shapes and sizes, reactant flow, and/or other design variables based on an expected condition of reactants (e.g., the state of charge of electrolytes) so as to increase the battery's performance (e.g., energy storage efficiency, power generation efficiency, reduced electrolyte breakdown, reduced hydrogen generation, or other performance) over that achievable in a cascade flow battery in which all cells, stages and/or arrays along the reactant flow path are substantially the same as one another. References to "optimized" or "optimum" are merely intended to indicate design parameters which may be controlled or varied in an engineered cascade flow battery in order to improve performance and to distinguish the embodiments from designs in which there is no configuration based on expected local properties of reactants. Use of these terms is not intended to imply or require that the any cells, stages and/or arrays or components thereof are designed for the best possible or theoretical performance.

As used herein the phrase "state of charge" and its abbreviation "SOC" refer to the chemical species composition of at least one liquid electrolyte. In particular, state of charge and SOC refer to the proportion of reactants in the electrolyte that have been converted (e.g. oxidized or reduced) to a "charged" state from a "discharged" state. For example, in a redox flow battery based on an Fe/Cr redox couple, the state of charge of the catholyte (positive electrolyte) may be defined as the percent of total Fe which has been oxidized from the $Fe^{2+}$ state to the $Fe^{3+}$ state, and the state of charge of the anolyte (negative electrolyte) may be defined as the percent of total Cr which has been reduced from the $Cr^{3+}$ state to the $Cr^{2+}$ state. In some embodiments, the state of charge of the two electrolytes may be changed or measured independent of one another. Thus, the terms "state of charge" and "SOC" may refer to the chemical composition of only one or of both electrolytes in an all-liquid redox flow battery system. The skilled artisan will also recognize that the state of charge of one or both electrolytes can be changed by processes other than electrochemical processes (e.g., by adding quantities of one or more reactant species).

The embodiments provide an energy storage system based upon a reduction/oxidation (redox) flow battery system that is suitable for storing and delivering electric energy under a wide variety of conditions. Electric energy stored by the redox flow battery system can be produced from a wide variety of electric generation or conversion methods, including hydroelectric, natural gas, coal, gasoline, diesel or other liquid petroleum fuel, nuclear, wave power, tidal power, solar, thermal energy, wind, etc. The redox flow battery systems of the various embodiments are also capable of delivering stored energy to a wide variety of loads, including a distributed electrical grid, a data center, an irrigation pump, a cellular telephone station, another energy storage system, a vehicle, a vehicle charging system, a building, or any other electrical load.

Flow batteries are electrochemical energy storage systems in which electrochemical reactants are dissolved in liquid electrolytes (sometimes referred to herein collectively as "reactant" or "reactants"), which are pumped through reaction cells (referred to herein as "cells") where energy is either added to or extracted from the battery. In applications where megawatts of electrical energy must be stored and discharged, a redox flow battery system can be expanded to the required energy storage capacity by increasing tank sizes and expanded to produce the required output power by adding electrochemical cells or cell blocks (i.e., groups of multiple cells which are sometimes referred to herein as "cell arrays").

A system diagram of an embodiment of a redox flow battery energy storage system is illustrated in FIG. 1. The embodiment illustrated in FIG. 1 utilizes a stack design for the redox flow battery which enables large scale applications to be implemented with common affordable battery components. In applications where megawatts of electrical energy must be stored and discharged, e.g., a wind turbine farm or solar power plant coupled to a power grid, the redox flow battery system illustrated in FIG. 1 can be expanded to the required capacity by increasing tank sizes and, expanded in terms of produced power by adding redox flow battery stack assemblies or cell blocks. Simply put, the amount of energy that can be stored is determined by the amount of electrolyte stored in the system. Thus, to store more energy, larger electrolyte storage tanks are used. To increase the output power, more redox flow battery cells and/or stack assemblies are added. Thus, the systems shown and described herein provide great flexibility in addressing a wide range of energy storage requirements.

Referring to FIG. 1, the main components of the redox flow battery system include the redox flow battery stack assembly 10 through which two electrolytes flow through porous electrodes 18, 20 which are separated by a separator membrane 12. Reduction and oxidation reactions that can occur in the respective electrolytes cause electricity to flow through the reaction chamber which is captured by porous electrodes 18, 20 and conducted to conductive surfaces 22, 24. In some embodiments flow channels 14, 16 may be included in the redox flow battery stack assembly 10 to reduce electrolyte flow restrictions through the stack. Including such flow channels 14, 16 can be used to reduce electrolyte pressure drops. In an embodiment, the flow channels 14, 16 may be incorporated so that the electrolytes have sufficient interaction with the porous electrodes 18, 20 to enable the required reduction and oxidation reactions to take place.

The conductive surfaces 22, 24 are coupled to conductors 42, 43 which complete a circuit through either an electrical power source 45 (for charging) or an electrical power load 46 (for discharge), which may be selected in single stack embodiments via an electrical switch 44. The cathode electrolyte ("catholyte) and anode electrolyte ("anolyte") are stored in electrolyte tanks 26, 28, and are pumped by pumps 30, 32 to provide the input flows 34, 36 to the redox flow battery stack assembly 10, with battery output flows 38, 40 returning to the electrolyte tanks 26, 28. The redox flow battery stack assembly 10 is designed for reduce cost by keeping the complexity and part count of the stack to a minimum. The redox flow battery stack assembly 10 is further designed to minimize shunt current losses and maximizing reactant utilization.

Figure 2:
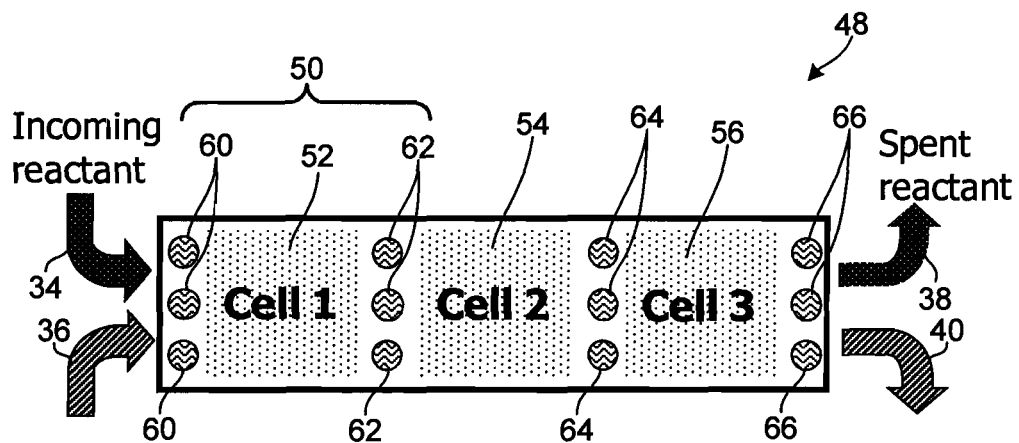
FIG. 2 is cross sectional schematic illustration of an embodiment redox battery stack cell layer of three cells from a second viewing perspective.

The redox flow battery stack assembly 10 is configured to include an array of independent battery cells, assembly frames as shown in FIGS. 2 and 3. The independent battery cells are arranged so that electrolyte reactant flows from one cell to the next within a stack layer 48 (see FIG. 2). Multiple layers 48 of battery cells are stacked together connected in series to form a stack assembly 10 as described below with reference to FIG. 7A. Further, the independent battery cells are configured to increase their electrochemical performance based upon their location within the reactant flow path, thus resulting in a redox flow battery assembly that has greater overall electrical storage performance than possible with identical battery cells.

FIG. 2 illustrates a cross-section of an individual single cell layer 48 within a redox flow battery stack assembly 10 as viewed from a perspective perpendicular to the plane of the electrodes 18, 20 and the membrane separator 12 (i.e., short axis of layer 48 is into and out of the page of FIG. 1). The illustrated cell layer 48 includes three independent cells 52, 54, 56, as an example embodiment; in other embodiments each cell layer 48 may include fewer or more independent cells. In a preferred embodiment, the electrolyte reactant flows across all the cells in a cell layer 48 within the array (i.e., parallel to the image surface of FIG. 2) in a cascading manner (i.e., one cell to the next within a given layer). This multiple cell configuration within each cell layer mitigates problems with shunt currents. To enhance overall efficiency and battery performance, the battery cells are configured with varying catalyst loadings, electrode tortuosity, chamber volumes, and/or membrane separator porosities or selectivity to handle the variations in reactant concentration along the flow path, minimize undesired reactions, and optimize coulombic and voltage efficiencies. For example, as illustrated in FIG. 2, in a three-cell redox flow battery cell layer assembly 48, a first cell 52 near the reactant inlet flows 34, 36 may be configured with structural and material properties to offer greater efficiency with the higher state of charge condition of the electrolyte at the input to the battery cell layer assembly. A second cell 54 may then be configured with structural and material properties to provide efficient operation with the intermediate state of charge condition of the electrolytes that will exist after the electrolytes have passed through the first cell 52. The third cell 56 may be configured with structural and internal properties to provide efficient operation with the relatively low state of charge condition that will exist in the electrolytes after they have reacted in the first and second cells 52, 54. As described in more detail below, configuring the redox flow battery cell layer assembly 48 in this manner provides efficient operation while enabling the battery to be assembled with lower-cost materials.

Some types of flow battery electrolytes operate more efficiently (i.e., retaining and discharging electrical power with lower losses) when the fluids are heated to an optimum temperature. To take advantage of this characteristic, the redox flow battery cell layer assembly 48 may be configured with tubes 60, 62, 64, 66 or channels through which a heating fluid can be circulated. Circulating a heating fluid around and/or within the battery stack assembly can keep the electrolytes at a controlled temperature. By including heating fluid tubes 60, 62, 64, 66 before and after each battery cell, the operating temperature of each cell can be controlled individually so as to enable each cell to operate at a preferred or optimum temperature corresponding to the state of charge of electrolytes within the cell. The heating fluid tubes are optional because in an embodiment the electrolytes may be preheated within the tanks 26, 28, such as via a heat exchanger circulating a heating fluid so that the electrolytes enter the cell layers 48 at a sufficient temperature for charging or discharging operations. As described more fully below, the heating fluid may draw thermal energy from waste heat generated by either the source of the charging power 45 (e.g., from a generator cooling system) or the load 46 (e.g., from an equipment cooling system).

Figure 3A:
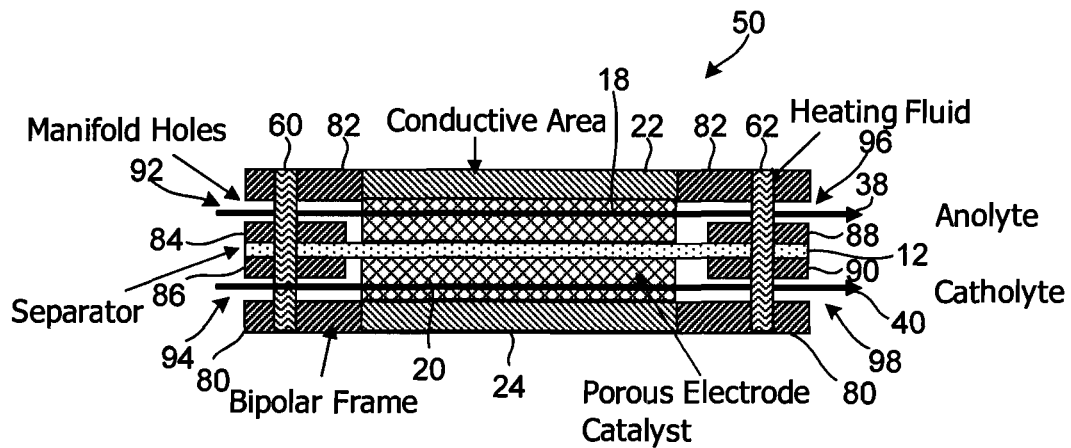
FIG. 3A is a cross section diagram of an embodiment single redox battery cell from a third viewing perspective.
Figure 3B:
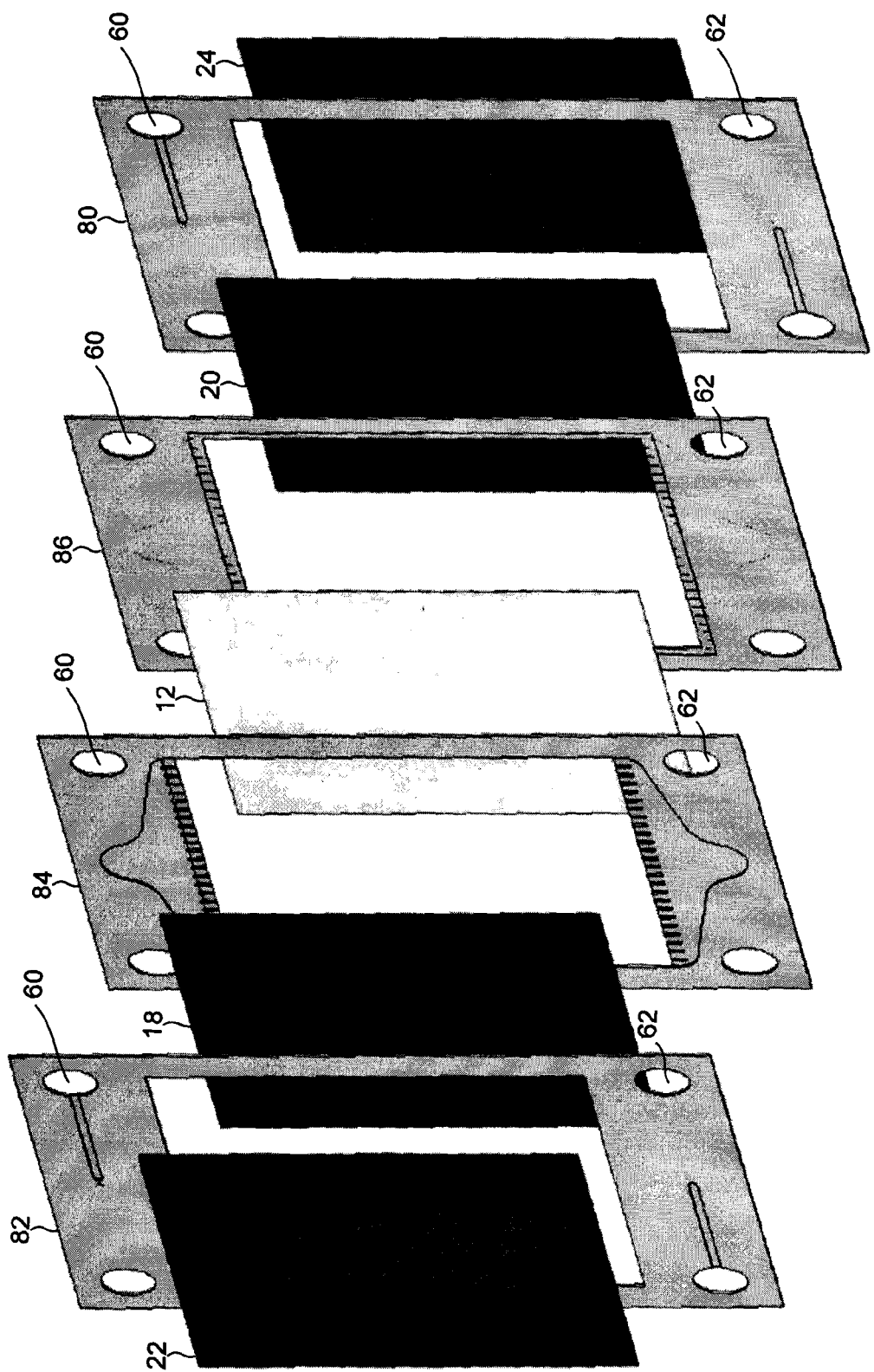
FIG. 3B is an exploded view of an embodiment single redox battery cell.

A conceptual build of a single cell of a cell section within the cell layer 48 of a flow battery stack is illustrated in FIGS. 3A and 3B. FIG. 3A shows a cross-sectional view of a single layer of a single cell chamber 50 viewed from a perspective that is perpendicular to the cross-sectional perspectives in FIGS. 1 and 2. FIG. 3B shows an exploded view of a single cell 50 of an individual single cell layer. A bipolar frame formed from first and second planar structural members 80, 82 provides the structural support for the redox flow battery stack assembly 10. The planar structural members 80, 82 may be made from polyethylene, polypropylene or other materials which are resistant to the mild acid of the electrolyte reactants. Between the planar structural members 80, 82 is formed a cavity which contains the porous electrode catalyst 18, 20 through which anolyte and catholyte reactants flow 38, 40, respectively. The porous electrode may be made from a separate carbon fiber felt material or may be part of the bipolar frame itself. The porous electrode catalysts 18, 20 may be made from carbon felt material coated with a catalyst layer. In some implementations a surface catalyst layer may be lead (Pb), bismuth (Bi) or zirconium carbide (ZrC) to facilitate reduction-oxidation reactions with the electrolytes while suppressing generation of hydrogen gas. Within each planar structural member 80, 82 may be provided cutouts or inserts for conductor surfaces 22, 24, as illustrated in FIG. 3B. The conductor surfaces 22, 24 pass electric current from the porous electrode catalysts to the exterior of the cell layer.

The anolyte and catholyte reactants are separated by a planar membrane separator 12 which is suspended between the two planar structural members 80, 82 by frame members 84, 86, 88, 90. It should be noted that the frame members 84, 86, 88, 90 maybe in the form of two exterior frames as illustrated in FIG. 3B such that frame members 84 and 88 are part of a single frame 84 and frame members 86 and 90 are part of another single frame 86. The membrane separator 12 allows ions to transport through the material while inhibiting bulk mixing of the reactants. As described more fully below with reference to FIGS. 16A-16C, the membrane separator 12 may be made from different materials so as to exhibit varying diffusion selectivity and electrical resistance as appropriate for the expected state of charge within each battery cell.

At the reactant inlet of each battery cell 50, manifold holes 92, 94 may be provided to direct the incoming electrolyte flows into the reaction area of the cell 50. In an embodiment, the manifolds may include flow directing structures to cause proper mixing of the electrolytes as they enter each reaction cell 50. Such flow directing structures may be configured to adjust or control the reactant flow in each cell 50 within the redox flow battery stack assembly 10 based upon the expected state of charge and other fluid properties within each cell.

The planar structural members 80, 82, as well as separator frame members 84, 86, 88, 90 may include passages through which heat exchanger fluid pipes 60, 62 can pass. Positioning optional heat exchanger fluid pipes 60 within the cell input manifolds 92, 94 enables heat from the thermal fluid within the pipes to raise the temperature of the reactant flows before the reactants enter the cell chamber. Similarly, positioning heat exchanger pipes 62 within the cell output manifolds 96, 98 enables the thermal fluid to extract heat from the electrolytes after the reactants leave a final cell 56, thereby conserving thermal energy and enabling the electrolytes to be returned to storage tanks at a cooler temperature. In a preferred embodiment the thermal fluid is heated to a temperature of about 40 to 65° C. for Fe/Cr reactants.

A redox flow battery stack assembly 10 may be formed by stacking layers 48 in series to form a battery stack. In this battery stack assembly the conductive surfaces 22, 24 provide the electrical connectivity between cells in each stack cell layer as described below with reference to FIG. 7A.

The planar structural members 80, 82 which form the bipolar frame may be electrically conductive throughout their area, or may be made in such a way that only the conductive surfaces 22, 24 immediately adjacent to the electrochemically active portion of the cell 50 are electrically conductive, as illustrated in FIG. 3B. In the latter embodiment, the area around the conductive surfaces 22, 24 may be electrically insulating. Electrically insulating the areas around conductive surfaces 22, 24 allows for discrete control and monitoring of the current or potential of each type of cell in the redox flow battery stack assembly 10.

To form each cell layer 48 as illustrated in FIG. 2, multiple cells 50 as illustrated in FIGS. 3A and 3B are fluidically connected to form a cascade of cells within a single layer. Thus, the cell output manifolds 96, 98 of one cell line up with the cell input manifolds 92, 94 of the next cell within the cell layer 48 so the electrolyte flows from one cell to the next within each cell layer.

In the redox flow battery system of the various embodiments the cells can be replaceable and recyclable. Since the materials of construction are primarily plastics (e.g., polypropylene or polyethylene), carbon fiber felts, and carbon fiber electrodes, the cells contain no heavy metals or toxins that could pose an environmental impact. Further, the reactants, such as Fe/Cr, are no more toxic or dangerous than battery acid. Thus, the redox flow battery system of the various embodiments are ideal for providing the energy storage capacity required for renewable energy systems in a distributed fashion close to the population and load centers.

Figure 8:
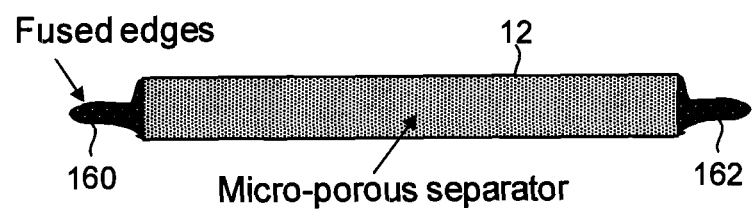
FIG. 8 is an illustration of a separator portion of a redox battery cell according to an embodiment.

As explained more fully below with reference to FIG. 8, the porous separator 12 may be fused to a dense or partially dense state around the edges to prevent electrolyte reactants from seeping through the sealed edge regions. This reduces reactant mixing and leakage out of the redox flow battery stack assembly 10. Electrolyte reactant mixing through the porous membrane separator 12 is minimized because the concentration of the reactants on both sides of the membrane separator 12 are approximately the same, as the described below, with similar ion densities, thereby eliminating concentration gradients and reducing osmotic pressure across the membrane separator 12.

A variety of reactants and catalysts may be used in the redox flow battery system. A preferred embodiment set of electrolyte reactants is based upon the iron and chromium reactions illustrated in FIG. 4. The reactants in the Fe/Cr redox flow battery system stores energy in $FeCl_3$ ($Fe^{3+}$) in the catholyte, which reacts at the positive electrode, and $CrCl_2$ ($Cr^{2+}$) in the anolyte, which reacts at the negative electrode within cells of the battery.

An undesirable non-faradic electron transfer reaction can occur between $Fe^{3+}$ and $Cr^{2+}$ if these ions come into proximity to one another. Therefore, to maintain a high level of coulombic efficiency, electrolyte cross-mixing within a Fe/Cr redox flow battery stack should be minimized. One way to minimize electrolyte cross-mixing is to use a highly selective membrane separator 12 such as Nafion®-117 ion-exchange membrane (DuPont, USA). A disadvantage of highly-selective membrane separators is that they have low ionic conductivity which results in lower voltage efficiency within the redox flow battery stack. Additionally, ion-exchange membranes are expensive, with a price in the neighborhood of $500/m$^2$. Since the DC energy storage efficiency of a redox flow battery is the product of coulombic and voltage efficiencies, an optimization tradeoff exists.

A particular embodiment of the Fe/Cr system is what is known as the mixed reactant system where $FeCl_2$ ($Fe^{2+}$) is added to the anolyte and $CrCl_3$ ($Cr^{3+}$) is added to the catholyte, as described in U.S. Pat. No. 4,543,302, the entire contents of which are incorporated herein by reference. An advantage of the mixed reactant system is that the discharged anolyte and discharged catholyte are identical. Furthermore, when the total concentration of Fe in the anolyte is the same as the catholyte, and the total concentration of Cr in the catholyte is the same as the anolyte, the concentration gradients across the membrane separators 12 are eliminated. In this way the driving force for cross-mixing between anolyte and catholyte is reduced. When the driving force for cross-mixing is reduced less selective membrane separators may be used, thereby providing lower ionic resistance and lower system costs. Examples of less-selective membrane separators include microporous membrane separators manufactured by Celgard LLC, and membrane separators made by Daramic LLC, both of which cost in the neighborhood of $5 to 10/m$^2$. By optimizing the cell characteristics for the reactant state of charge and completing the charge or discharge in one pass, the embodiments described herein provide suitably high efficiency in a redox flow battery stack comprised of materials that are approximately two orders of magnitude lower cost than in conventional redox flow battery designs.

In both the unmixed and mixed reactant embodiments, the reactants are dissolved in HCl, which is typically about 1-3 M concentration. The electrocatalyst, which may be a combination of Pb, Bi and Au or ZrC, is provided at the negative electrode to improve the rate of reaction of recharging when $Cr^{3+}$ in the anolyte is reduced to $Cr^{2+}$, thereby reducing or eliminating hydrogen evolution. Hydrogen evolution is undesirable as it unbalances the anolyte from the catholyte and is a competing reaction to $Cr^{3+}$ reduction leading to a reduction in coulombic efficiency.

The cell, cell layer and redox flow battery stack designs described herein can be used with other reactant combinations that include reactants dissolved in an electrolyte. One example is a stack containing the vanadium reactants V(II)/V(III) or $V^{2+}/V^{3+}$ at the negative electrode (anolyte) and V(IV)/V(V) or $V^{4+}/V^{5+}$ at the positive electrode (catholyte). The anolyte and catholyte reactants in such a system are dissolved in sulfuric acid. This type of battery is often called the all-vanadium battery because both the anolyte and catholyte contain vanadium species. Other combinations of reactants in a flow battery that can utilize the embodiment cell and stack designs include Sn (anolyte)/Fe (catholyte), Mn (anolyte)/Fe (catholyte), V (anolyte)/Ce (catholyte), V (anolyte)/$Br_2$ (catholyte), Fe (anolyte)/$Br_2$ (catholyte), and S (anolyte)/$Br_2$ (catholyte). In each of these example chemistries, the reactants are present as dissolved ionic species in the electrolytes, which permits the use of battery cell and stack designs in which electrolyte flow through a plurality of battery cells series along the flow path (i.e., cascade flow), with the cells and having different physical properties along the flow path (cell size, type of membrane or separator, type and amount of catalyst). A further example of a workable redox flow battery chemistry and system is provided in U.S. Pat. No. 6,475,661, the entire contents of which are incorporated herein by reference.

Figure 4:
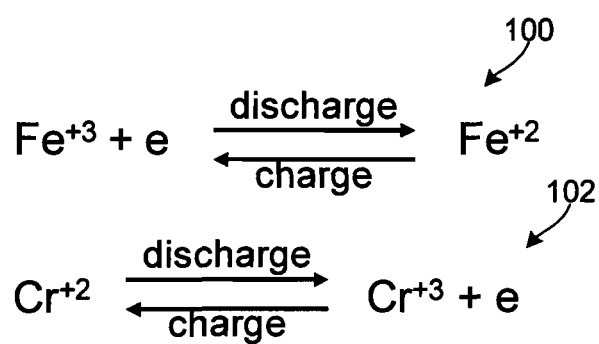
FIG. 4 illustrates two chemical equations of a chemical reaction that may be employed within a redox battery embodiment.

A number of cell chambers are formed in each bipolar frame in a redox flow battery stack array. FIG. 2 depicts a 1×3 array, but any combination is possible, e.g., a 2×2 or a 1×4 array. As described above, the electrolyte reactant flows from one cell 52, 54, 56 to the next in a cascade arrangement. This cascade flow means that a cell 52 closest to the inlet will see higher reactant concentrations than downstream cells 54, 56 in the discharge mode. For example, for the Fe/Cr system in discharge mode, the $Fe^{3+}$ and $Cr^{+2}$ species are the relevant ion concentrations as shown in FIG. 4. This cascading of battery cells arrangement provides the advantage of limiting shunt currents and improving overall reactant utilization. Shunt currents are formed due to short circuiting within the liquid reactants. It is therefore advantageous to form long conductive paths between one cell and the next, as well as limit the stack voltage. The various embodiments accomplish both objectives by flowing the reactants across multiple cells within the same layer. This cascade flow regime also improves reactant utilization compared to that of a single cell per layer stack arrangement. Improving reactant utilization helps to improve the roundtrip DC efficiency of the redox flow battery stack assembly 10 and reduces or eliminates the need to re-circulate the reactants. Recirculation can be disadvantageous because it may involve more pumping power per kW or stored capacity, which increases parasitic losses.

Due to the variation in reactant ion concentrations as the reactants flow through the various cells in each layer, the amounts of catalytic coating may be varied to match the state of charge condition in each of the respective cells. Additionally, the catalytic coating formations applied to the porous electrodes 18, 20 may be varied in formulation (e.g., varying amounts of zirconia or bismuth compounds) to better match the state of charge condition in each cell. For example, typically the cell with the lower reactant concentrations will require a higher catalyst loading on the porous electrodes to achieve optimum performance.

The various embodiments include a unique redox flow battery stack configuration that includes multiple independent cells within a flow path as illustrated in FIG. 2, with each independent cell configured in terms of size, shape, electrode materials and membrane separator layer 12 material for optimum average performance with the state-of-charge of reactants within each cell. FIG. 5 summarizes some of the design configuration parameters that can be controlled and the manner in which the parameters are varied along the reactant flow path in order to maximize electrical performance of each independent cell in the redox flow battery stack assembly 10. As illustrated in design trend line 112, some design parameters—illustrated as Group A parameters—may be decreased from one end of a cell layer 48 to the other to configure the battery design so that the values decrease from reactant inlet to outlet from the cell layer in discharge mode and increase from reactant inlet to outlet from the cell layer in charging mode.

As illustrated in design trend line 116, other design parameters—illustrated as Group B parameters—may be increased from one end of a cell layer 48 to the other to configure the battery design so that the values increase from reactant inlet to outlet from the cell layer in discharge mode and decrease from reactant inlet to outlet from the cell layer in charging mode. As illustrated in FIG. 5, the design parameters that may be varied to configure battery cell designs according to design trend line 112 include: membrane selectivity; charge catalyst loading; charge catalyst activity; temperature (when optimizing charging); chamber volume (when optimizing charging); mass transport (when optimizing charging). The design parameters that may be varied to configure battery cell designs according to design trend line 116 include: ionic conductivity; discharge catalyst loading; discharge catalyst activity; temperature (when optimizing discharging); chamber volume (when optimizing discharging); mass transport (when optimizing discharging).

For example, as described above, the discharge catalyst loading and discharge catalyst activity (both Group B design parameters) may be increased in each cell along the flow path of redox flow battery stack assembly 10 from inlet to outlet in the discharge mode and decreased in each cell along the flow path of redox flow battery stack assembly 10 from inlet to outlet in the charge mode to compensate for decreasing reactant concentrations, as indicated by the design trend line 116.

Similarly, the charge catalyst loading and charge catalyst activity (both Group A design parameters) may be decreased in each cell along the flow path of redox flow battery stack assembly 10 from inlet to outlet in the discharge mode and increased in each cell along the flow path of redox flow battery stack assembly 10 from inlet to outlet in the charge mode to compensate for decreasing reactant concentrations, as indicated by the design trend line 112. The specific catalyst loading and catalysts activity implemented within each cell along the flow path can be determined using the design trend line 116 with respect to discharging, trend line 112 with respect to charging, and the number of cells in the path.

Using the design trend lines 112, 116 illustrated in FIG. 5, in some redox flow battery embodiments provide improved electrochemical performance by optimizing design parameters, such as the charge and discharge catalyst loadings and/or catalyst activities, in each layer in either direction through the battery stack, and flowing the reactants through the battery stack in one direction for discharging and in the opposite direction for charging. In some embodiments, such as described below with reference to FIGS. 14-15C, the reactants are directed through the redox flow battery in one direction in the charging mode and in the opposite direction in the discharging mode. In other embodiments, such as described below with reference to FIGS. 13A-13D, separate charging redox flow battery stacks are provided for charging and for discharging so the reactants flow in a single direction consistent with the cell configuration. In a third embodiment described below with reference to FIG. 1, electrolyte reactants flow through the redox flow battery stack in a single direction for both charging and discharging with the battery cells configured as a compromise between charging and discharging (e.g., preferentially configured for charging or discharging) so that the system can switch between charging and discharging modes very quickly simply by electrically disconnecting the redox flow battery stack assembly 10 from the charging power source (e.g., with an electrical switch) and connecting the stack to the load, or vice versa.

Similarly, the various embodiments may control the temperature of reactants as they flow through the redox flow battery stack depending upon whether the stack is charging or discharging. FIG. 5 illustrates in design curves 112 and 116 how the temperature may be controlled in an embodiment along the flow path through the redox flow battery cell layer 48 and stack assembly 10. For the chosen optimized half-cycle, at each cell along the reactant flow path in the discharge mode the temperature is increased so the cell closest to the outlet, which will have the lowest concentration of reactants, runs at a higher temperature than the cell closest to the inlet. The design curve to employ a given redox flow battery cell layer 48 and stack assembly 10 may be based on whether a greater improvement in battery efficiency is achieved by optimizing the discharge reactions or the charge reactions. In the Fe/Cr system, the anolyte charge reaction has the most limited reaction rates so design trend line 112 would be selected for the temperature profile design parameter. As with catalyst loading and catalysts activity, the redox flow battery cell layer 48 and stack assembly 10 can be configured so that reactants flow in one direction for charging and in the other direction for discharging, or as two separate redox flow battery stacks can be used with one configured for charging and the other configured for discharging.

In a similar manner, the various embodiments improve electrochemical performance by configuring the redox flow battery stack assembly 10 so that the reactant mass transport rate varies from cell to cell along the flow path. FIG. 5 also illustrates in design curve 116 how cells are configured so that the reactant mass transport rate increases in each cell along the flow path from inlet to outlet in the discharge mode, and decreases in each cell along the flow path from the inlet to the outlet while in the charging mode. The mass transport rate may be increased by decreasing the physical dimensions of each cell and selecting electrode catalyst materials to vary the electrode porosity. Thus, an embodiment redox flow battery stack assembly 10 may have a restricted flow area at one end and a more open and less constricted flow area at the other end, with the reactant mass transport rate increasing in each cell along the reactant flow path when operated in the discharge mode, and decreasing in each cell along the reactant flow path when operated in the charging mode.

In a similar manner, embodiment redox flow battery cells may be configured with different membrane separator 12 materials along the reactant flow path. FIG. 5 illustrates in the design curve 112 how the membrane separator 12 selectivity (i.e., the degree to which the reactants are restricted from moving through the separator) in each cell is varied along the reactant flow path. Cells near the inlet to the redox flow battery stack assembly 10 in the discharge mode will experience a high concentration of reactants (e.g., $Cr^{2+}$ and $Fe^{3+}$), and thus mixing of the reactants through the membrane separator 12 will result in greater losses of stored energy than is the case in cells near the outlet of the assembly. Therefore, the various embodiments achieve greater electrical charge/discharge efficiency by limiting the diffusion of reactants through the membrane separator 12 near the battery inlet. On the other hand, membrane separator materials which have high membrane selectivity typically also exhibit high ohmic losses (i.e., electrical resistance), which increases energy losses through the battery due to internal resistance. The countervailing properties result in the design curve 112 shown in graph 110 in FIG. 5 used to select separator materials depending upon the number of cells in the reactant flow path.

Thus, in an embodiment redox flow battery stack assembly 10 may include cells at one end of the flow path having membrane separators 12 made from a material with high membrane selectivity at the cost of greater ohmic losses, while cells at the other end of the flow path will have membrane separators 12 made from a material with lower ohmic losses. This design approach works because the driving force for cross mixing is greatly diminished due to the low concentrations of spontaneously-reacting active species at the outlet end in the discharge mode and at the inlet end in the charge mode. In the case of an Fe/Cr redox flow battery (FIG. 4) the concentration of $Cr^2+$ and $Fe^3+$ species are at a minimum at the outlet end in the discharge mode and at the inlet in the charge mode.

As mentioned above, the particular design configuration of each cell within a particular redox flow battery stack assembly 10 may be determined by applying the design trend lines illustrated in FIG. 5 to the number of cells along the reactant flow path within the assembly. Cells may be configured with design parameters selected for the average electrolyte concentration expected within each cell, which may provide a stair step approximation of the design trend lines illustrated in FIG. 5. By increasing the number of independent cells along the reactant flow path, the cell design parameters can better match the design trend lines. However, increasing the number of independent cells may add design complexity which may increase system costs. Thus, the number of cells and the design configurations applied to each cell will be varied based upon the design goals and performance requirements of particular implementations.

Figure 6:
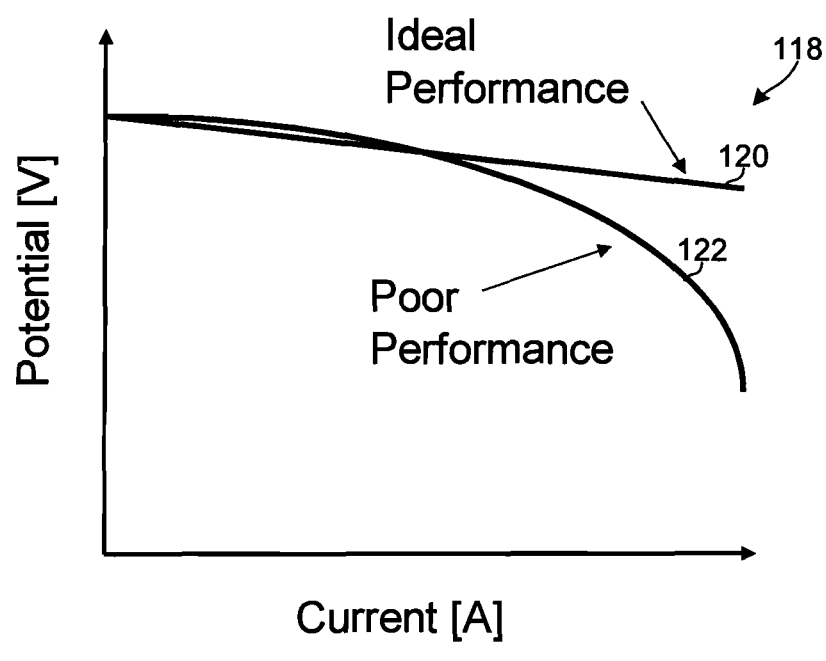
FIG. 6 is a graph of electrical potential versus current of a redox battery.

By varying the design configurations of independent cells along the reactant flow path through the redox flow battery cell layer 48 and stack assembly 10 the various embodiments are able to achieve significant charging/discharging performance improvements over conventional redox flow battery designs. This performance improvement is illustrated in FIG. 6 which shows the polarization curve 122 (output voltage as a function of output current) of a convention redox flow battery that does not include the embodiment enhancements. This poor performance curve 122 falls well below the ideal performance curve 120 which may be approached by the embodiment redox flow battery designs implementing the embodiment configurations described above.

Figure 7A:
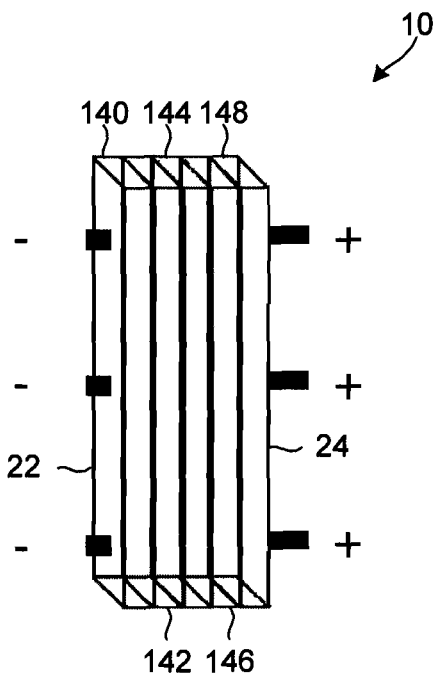
FIG. 7A is a schematic diagram of a redox flow battery stack according to an embodiment.

By forming the conducting regions (e.g., conductive surfaces 22, 24) only on the active areas of the bipolar frame as illustrated in FIG. 3B, the redox flow battery stack assembly 10 can be made quite flexible. A plurality of cell layers 140-148 can be formed into a stack by assembling the layers one on top of another so that the conductive surfaces 22, 24 of each cell chamber in the cell layers 48 (one of which is illustrated in FIGS. 3A and 3B) connect electrically in series, and turning the stack into a vertical orientation as illustrated in FIG. 7A. Positioning the redox flow battery stack assembly 10 in a vertical orientation, so that one cell 52 within a layer is on the bottom and the opposite cell 56 is on the top, aids in venting any hydrogen that may be formed during charging or discharging reactions. Separate terminals may be coupled to the exterior conductive surfaces 22, 24 as depicted in FIG. 7A in order to connect the battery to a load. Coupling a number of terminals in the manner illustrated in FIG. 7A, can enable separate monitoring of each of the cell columns (i.e., the cells connected electrically in series across a stack) along the flow path which can enable better control of the stack. By monitoring the voltage across each of the cell columns along the vertical length, the precise state of charge can be determined. Depending on the power demand placed upon the redox flow battery stack assembly 10, the battery can be fully utilized for peak demand or just partially utilized when the demand is small. Each stack can be individually controlled in terms of current loading to provide for longer life or higher efficiency.

Figure 7B:
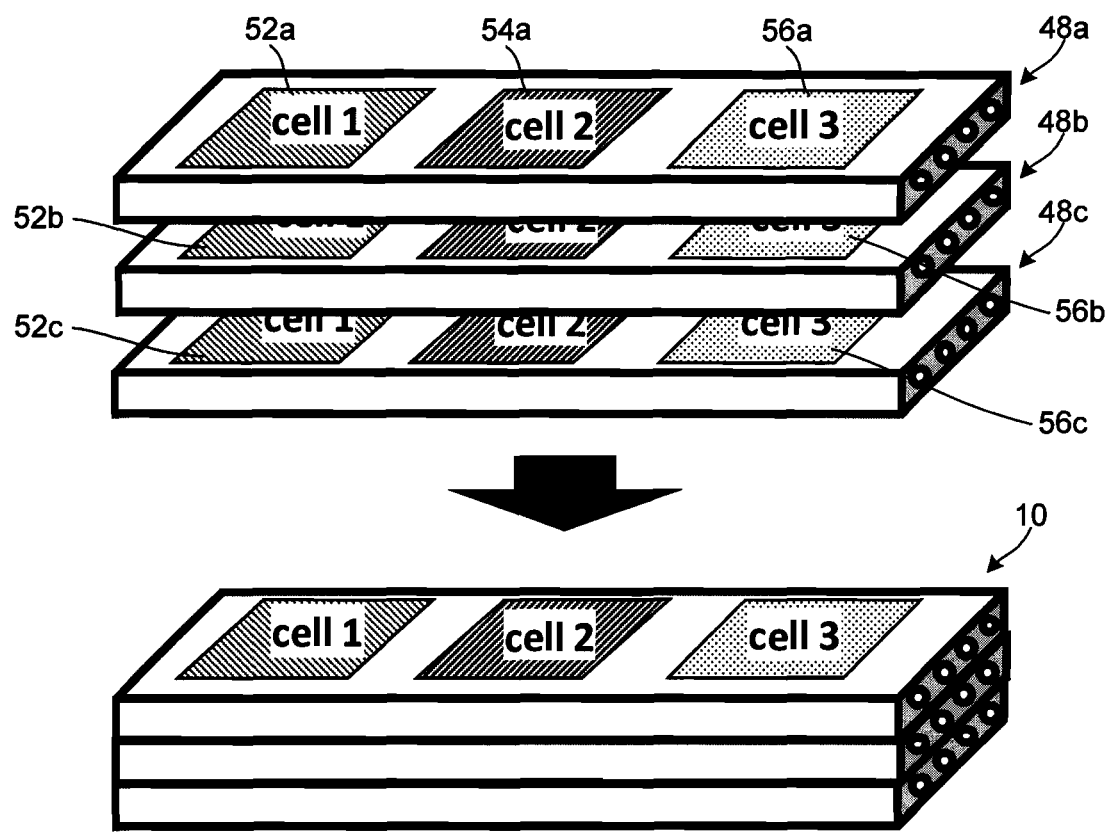
FIG. 7B is an assembly drawing illustrating how cell layers can be assembled into a flow battery stack according to an embodiment.

FIG. 7B illustrates an embodiment of a redox flow battery stack assembly 10 in which the stack is formed by stacking cell layers 48 which are formed in unibody frames 48a, 48b, 48c. As illustrated in FIG. 7B, in this embodiment, individual cells are formed within frames that span the length of the cell layer. As mentioned above, the design parameters of each cell 1 52a, 52b, 52c are configured according to the charge state of reactants in those cells, and thus may be different from the design parameters of each cell 3 56a, 56b, 56c within the cell layers 48a, 48b, 48c of the stack 10.

Figure 7C:
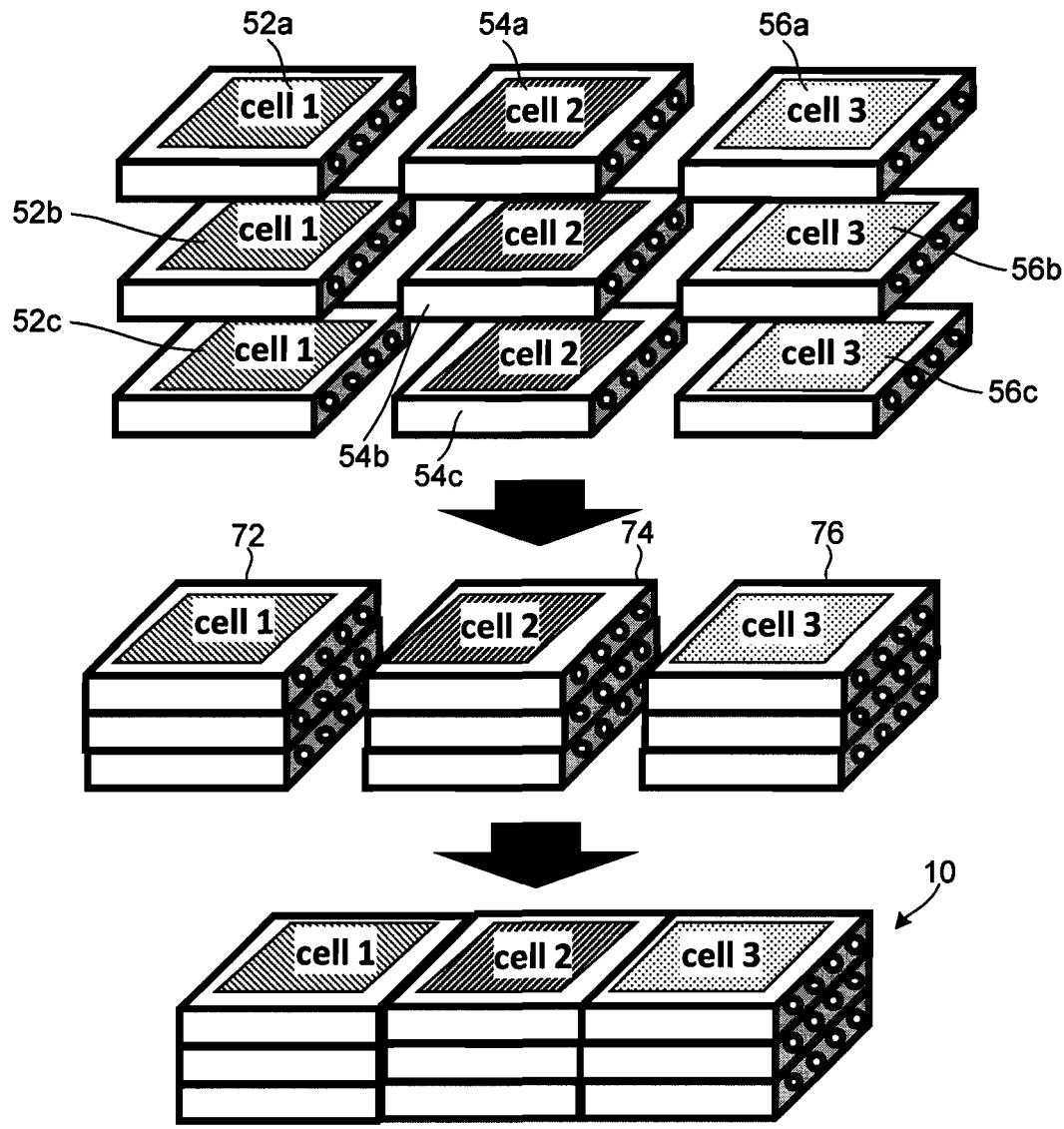
FIG. 7C is assembly drawing illustrating how cell layers can be assembled into a flow battery stack according to an alternative embodiment.

Instead of assembling cells within a unibody frame for each cell layer, each cell may be assembled within cell frames 52a-56c in an embodiment illustrated in FIG. 7C, as well as FIG. 3B. In this embodiment, the redox flow battery stack can be assembled by fitting cells 52a, 54a, 56a (e.g., electrode 18, membrane separator 12, and electrode 20 of FIG. 3B) into cell frames (e.g., frames 84 and 86 of FIG. 3B) and then stacking the like design framed cells (e.g., all cell 52's in a configuration like FIG. 3A) with interleaved bipolar plates (e.g., conductive areas 22 within frame 82 of FIG. 3B) to form cell columns 72, 74, 76, which are then fit together to complete the stack 10.

As mentioned above, one source of losses in a redox flow battery is due to mixing or leakage of reactants along the edges of the membrane separator 12. As illustrated in FIG. 8, such losses may be eliminated by sealing the membrane separator material edges 160, 162. Such edge sealing may be accomplished by fusing the material by heating it to an elevated temperature while compressing it, such as with an iron or vise. Alternatively, gaskets can be used around the periphery of each cell chamber for sealing.

Figure 9:
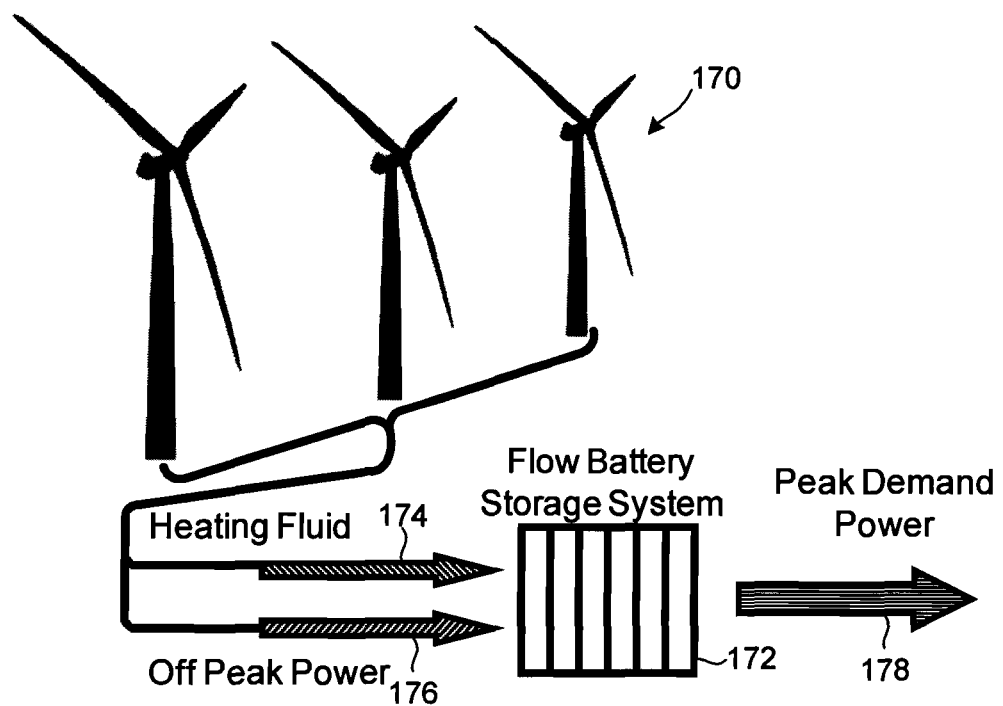
FIG. 9 is system diagram of a wind farm system implementation embodiment with thermal integration.
Figure 10:
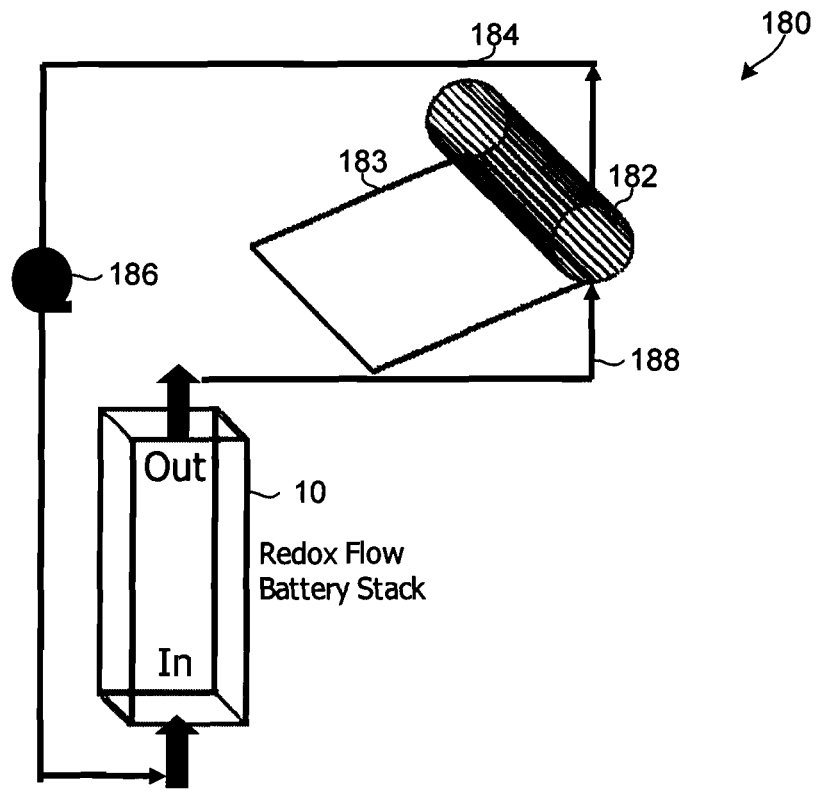
FIG. 10 is system diagram of a solar power system implementation embodiment with the electrolyte fluid heated directly by the solar panels.
Figures 11, 12:
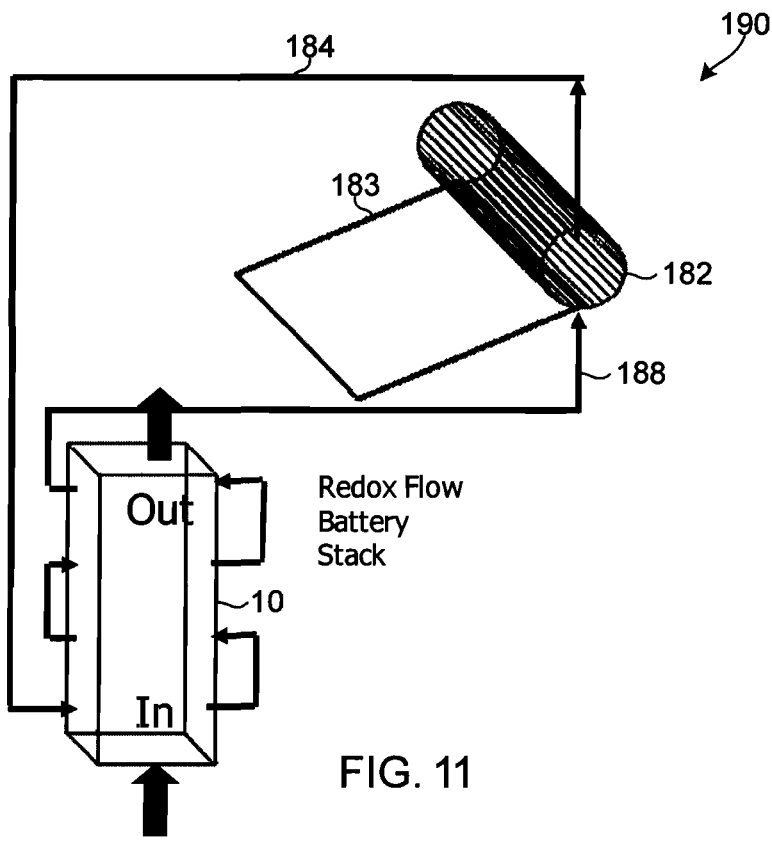
FIG. 11 is system diagram of an alternative solar power system embodiment with thermal integration via a secondary fluid flowing around the power stack.
FIG. 12 is a table of system design parameters according to an embodiment.

As mentioned above, the performance of a redox flow battery stack assembly 10 can be enhanced by heating the reactants to optimum temperatures at various stages within the battery flow path. Various embodiments accomplish such heating by using waste heat or alternative energy heat sources, thereby enhancing electrical performance while reducing parasitic losses. The various embodiments have a number of useful applications in energy generation applications as well as industrial applications which use electrical power and generate waste heat (e.g., heat sinks from air-conditioning and equipment cooling systems). As discussed in the embodiments below, alternative energy sources such as wind turbines and solar panels require cooling to enhance performance and prevent mechanical breakdown. Larger energy storage systems using the Fe/Cr redox flow battery technology can be thermally integrated with wind turbine farms and photovoltaic solar farms as illustrated in FIGS. 9-11 to use low grade waste heat in a complimentary fashion. For example, a 1 MWh/4 MWh redox flow battery system can be thermally and electrically connected to a small number of wind turbines.

Integrating a wind turbine system with a redox flow battery system provides a renewable power generation system which can operate more efficiently and economically than a wind turbine farm that does not have energy storage capacity. Such a system can store power whenever the wind is blowing, and meet the power demands of the electrical power grid regardless of the current wind conditions. This enables a wind turbine/redox flow battery system to meet utility contractual obligations to provide consistent power to the electrical power grid, thereby avoiding economic penalties for failing to supply contracted power levels during times of little or no wind. Additionally, the system allows electrical power to be supplied to the power grid during periods of peak demand, enabling the system owner to sell electrical power at the most favorable rates regardless of when peak winds occur.

An embodiment energy generation and storage system combining a wind turbine farm 170 with a redox flow battery is illustrated in FIG. 9. As mentioned above, wind turbines generally require a cooling water system to ensure that the mechanical systems operate within design temperature ranges as described. The cooling water circulated through the turbine structures 170 can be used as a heating fluid 174 for the redox flow battery system 172. Thus, the waste heat generated by mechanical friction in the wind turbines can be partially recovered in terms of overall energy output performance by using that energy to maintain the reactants in the flow battery system 172 at an optimum operating temperature. The electrical power 176 generated by the wind turbine farm 170, which is often generated at times that do not correspond with peak power demand, can be stored in the redox flow battery system 172. The stored electrical power 178 can then be used to provide dispatchable peak power to the grid in response to demand, such as during times of peak power demand. FIG. 9 depicts a 1 MW flow battery system integrated with three 600 kW wind turbines. Thus, a redox flow battery stack assembly 10 provides an ideal solution to the energy storage challenge of inconsistent energy generators while utilizing the waste heat required for cooling such alternative energy systems.

Similar to the wind turbine/redox flow battery system described above with reference to FIG. 10, integrating a solar energy conversion system with a redox flow battery system provides a renewable power generation system which can operate more efficiently and economically than a solar generation system that does not have energy storage capacity. Such a system can charge the battery to store power whenever the sun is shining, and meet the power demands of the electrical power grid regardless of the time of day or weather conditions. This enables such a solar generator/redox flow battery system to meet utility contractual obligations for providing consistent power to the electrical power grid, thereby avoiding economic penalties for failing to supply contracted power levels during times of cloudy weather or at night. Additionally, the system allows electrical power to be supplied to the power grid during periods of peak demand, enabling the system owner to sell electrical power at the most favorable rates regardless of the time of day or weather.

A solar energy conversion system, such as a photovoltaic (PV) array, concentrating photovoltaic (CPV) array, a solar thermal energy power plant, or a solar hot water system, can be thermally and electrically integrated with the redox flow battery system to provide a more economical and efficient renewable energy generation system 180, 190 as illustrated in FIGS. 10 and 11. A solar collector 183 may generate electricity as well as capture solar heat energy. In a solar electric generation system water may be circulated through or under the photovoltaic panels to maintain the photovoltaic cells within design operating temperatures. The heat energy received by the solar collector 183 may be stored in a thermal storage tank 182. As described above, the Fe/Cr redox flow battery operates at optimum efficiency at temperatures in the range of about 40 to 65° C. Heating fluids (e.g., water) from the thermal storage tank 182 can be use to provide the required heat energy to maintain this temperature in the redox flow battery stack assembly 10 without incurring costly parasitic losses or additional operating costs (and greenhouse gas emissions), as would be the case in an electric or gas fired heating system. Solar collectors and thermal storage systems represent a very mature technology, particularly in residential markets. In an embodiment, the electrolyte itself can be the working fluid in a thermosiphon hot water system.

Thermally integrating a solar thermal energy collection system with a redox flow battery system can be accomplished in at least two configurations. In a first configuration illustrated in FIG. 10, the solar collector 183 and thermal storage tank 182 are designed to hold the electrolyte reactant, which is a solution of HCl in the case of the Fe/Cr system. In this configuration the reactant is raised to a temperature of about 40 to 65° C. in the solar collector 183 and thermal storage tank 182, so that reactant flowing out of the thermal storage tank 182 is pumped (via pump 186) directly into the redox flow battery stack assembly 10 where it takes part in the electrochemical reactions. Reactants exiting the redox flow battery stack assembly 10 are returned to the thermal storage tank 182 for reheating. Alternatively, a closed loop heating fluid can be used in the solar collector 183 with heat transferred from the heating fluid to the electrolyte stored in the thermal storage tank 182 in a heat exchanger within the tank as in the closed loop solar hot water system embodiment.

In a third configuration illustrated in FIG. 11, hot water (or another fluid) produced by solar collector 183 may be used as the heating fluid stored in the thermal storage tank 182 which is pumped into and around the redox flow battery stack assembly 10, such as through heat exchange tubes. In this configuration, the heating fluid from the thermal storage tank 182 does not mix with the electrolyte reactants.

Thermally integrating a solar collector or solar energy conversion system with a redox flow battery system can use either pump circulation as illustrated in FIG. 10, or natural circulation (thermo siphon) as illustrated in FIG. 11. Pumping the heating fluid through the redox flow battery stack assembly 10 (as the reactants or as a heating fluid flowing through heat exchanger pipes) can provide improved thermal performance, but at the cost of parasitic losses from the power consumed by the pump 186. In a natural circulation configuration as illustrated in FIG. 11, the buoyancy of the heated water or reactant is used to cause the fluid to circulate through the redox flow battery stack assembly 10 without the need for a pump. The hot water rises from the top of the thermal storage tank 182 and passes through the redox flow battery stack assembly 10 where it is cooled, increasing its density. With no moving parts or fossil fuels required the solar heated natural circulation configuration does not suffer parasitic losses which would limit the overall roundtrip efficiency of the energy storage system. The natural circulation configuration avoids parasitic losses associated with running cooling pumps and provides a very simple system with a single working fluid, which may well be a good solution for smaller systems because of the constrained tank volume. On the other hand, enabling natural circulation flow may require configuration compromises, such as locating the redox flow battery stack assembly 10 above the thermal storage tank 182, such as on the roof of a building in close proximity to the solar collector 183 or thermal storage tank 182.

The thermosiphon solar heating system operates in closed loop configuration for both embodiments illustrated in FIGS. 10 and 11. The thermal storage tank 182 can be of a manageable size for larger energy storage systems because it is just circulating a high heat capacity fluid (e.g., water) when used to maintain the temperature of the redox flow battery stack assembly 10.

The table in FIG. 12 exemplifies sizing parameters for commercially available solar hot water systems that would be suitable for use with various configurations of redox flow battery systems.

Thermal integration of a redox flow battery system with conventional power generation systems, such as nuclear and coal-fired power plants, can provide significant energy and economic efficiencies since such systems generate a large amount of low grade waste heat. As described above, thermally integrating the redox flow battery system with sources of waste heat improves the battery operating efficiency without the expense or parasitic losses of electrical or fossil fuel heaters. Electrically integrating a redox flow battery energy storage system with conventional power generation systems also provides significant economic advantages since the battery system can enable base-loaded power plants to accommodate grid support (ancillary services) or peak power demands without varying their output. As is well known, nuclear and coal-fired power plants operate most efficiently and economically when run at constant power levels. Peak power demands can be met by charging the redox flow battery energy storage system during periods of reduced demand (e.g., off-peak hours in the late evening) and then augmenting the electrical output of the power plant with electricity drawn from the battery system during periods of peak power demand. Such a combined power plant/energy storage system can be economically advantageous since electrical power can be generated in the most economical manner (i.e., at constant output 24 hours per day) but sold at times of peak demand when electricity prices are greatest. Further economic benefits can be obtained by adding a redox flow battery energy storage system to an established conventional power plant to meet growing demands for peak power without building additional power plants. The sizing flexibility of redox flow battery systems, in which energy storage capacity can be increased simply by increasing the size or number of reactant storage tanks, means the economic advantages of adding a flow battery storage system to a conventional power plant can be obtained without having to invest in a system sized for future demands.

Geothermal energy can also be used to heat the reactant storage tanks. This approach could provide a stable system with a large amount of thermal inertia. Low grade geothermal energy can be used to provide heat to the redox flow battery stack assembly 10 or to the reactant storage tanks. In this embodiment heat is obtained from geothermal energy deep within the Earth which can be conveyed by a thermal fluid around the reactant storage tanks and/or through a heat exchanger before and after the battery stack.

The redox flow battery storage system does not necessarily need to be placed in close proximity to the power generation system. For example, if there is a low cost source of waste heat from an industrial process or a solar array (PV or CPV) used to a building, it may be economically and efficiently advantageous to locate a redox flow battery within or near the building in which the process is accomplished or the solar array located. In this manner, the waste heat from the industrial process or on-site power or thermal energy generation can be used to enhance the battery efficiency, while the energy storage capacity of the battery is used to meet peak power demands or enable purchasing electrical power during off-peak hours when electricity rates are lower. Thus, if the industrial process uses large amounts of electricity, thermally and electrically integrating the process with a redox flow battery system can meet the process's demand for electrical power while electricity is purchased to charge the battery system during off-peak hours when electricity rates are lower. This type of implementation may reduce cooling costs for the industrial process over periods when the electricity rates are high, thus providing further cost savings.

All the previously mentioned low grade heat sources can also be applied to heating the reactant tanks instead of or in addition to heating the redox flow battery stack assembly 10. Heating the reactant tanks enables the system to respond very quickly to load changes without any thermal management problems because the reactant fluid is constantly maintained at the operating temperature ready to be utilized in the flow battery. Costs and complexities of heating and insulating the reactant storage tanks may be offset by the cost advantages of simplifying the redox flow battery stack design because this approach eliminates the need for heat exchanger elements within the battery stack assembly. Further, combining these alternative embodiments, such as heating storage tanks and providing heat exchangers within the stack may provide the optimum design approach for providing clean, low cost and reliable heat to the redox flow battery.

Four additional example system embodiments of the redox flow battery system for use in battery energy storage systems (BESS) are illustrated in FIGS. 13A-13D. These example embodiments are intended to illustrate how various battery system components can be assembled into energy generation systems in order to provide stored electrical power to different applications.

Figure 13A:
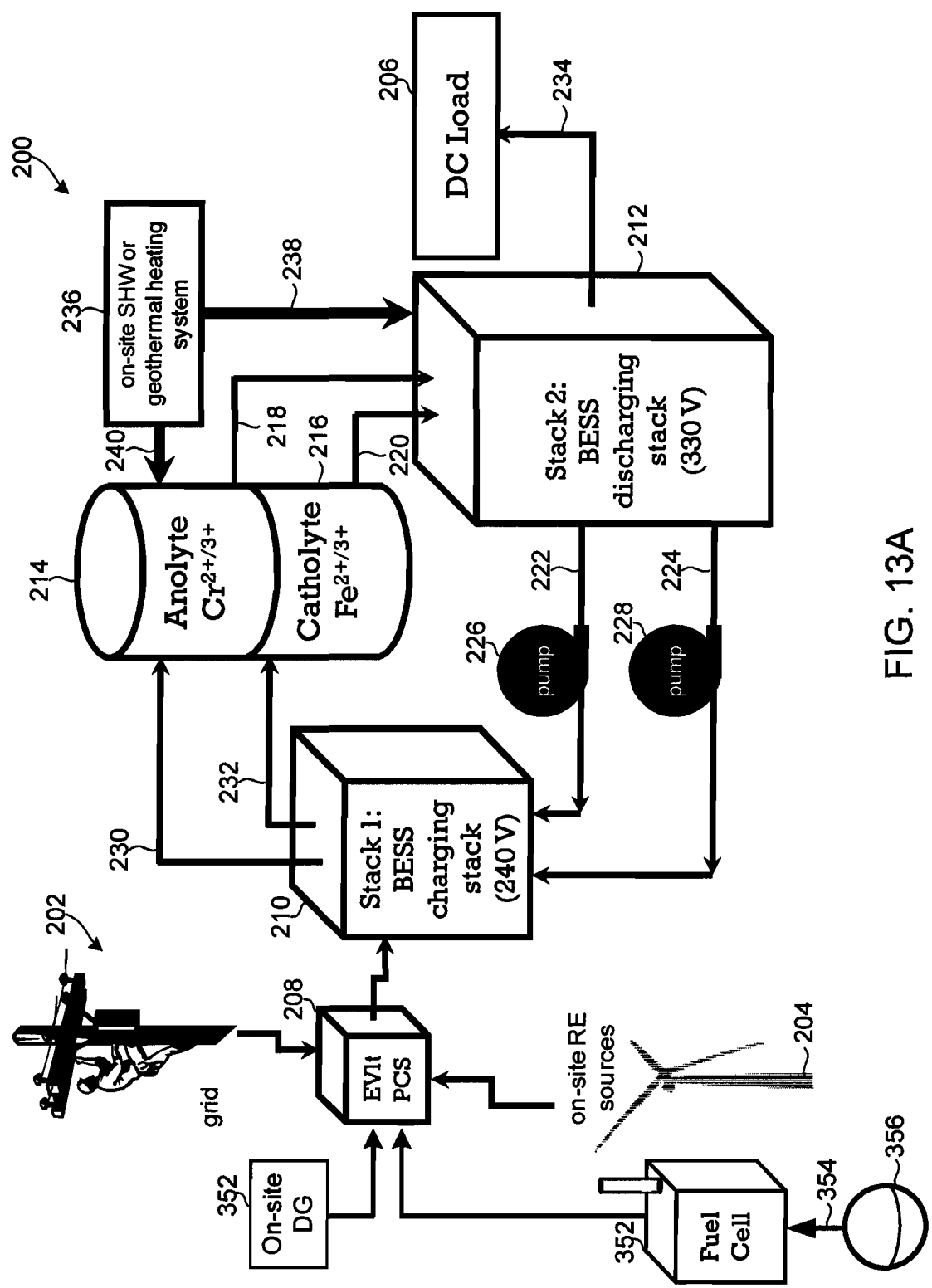
FIG. 13A is a system block diagram of an embodiment system including a redox flow battery used as an AC to DC power conversion/isolation direct current electrical power source.

In a first example embodiment illustrated in FIG. 13A, a redox flow battery energy storage system configuration different from the system shown in FIG. 1 is used to provide a reliable source of direct current (DC) electrical power 200 that is fully isolated from fluctuations and surges of the utility power grid. This embodiment system uses dual redox flow battery stacks 210, 212 to enable simultaneous charging and discharging operations. In this embodiment system 200, electrical power may be received from a conventional electric utility grid 202, from an on-site renewable energy source 204, such as a wind turbine farm or solar photovoltaic panels, and/or from an onsite distributed generator (DG) 205, such as a fuel cell 352, a propane generator (not shown), a natural gas micro-turbine (not shown), or a diesel generator set (not shown). Power from the grid 202, some renewable energy sources 204 or distributed generator 205 may be rectified to generate DC power in a power conversion system 208, while DC power from a fuel cell 352, photovoltaic solar source 183 (see FIG. 10), or other DC generator will not require the rectifier. The received DC power may be provided to a first redox flow battery stack 210 which is configured for and dedicated to charging the redox flow battery reactants. As DC power is provided to the first (charging) redox flow battery stack 210, anolyte and catholyte reactants are pumped into the charging redox flow battery stack 210 by pumps 226, 228. The DC power causes the anolyte and catholyte reactants to be charged by converting $Fe^{+2}$ ions to the $Fe^{+3}$ state and $Cr^{+3}$ ions to the $Cr^{+2}$ state (see FIG. 4). Such charged reactants emerge from the first redox flow battery stack 210 in outlet flows 230, 232 which are directed to the anolyte tank 214 and catholyte tank 216, respectively. Thus, electrical power is stored in the $Fe^{+3}$ and $Cr^{+2}$ electrolyte concentrations in the storage tanks 214, 216.

Electrical power is generated from the chemical energy stored in the electrolytes in a second (discharging) redox flow battery stack 212. Electrolyte from the storage tanks 214, 216 is directed to the second redox flow battery stack 212 via inlet flows 218, 220. Within the second redox flow battery stack 212, electricity is generated by converting $Fe^{+3}$ ions to the $Fe^{+2}$ state and $Cr^{+2}$ ions to the $Cr^{+3}$ state (see FIG. 4). The generated electrical output 234 is provided to a DC load 206.

Reactants flowing out of the second redox flow battery stack 212 (outflows 222, 224) may be pumped into the first redox flow battery stack 210 for recharging, thereby providing a single charging and discharging loop. Since the electricity provided to the DC load 206 is generated from electrolytes in the second redox flow battery stack 212, the output current is completely isolated from the electrical sources of charging power, enabling the output power to reliably follow the DC load without power spikes or power drops. This arrangement ensures power variations from the grid, on-site renewable energy generators, or on-site distributed generators do not disrupt power to the DC load 206. Conversely, the power fluctuations associated with a large and widely varying load, such as an electric vehicle charging station or industrial batch process (e.g., a mixer), remain isolated from the utility grid 202 and other energy sources. This is beneficial to utilities as it reduces stress on the grid and also is beneficial to charge station owners as it circumvents large power demand charges. The unique characteristics of the redox flow battery system also enables DC☐DC conversion to be accomplished with high overall system efficiency by a suitable choice of the number of cells connected in series within each stack to achieve V1 in the charge stack and V2 in the discharge stack. Also, the facility owner can choose when to charge the system so as to select the lowest cost electricity in order to maximize gross profit margins.

As described above, electrical efficiencies of the first and second redox flow battery stacks 210, 212 can be enhanced by heating the reactants to an elevated temperature, such as about 40 to 65° C., using on-site waste heat from equipment or facility cooling systems or geothermal heating systems 236. As described above, a heating fluid from waste heat recovery systems, solar hot water system, or geothermal heating systems 236 may be provided to a heat exchanger within the redox flow battery stacks 210, 212 (as illustrated in flow 238) and/or to heat the reactant storage tanks 214, 216 (as illustrated in flow 240).

The embodiment illustrated in FIG. 13A provides a source of power for the load 206 which is electrically isolated from the variability of the input power, such as the utility grid 202, on-site renewable energy source 204 or onsite distributed generator 205. If the design goal is to simply provide electrical isolation, the system 200 may use small electrolyte reactant tanks 214, 216 (e.g., sufficient tankage to accept thermal expansion of the electrolyte and to store the electrolytes when the redox flow battery stack assemblies 210, 212 are drained for maintenance). This is because the reactants can be charged at the same rate they are discharged. However, by employing larger electrolyte reactant tanks 214, 216 the system can also serve as a back up power supply to provide electrical power to the load 206 when input power (e.g., from a utility grid 202) is not available.

A particularly attractive application for the Fe/Cr redox flow battery system 200 embodiment illustrated in FIG. 13A is as a power isolator/uninterruptible power supply for a data center. Data centers require a particularly high quality of DC power and also emit a large amount of waste heat. Presently, lead-acid battery based Uninterruptible Power Supplies (UPS) are used in data centers to ensure high-quality DC power as well as short-duration back-up power. Heat exacerbates the positive-grid corrosion and sulfation failure mechanisms of lead-acid batteries necessitating operating such UPS systems in a temperature-controlled environment. In contrast to lead-acid battery UPS, a Fe/Cr redox flow battery system of the embodiment illustrated in FIG. 13A can provide a reliable power supply while utilizing the waste heat of the data center to improve overall system efficiencies, thereby providing substantial advantages over lead-acid based UPS.

As described above with reference to FIG. 2 and FIG. 5, the first and second redox flow battery stacks 210, 212 of FIG. 13A are configured to have multiple cells in each cell layer of the stack, with the cells within each cell layer configured to design parameters, such as match catalyst loading, catalyst activity, temperature, reactant mass transport rate and separator membrane selectivity, to the electrolyte concentration expected in each cell along the reactant flow path. In the Fe/Cr redox flow battery embodiment illustrated in FIG. 13A, the first redox flow battery stack 210 is configured for charging so charge catalyst loading, charge catalyst activity, temperature, mass transport rate, and separator membrane selectivity increase in succeeding cells along the flow path from inlet to outlet. In contrast, the second redox flow battery stack 212 is configured for discharging so discharge catalyst loading, discharge catalyst activity, temperature and mass transport rate increase, and separator membrane selectivity decrease in succeeding cells along the flow path from inlet to outlet.

Figure 13B:
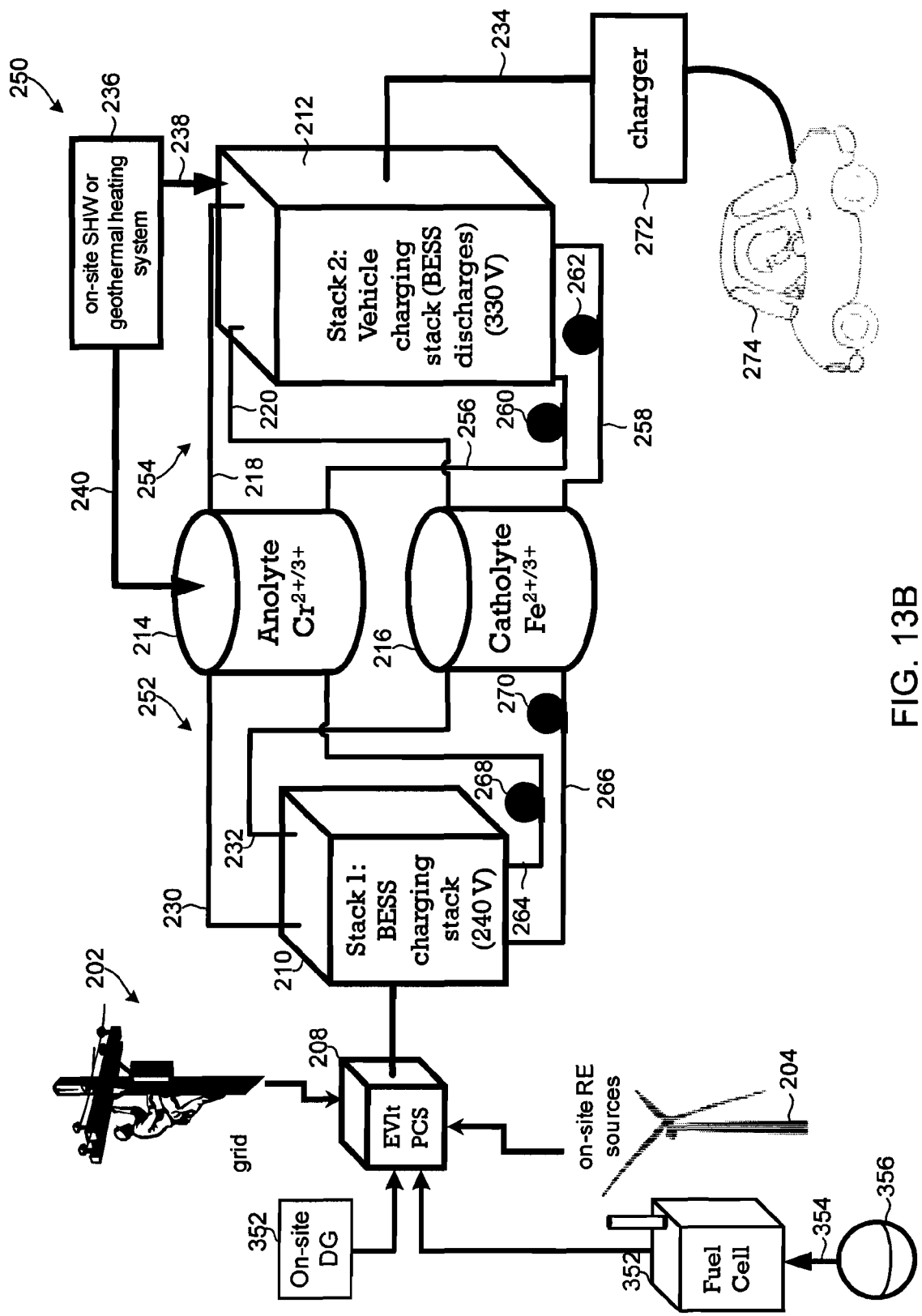
FIG. 13B is a system block diagram of an embodiment system including a redox flow battery used as a surge electrical power source for recharging electric vehicles.

In a second example embodiment illustrated in FIG. 13B, a redox flow battery energy storage system can be used to provide the electrical power for an electric vehicle (EV) or plug-in hybrid electric vehicle (PHEV) charging station 250. This embodiment utilizes many of the components described above with reference to FIG. 13A, except that a separate charging loop 252 is provided between the first redox flow battery stack 210 and the electrolyte storage tanks 214, 216, and a separate discharge loop 254 is provided between the second redox flow battery stacks 210, 212 and the electrolyte storage tanks 214, 216. For example, a set of discharge loop pumps 260, 262 pumps electrolyte inlet flows 256, 258 from the electrolyte storage tanks 214, 216 into the second redox flow battery stack 212, and a set of charging loop pumps 268, 270 pumps electrolyte inlet flows 264, 266 into the first redox flow battery stack 210. This enables the charging and discharging processes to be operated independently of one another. Thus, if demands on the system for discharging electricity require a higher electrolyte mass flow rate in the discharge loop 254 than in the charging loop 252, the discharge loop pumps 260, 262 can be operated at a different speed than the charging loop pumps 268, 270. Similarly, if no discharging electricity is required, the charging loop pumps 268, 270 may be operated to continue charging the system while the discharge loop 254 remains idle. Thus, during the off peak evening hours the charging loop 252 can be operated to store energy in the reactants while the discharging loop is operated intermittently as required to meet load demands.

The vehicle charging station 250 embodiment illustrated in FIG. 13B provides output power 234 to a vehicle charger 272 which is configured to provide electrical power at the voltage and current density required to charge electric powered vehicles 274. This embodiment takes advantage of the load following capacity of the redox flow battery system since it is anticipated that rapid charging of electric vehicles will require large power demands. Since the charging of electric vehicles is unlikely to be a constant process, and is more likely to occur randomly when vehicles arrive at the charging station, such periodic requirements for significant electrical power would cause unacceptable demands on the electrical utility grid 202, renewable energy sources 204, and/or distributed generator sources 205, such as a fuel cell 352. The redox flow battery system can meet the demand for charging power simply by increasing the mass flow rate of the electrolytes through the discharge loop 254. Thus, while the charging loop 252 draws a constant amount of power from the utility grid 202, renewable energy sources 204, and/or distributed generator sources 205, the discharge loop 254 and its second redox flow battery stack 212 can be operated to meet the periodic demands for recharging electric vehicles. This embodiment ensures that variations in power received from the grid 202 or on-site renewable energy power sources do not disrupt vehicle charging or damage vehicle storage batteries. The unique characteristics of the redox flow battery system enables DC☐DC conversion with high overall system efficiency, further providing an economical vehicle charging system. Also, the charging station operator can charge the electrolytes during off-peak hours when electricity rates are lower, thereby improving the operator's overall gross profit margins.

Similar to the embodiment described above with reference to FIG. 13A, the first and second redox flow battery stacks 210, 212 are configured in design for their respective functions of charging and discharging. In the Fe/Cr redox flow battery embodiment illustrated in FIG. 13B, the first redox flow battery stack 210 is configured for charging so charge catalyst loading, charge catalyst activity, temperature, mass transport rate, and separator membrane selectivity increase in succeeding cells along the flow path from inlet to outlet. In contrast, the second redox flow battery stack 212 is configured for discharging so discharge catalyst loading, discharge catalyst activity, temperature and mass transport rate increase, and separator membrane selectivity decreases in succeeding cells along the flow path from inlet to outlet.

Figure 13C:
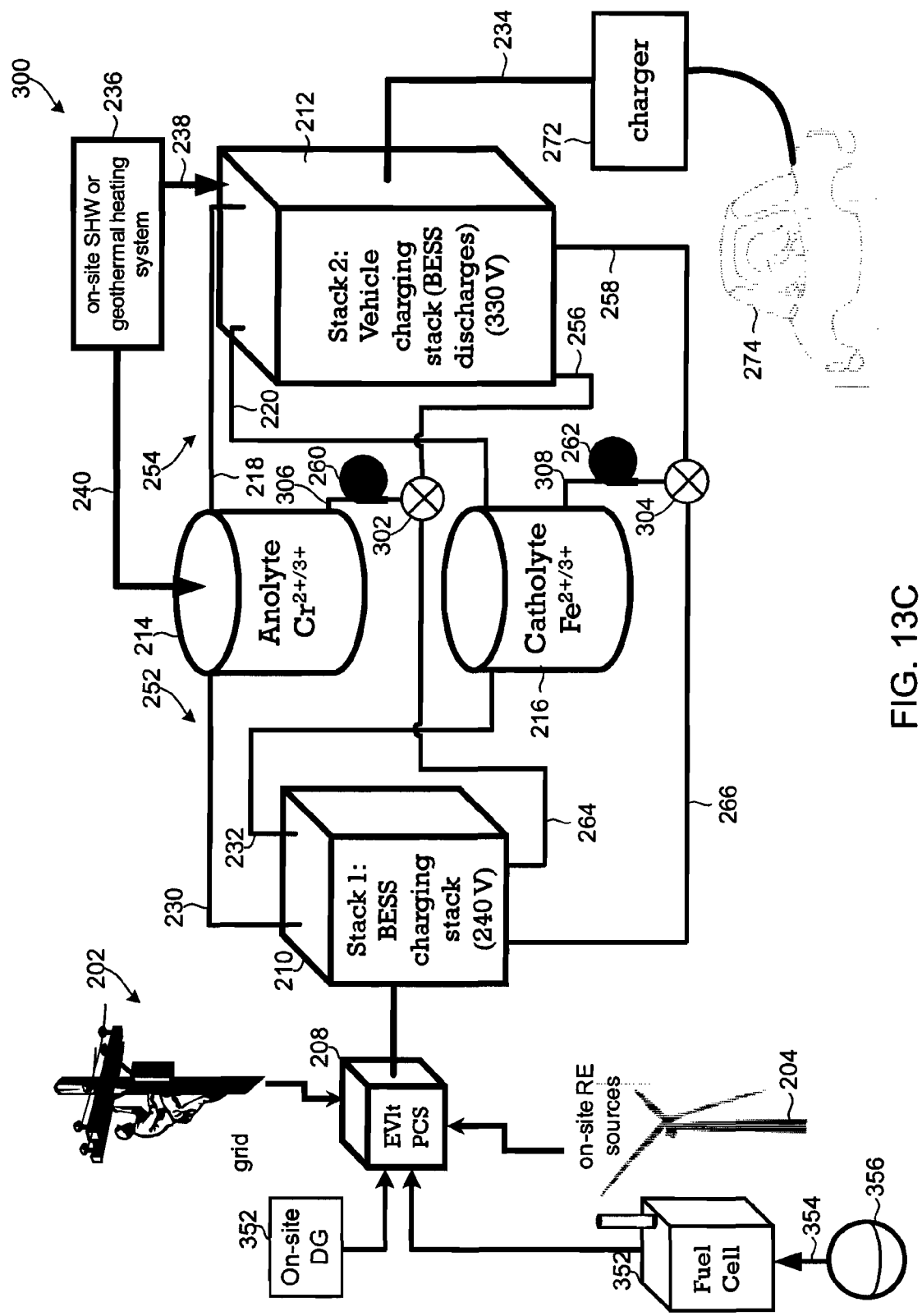
FIG. 13C is a system block diagram of an alternative embodiment system including a redox flow battery used as a surge electrical power source for recharging electric vehicles.

FIG. 13C illustrates an alternative embodiment electric vehicle charging station 300. This embodiment utilizes many of the components described above with reference to FIGS. 13A and 13B, except that valves 302, 304 are used to control the electrolyte reactant flows through the charging loop 252 and discharge loop 254 so that electrolyte reactants are pumped through one or both of the loops by a single set of electrolyte pumps 260, 262. This embodiment may have cost advantages since it requires fewer pumps.

Similar to the embodiments described above with reference to FIGS. 13A and 13B, the first and second redox flow battery stacks 210, 212 are configured for their respective functions of charging and discharging. In the Fe/Cr redox flow battery embodiment illustrated in FIG. 13C, the first redox flow battery stack 210 is configured for charging so charge catalyst loading, charge catalyst activity, temperature, mass transport rate, and separator membrane selectivity increases in succeeding cells along the flow path from inlet to outlet. In contrast, the second redox flow battery stack 212 is configured for discharging so discharge catalyst loading, discharge catalyst activity, temperature and mass transport rate increase, and separator membrane selectivity decreases in succeeding cells along the flow path from inlet to outlet.

Figure 13D:
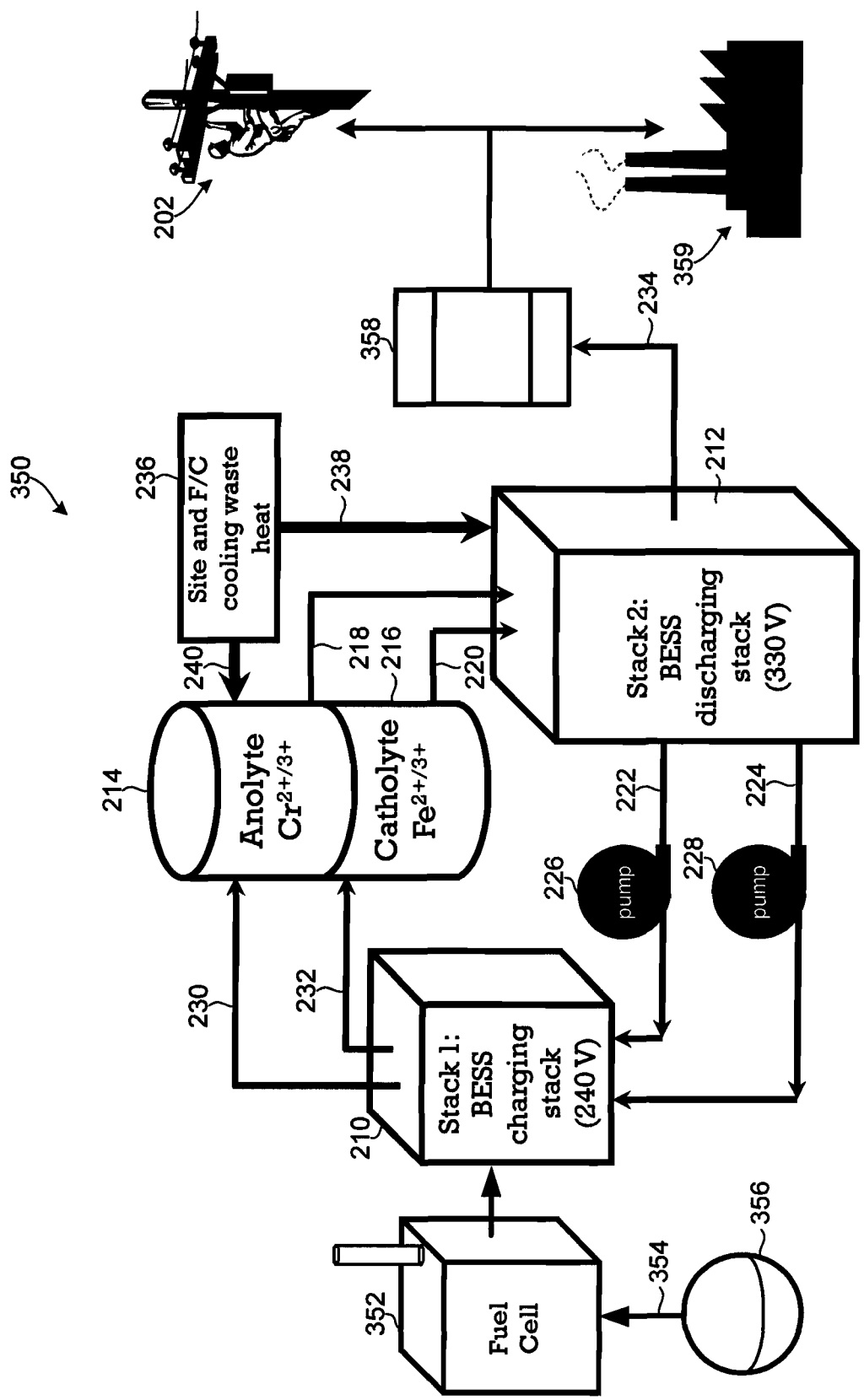
FIG. 13D is a system block diagram of an embodiment system including a redox flow battery used as a electrical power storage and load following power management system enabling a fuel cell to provide AC power to an electrical grid.

In a fourth example embodiment illustrated in FIG. 13D, the redox flow battery energy storage system can be used with a fuel cell to provide a fuel cell/redox flow battery power generation system 350 for providing reliable load-following power to a power grid or industrial facility. This embodiment utilizes many of the components described above with reference to FIG. 13A. In this embodiment, electrical power is received from a fuel cell 352 which generates electricity from the chemical conversion of a fuel, such as hydrogen, received from a fuel source 356. Fuel cells are very efficient generators of electricity which produce less pollution that most other fuel-based energy generation systems. As is well-known, fuel cells operate most efficiently and last longer when operated at a constant output power level. However, the power demand on a typical utility grid 202 or an industrial facility 359 fluctuates significantly throughout the day. Thus, while fuel cells may represent a promising and efficient alternative source of electrical power, their characteristics are ill-suited to utility grid application. This embodiment fuel cell/redox flow battery system 350 overcomes this limitation of fuel cells by using dual redox flow battery stacks 210, 212 to enable simultaneous charging and discharging operations so that power can be received at a fixed power level from the fuel cell 352 while meeting the fluctuating demands of the power grid 202 or an industrial facility 359.

In this embodiment, the chemical fuel, such as hydrogen or natural gas, may be provided from a fuel source 356 via a fuel pipe 354 to the fuel cell 352. For example, the fuel cell/redox flow battery system 350 may be located at or near a source of natural gas, such as in an oil field, so that natural gas extracted from the ground can be provided to the fuel cell. The fuel cell 352 converts the fuel into electricity and effluents (e.g., water and carbon dioxide). Electricity output from the fuel cell 352 is provided to the first redox flow battery stack 210 where the power is used to charge the electrolytes stored in the electrolyte storage tanks 214, 216. As described above, electrical energy stored in the electrolyte species is converted into electricity in the second redox flow battery stack 212. Electricity output 234 from the second redox flow battery stack 212 can be provided to an inverter 358 which converts the DC current generated by the battery into AC current compatible with the utility grid 202 or industrial facility 359. The inverter 358 may be a solid-state electrical DC☐AC inverter or a motor-generator as are well-known in the art. In this embodiment, flow of the electrolyte through the second redox battery stack 212 can be controlled by adjusting the speed of the pumps 226, 228 so as to generate electricity to meet the demands of the grid 202. When demand from the utility grid 202 or industrial facility 359 exceeds the steady-state output of the fuel cell 252, stored energy in the electrolyte is used to meet the additional demand. When demand from the utility grid 202 is less than the steady-state output of the fuel cell 252, the excess energy is stored in the electrolyte. Thus, the system 350 can follow the peak demands of the utility grid 202 or industrial facility 359 without having to operate the fuel cell 352 in an inefficient or potentially damaging manner. In a similar but alternative manner, the system 350 can be used as an on-site distributed generator to follow the peak demands of a co-located industrial facility load 359. The base load demand of an industrial facility 359 can be satisfied by the utility grid 202 or an independent stand alone fuel cell system 352.

Similar to the embodiments described above with reference to FIGS. 13A-13C, the first and second redox flow battery stacks 210, 212 are configured for their respective functions of charging and discharging. In the Fe/Cr redox flow battery embodiment illustrated in FIG. 13D, the first redox flow battery stack 210 is configured for charging so charge catalyst loading, charge catalyst activity, temperature, mass transport rate, and separator membrane selectivity increases in succeeding cells along the flow path from inlet to outlet. In contrast, the second redox flow battery stack 212 is configured for discharging so discharge catalyst loading, discharge catalyst activity, temperature and mass transport rate increase, and separator membrane selectivity decreases in succeeding cells along the flow path from inlet to outlet.

Figure 14:
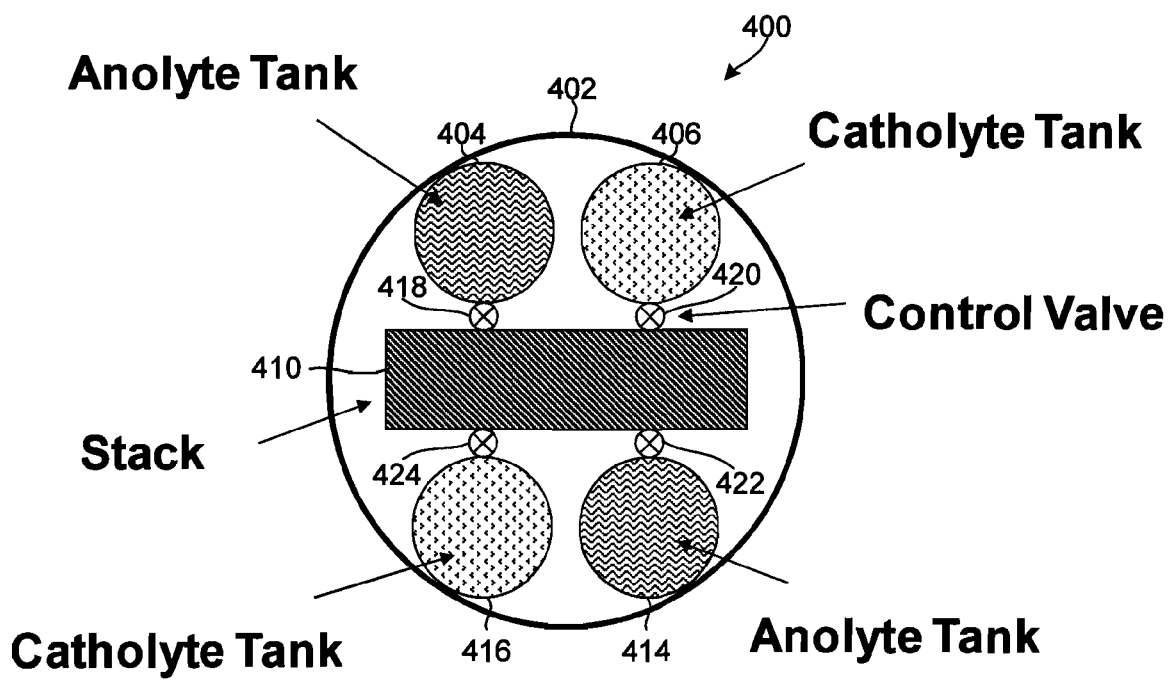
FIG. 14 is a cross sectional component block diagram of a gravity driven redox flow battery embodiment.

In a further embodiment illustrated in FIG. 14, a redox flow battery system 400 is configured to use gravity to flow reactants through the battery cells, thereby reducing or eliminating the need for pumps. The gravity-driven redox flow battery system 400 has fewer components and is less complex than other flow battery systems, thereby reducing its acquisition costs. Eliminating the pumps also reduces parasitic losses resulting in a more efficient overall energy storage system. Energy is stored in the chemical species concentrations in the electrolyte stored in the tanks 404, 406. The electrolyte is passed through a redox flow battery stack 410 which either charges the electrolyte or discharges the electrolyte depending on the direction of flow and applied power or load. Electrolyte fluid exiting the redox flow battery stack 410 is then collected in a matching set of tanks 414, 416 positioned below the redox flow battery stack 410. The illustrated example embodiment includes four reactant tanks 404, 406, 414, 416, two (404, 414) for the anolyte reactant and two (406, 416) for the catholyte reactant. Optional valves 418, 420, 424, 422 may be included to enable control or throttling of reactant flows through the redox flow battery stack 410. The redox flow battery stack 410 and the four reactant tanks 404, 406, 414, 416 may be integrated within a support structure 402, such as a cylinder. When the valves 418, 420, 422, 424 are opened, reactant flows from the top tanks 404, 406 through the redox flow battery stack 410 and into the bottom tanks 414, 416 via gravity. In the charge mode, electricity is consumed by the redox flow battery stack 410 at a rate consistent with the electrolyte flow rate and the state of charge of the electrolyte. Once the energy stored in the reactants is replenished or it is otherwise time to discharge the system, the gravity-driven redox flow battery system 400 is rotated 180° so that discharging operations can begin. Thus, the charge/discharge operation of the redox flow battery stack 410 depends upon the orientation of the system.

Since the goal of the embodiment illustrated in FIG. 14 is simplicity of operation and design, a single redox flow battery stack 410 is used for both the charging and discharging modes, although separate battery stacks could be used. As described above with reference to FIG. 5, the single redox flow battery stack 410 is configured to match catalyst loading, catalyst activity, temperature, reactant mass transport rate and separator membrane selectivity to the electrolyte concentrations expected in each independent cell along the reactant flow path in the charging and discharging modes. Specifically, the single redox flow battery stack 410 is configured so catalyst loading, catalyst activity, temperature and mass transport rate change depending on which half cycle (charge or discharge) requires optimization and separator membrane selectivity increases in succeeding cells from one end of the battery stack to the other. In operation the reactant flows through the redox flow battery stack 410 in one direction for charging, and in the opposite direction for discharging.

Additionally, since the goal of the embodiment illustrated in FIG. 14 is simplicity of operation and design, the redox flow battery stack 410 and the tanks 404, 406, 414, 416 may not include thermal management or heat exchangers for controlling the temperature of the reactants.

Operation of the gravity-driven redox flow battery system 400 is illustrated in FIGS. 15A-15C. In the charging mode illustrated in FIG. 15A reactant flows from the top tanks 404, 406 through the redox flow battery stack 410 and into the bottom tanks 414, 416 via gravity while electrical power is applied to the battery stack. Flow of the reactants through the redox flow battery stack 410 may be controlled using the valves 418, 420, 422, 424 to match the amount of charging power being applied to the stack. Thus, when no power is available for charging, the valves 418, 420, 422, 424 may remain closed, and when less than full charging power is available the valves 418, 420, 422, 424 may be partially opened to provide a metered flow through the battery stack 410. The redox flow battery stack 410 and the tanks 404, 406, 414, 416 are plumbed with flow directing piping and configured so that the reactant flows through the battery stack during charging in the direction in which the catalyst loading, catalyst activity and mass transport decrease and the separator membrane selectivity increases from inlet to outlet.

As illustrated in FIGS. 15A-15C, the redox flow battery system 400 may be integrated within a cylindrical support structure 402 that is supported on rollers 430, 432 or an axle (not shown) so that the system can be rotated about its long axis to shift from charging to discharging modes or discharging to charging modes. For example, in an embodiment, one or more of the rollers 430, 432 may be equipped with a drive mechanism, such as an electric drive motor (not shown), a chain driven mechanism (which may couple with a motor or bicycle peddles, for example) or a simple hand crank 434 to, enable rotation of the cylindrical support structure 402. This operation is illustrated in FIG. 15B which shows the valves 418, 420, 422, 424 closed and the cylindrical support structure 402 being rotated in the clockwise direction by rotation of a hand crank 434 drive mechanism connected to one of the rollers 432. The hand crank 434 illustrated in FIG. 15A-15C is for illustration purposes only as a variety of mechanical power sources may be used as the drive mechanism, such as a chain-drive connected to a bicycle, an electric or internal combustion motor, a water wheel, etc.

As illustrated in FIG. 15C, rotating the redox flow battery system 400 through 180° places the system in the configuration for discharging operations so that charged reactant from tanks 414, 416 flows through the redox flow battery stack 410 and into the bottom tanks 404, 406 via gravity, thereby generating electricity from the battery stack 410. Due to the configuration of the system, the reactants flow through the redox flow battery stack 410 in a direction opposite that during charging. Flow of the reactants through the redox flow battery stack 410 may be controlled using the valves 418, 420, 422, 424 to match the amount of electrical power that is generated. Thus, when no power is required the valves 418, 420, 422, 424 may remain closed, and when less than full capacity power is required the valves 418, 420, 422, 424 may be partially opened to provide a metered flow through the battery stack 410.

The advantage of eliminating pumps from the flow battery system in the embodiment illustrated in FIGS. 14-15C are several fold. First, the embodiment enables the system to be fully sealed. It is very important for the redox flow battery system to be completely sealed as any leakage of air into the electrolyte tanks or pipes will oxidize the reactant thereby reducing performance and potentially generating dangerous gases. Therefore, a very well sealed system is important. Eliminating the need for pumps ensures a more robust and simplified closed system. Second, eliminating pumps improves overall system efficiency. Pumps are a source of parasitic losses which directly reduces the roundtrip efficiency of the system. Thus, this embodiment maximizes roundtrip efficiency, especially if the rotation is performed with cheap energy, e.g., a manual crank 434. Third, eliminating the need for pumps reduces the cost and maintenance requirements since the acidic nature of the electrolyte reactants require special pumps and pump materials. Fourth, the method used to rotate the structure 402 does not contact the reactants, so low cost, reliable mechanisms, including human power, can be used to rotate the system to shift operating modes. Fifth, system operation is quiet as there are no moving parts when the system is operating.

The control valves 418, 420, 422, 424 are the only moving mechanical components apart from the rotation mechanism. The system can be operated flexibly by switching between charge and discharge mode at any time. For example, once the system has discharged through one cycle it may be advantageous to discharge a second time by rotating the system through 180° to flow reactants back into the proper tanks for discharging without applying power to the battery stack 410, and then rotating the system another 180° to restart the discharge process. Doing so will generate more electrical power stored in the reactants, although the power output will be lower than the first discharge cycle. Likewise the system can be charged through a number of cycles in a similar process. Also the system can switch from charge to discharge mode without the need to rotate the tanks if needed, although the efficiency of the system will be reduced.

The simplicity of design and operation of the embodiment described above with reference to FIGS. 14 and 15A-15C, as well as the safety of the Fe/Cr electrolyte reactants, makes the embodiment system ideal for small power storage applications. For example, this embodiment may be ideally suited for use in remote power applications, such as remote towns and villages beyond the reach of a utility grid that use solar photovoltaic arrays and/or wind turbine generators for electricity. Adding a redox flow battery system similar to this embodiment would allow remote towns and villages to be supplied with electrical power at night, for example. Similarly, one or two systems according to this embodiment may be used in remote electric vehicle charging stations using utility grid power or local renewable energy sources to charge the system when no cars need to be charged, and rotating the storage system to provide electrical power for recharging an electric vehicle when required.

It is also possible to size this embodiment system to fit inside standard sized shipping containers. Because these systems are fully sealed and self contained they can be safely operated inside the shipping container, enabling the systems to be packaged for rapid deployment. For transportation purposes the electrolyte may be transported as a salt, e.g., a ferric chloride, which may be stored in the tanks. This can significantly reduce the weight of the system for transportation. Then once the system is in place, water can be added to reach the required concentrations for operation. In this manner, systems such as the embodiment described above with reference to FIGS. 14-15C can be built and stored in a condition ready for immediate transportation, and moved to a location requiring energy storage when needed. For example, such deployable energy storage systems may be set up at natural disaster sites, such as a hurricane landfall or earthquake epicenter, to help provide emergency electrical power until reliable utility services can be restored.

FIGS. 14 and 15A-15C show the battery stack 410 fully integrated with the tanks 404, 406, 414, 416, and fixed plumbing within the support structure 402. However, in another embodiment the tanks 404, 406, 414, 416 may be separated from the battery stack 410 so that the tanks may be rotated to achieve the desired gravity feed through the battery stack 410 which remains stationary. This alternative embodiment may be more flexible in terms of the ability to easily add more tank/storage capacity. This alternative embodiment will require flexible piping or include fluid couples that accommodate rotation without leaking.

Figure 16A:
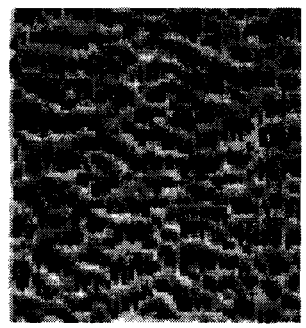
FIGS. 16A-16C are micrographs showing representative separator materials suitable for use in each of three cells of a three-cell stack cell layer redox flow battery embodiment.
Figure 16B:
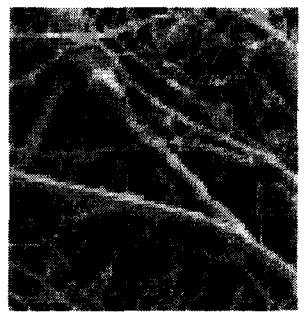
Figure 16C:

As mentioned above, the various embodiments utilize independent cells with different configurations along the reactant flow path to increase overall electrical performance. FIGS. 16A-16C show micrographs of example separator materials that would be appropriate for use in the independent reaction cells in a three-cell redox flow battery configuration illustrated in FIG. 2. The separator material illustrated in FIG. 16A, which is appropriate for use in a cell adjacent to the stack inlet in discharge mode and to the stack outlet in charging mode, is made of a microporous material with a membrane porosity of less than about 0.1 micron. This microporous material exhibits an area specific resistance of about 0.8 ohm-cm2 and has a reactant selectivity of about 2000 μg Fe/hr-cm/M. The separator material illustrated in FIG. 16B, which is appropriate for use in a cell half way between the stack inlet and stack outlet, is made of a melt blown material with a membrane porosity of about two to about five microns exhibiting an area specific resistance of about 0.5 ohm-cm2 and having a reactant selectivity of about 4000 μg Fe/hr-cm/M. The separator material illustrated in FIG. 16C, which is appropriate for use in a cell adjacent to the stack outlet in discharge mode and to the stack inlet in charging mode, is made of a spunbond material with a membrane porosity of about 15 to about 30 microns exhibiting an area specific resistance of about 0.2 ohm-cm2 and having a reactant selectivity of 12,000 μg Fe/hr-cm/M.

Further representative stack design parameters and performance characteristics for a three-cell configuration are listed in Table 1 below. All values are approximate.

TABLE 1

| State of Charge (%) | 90-62 | 62-34 | 34-6 |
|---|---|---|---|
| Utilization (%) | 31% | 45% | 82% |
| Electrolyte Concentration [M] | | | |
| [Cr2+] | 1.80-1.24 | 1.24-0.68 | 0.68-0.12 |
| [Cr3+] | 0.20-0.76 | 0.76-1.32 | 1.32-1.88 |
| [Fe3+] | 1.80-1.24 | 1.24-0.68 | 0.68-0.12 |
| [Fe2+] | 0.20-0.76 | 0.76-1.32 | 1.32-1.88 |
| Electrode Surface Area | Lower | Medium | Higher |
| Electrode Discharge Catalyst Loading | Lower | Medium | Higher |
| Electrode Charge Catalyst Loading | Higher | Medium | Lower |
| Electrode Residence Time | Higher | Medium | Lower |
| Separator Selectivity (μg Fe/hr-cm/M) | 2,000 | 4,000 | 12,000 |
| Separator Area Specific Resistance (ohm-cm$^2$) | 0.8 | 0.5 | 0.2 |
| Separator Porosity (μm) | <0.1 microns | 2-5 microns | 15-30 microns |

The various system embodiments may employ a variety of electrolyte storage tank configurations as described below. In a simple embodiment, a single tank may be used to store each electrolyte as illustrated in FIG. 1. This configuration reduces the number of tanks and may enable rapid switching from charge to discharge modes (and vice versa). However, such a system embodiment will suffer from efficiency losses from mixing of charged and discharged electrolytes.

In a second approach, charged and discharged electrolytes can be stored separately in system embodiments illustrated in FIGS. 1 and 13 by using separate tanks for each, resulting in a total of four tanks in the system (i.e., one for each of the charged anolyte, discharged anolyte, charged catholyte, and discharged catholyte). The use of four tanks in a battery system is illustrated in FIGS. 14-15C. Additional pumps and valves may be used within the system to flow the electrolytes to/from the appropriate tank depending upon the charge/discharge mode for the embodiments illustrated in FIGS. 1 and 13A-13D.

Figure 17:
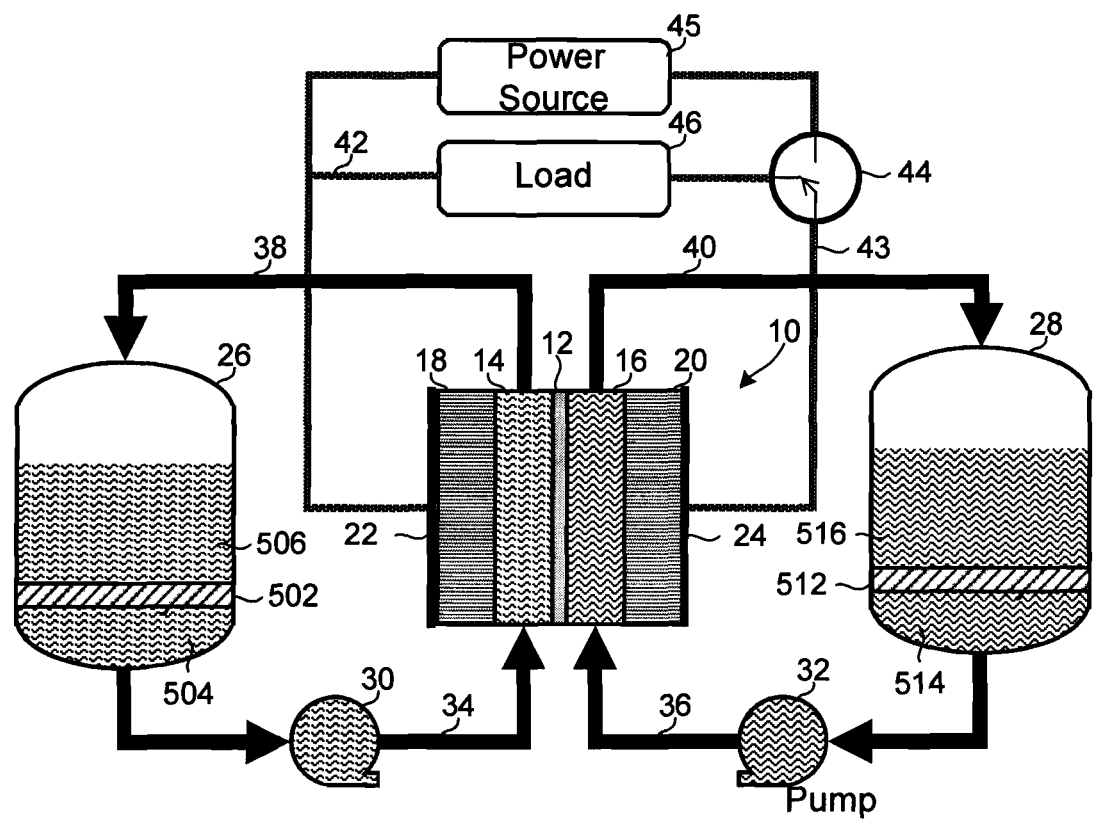
FIG. 17 is a system diagram of an embodiment large stack redox battery system showing a cross sectional schematic illustration of a redox battery stack with reactant storage tanks including tank separators.

In a further embodiment illustrated in FIG. 17, the redox flow battery system can be configured with electrolyte storage tanks that minimize mixing of the charged and discharged electrolytes. In such a system, the electrolyte storage tanks 26, 28 and a flow system are fluidically coupled to the redox flow battery stack assembly 10 so that electrolyte fluid pumped out of each of the electrolyte storage tanks 26, 28 flows through the redox flow battery stack assembly 10, and then back into the same tank 26, 28 without diluting charged electrolytes. In this embodiment, each electrolyte tank 26, 28 will store both charged reactant 504, 514 and discharged reactant 506, 516, with a tank separator 502, 512 include in each tank which prevents or at least inhibits the mixing of charged electrolyte 504, 514 with discharged electrolyte 506, 516. This embodiment reduces the number of electrolyte storage tanks required in the system while improving system efficiency.

Figure 18:
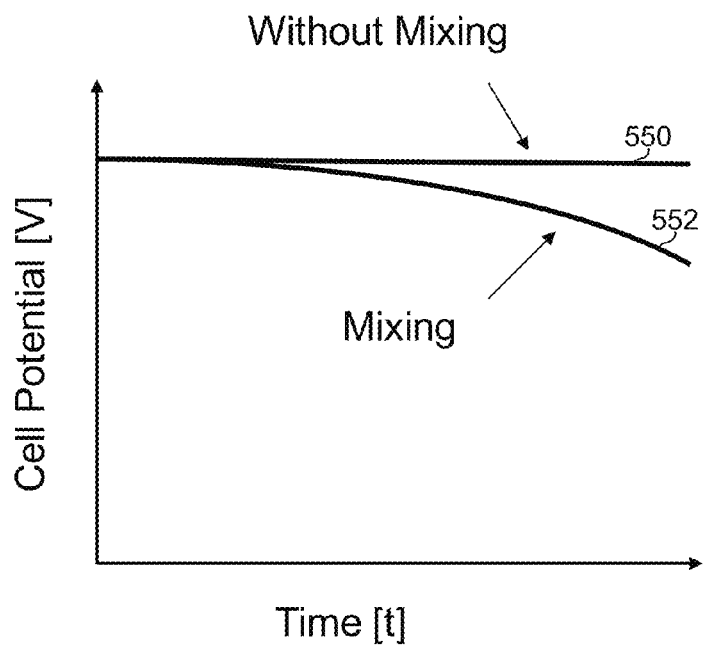
FIG. 18 is a graph of battery cell potential versus time illustrating effects of mixing of charged and discharged reactants.

The tank separator 502, 506 inhibits mixing of the charged electrolyte 504, 514 that is fed to the redox flow battery stack assembly 10 with the discharged electrolyte 506, 516 which flows back into the electrolyte tanks 26, 28. This prevents dilution of the charged electrolytes and keeps the charged electrolyte concentrations at a constant level through out the discharging cycle, thereby maintaining the battery cell potentials constant. If mixing were to occur the electrolyte concentrations in the electrolyte tanks 26, 28 would be reduced over time as more and more discharged electrolyte 506, 516 is returned to the tanks. FIG. 18 illustrates the impact on cell voltage over time if charged and discharged electrolytes allowed to mix, line 552, compared to the cell voltage over time if the charged and discharged electrolytes are kept separate, line 550. By including a tank separator 502, 512, a single electrolyte tank can be used for each of the anolyte and catholyte reactants while ensuring that battery potential remains constant throughout the discharge cycle. This saves the cost of an extra set of tanks. Additionally, by maintaining a more constant voltage over the course or charging or discharging, the efficiency of any DC-DC, DC-AC, or AC-DC conversion of the electricity going into/out of the redox flow battery stack will be higher than designs in which charged electrolyte mixes with discharged electrolyte. This is because these types of converters operate more efficiently in narrower voltage ranges. Lastly, redox flow battery stack output power will remain more constant than designs where charged electrolyte mixes with discharged electrolyte.

While FIG. 18 illustrates the impact on battery discharge potential, a similar impact on system efficiency will occur if charged electrolyte is allowed to mix with discharged electrolyte during a charging cycle. Thus, the tank separator 502 functions to prevent or reduce mixing of charged and discharged electrolyte during both charging and discharging cycles leading to lower system cost, a more constant power output, and higher DC efficiency.

The tank separator embodiments include two forms of movable tank separator designs; a tank separator with flow passages which can be opened to enable electrolyte to flow through the separator, and a tank separator with no flow passages. Operation of these two embodiment configurations are illustrated below with reference to FIGS. 19A-19F and 20A-20F.

In a first embodiment illustrated in FIG. 19A-19F, the tank separator 502 is formed from a buoyant structure or material which can float on the electrolyte reactant and includes flow passages which when closed inhibit fluids above and below the separator from intermixing, and that can be opened to allow fluids above and below the tank separator to mix. The tank separator 502 may be made, for example, from a polypropylene or polyethylene material which has a lower density than the acidic electrolyte fluid and that is resistant to corrosion by the asset. The tank separator 502 includes a valve mechanism, such as louvers 503 (as illustrated in FIG. 19A-19F), closeable openings, an array of valves, or similar structures which can be opened to allow fluid to pass through the separator structure. Opening such valve mechanisms will allow the tank separator 502 to float to the top of the electrolyte tank 26 when the discharge cycle is over. In the example embodiment illustrated in FIGS. 19A-19F, the tank separator 502 includes a number of louvers 503 which may be an arrangement of slats that form a seal when rotated into a closed position and allow fluid to flow between the slats when rotated into an opened position. In another example embodiment, the tank separator 502 may include a slideable panel on the surface which can be slid to expose a hole through the separator structure which allows the fluid to pass through.

Figure 19A:
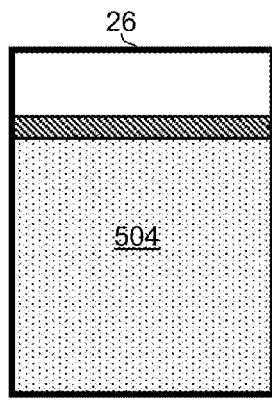
FIGS. 19A-19F are cross sectional diagrams of an embodiment electrolyte storage tank including a tank separator illustrating movement of the tank separator through a charging or discharging cycle.

FIGS. 19A-19F show a cross section of an electrolyte tank 26 illustrating movement of the tank separator 502 through a full discharge or full charge cycle of a redox flow battery system. FIG. 19A shows the electrolyte tank 26 with the tank separator 502 floating on the top of the electrolyte liquid 504 with its louvers 503 in the fully closed configuration. This configuration reflects the start of a charge or discharge cycle.

Figure 19B:
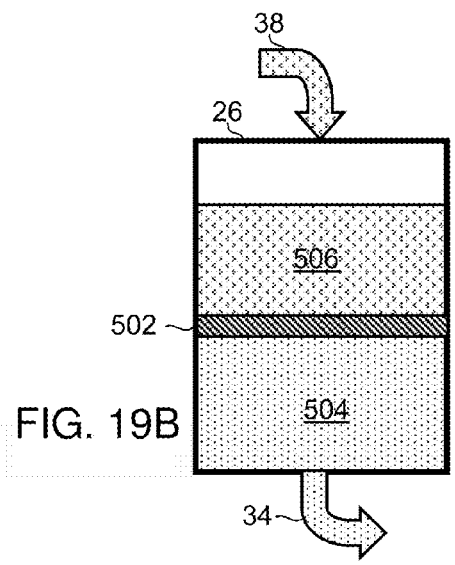

During a charge or discharge cycle, initial (either charged or discharged) electrolyte 504 is drawn from the tank 26 from below the tank separator 502 and passed through the redox flow battery stack assembly 10 while electrolyte exiting the battery 506 is pumped into the tank 26 on top of the tank separator 502. This is illustrated in FIG. 19B which shows the configuration of the electrolyte tank 26 and the tank separator 502 part way through a charge or discharge cycle with incoming electrolyte 506 being pumped into the electrolyte tank 26 on top of the tank separator 502 while the electrolyte 504 being fed to the redox flow battery stack assembly 10 is drawn from below the tank separator 502 (flow 34). As shown in FIG. 19B the tank separator 502 inhibits mixing of the initial (either charged or discharged) electrolytic liquid 504 with the incoming (either discharged or charged) electrolytic liquid 506.

Figure 19C:
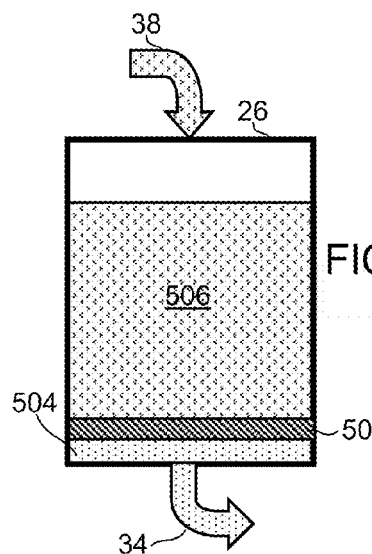

FIG. 19C shows a portion of the charge or discharge cycle with the tank separator 502 nearing the bottom of the electrolyte tank 26 as will occur near the end of a charge or discharge cycle. At this point the louvers 503 in the tank separator 502 remain closed keeping the charged and discharged electrolytes 504, 506 separated.

Figure 19D:
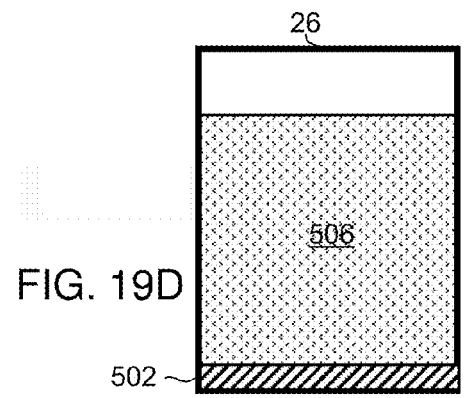

FIG. 19D shows the tank separator 502 positioned near the bottom of the tank 26 where it will be at the end of a charge or discharge cycle. At this point the louvers 503 may be opened to allow the electrolyte 506 above the tank separator 502 to pass through the separator structure. Since the tank 26 is full of the same type of electrolyte 506 (either charged or discharged), the valve mechanisms can be opened and the tank separator 502 moved without causing an electrical performance penalty. FIG. 19D shows an embodiment in which louvers 503 are opened by rotating them into an open position, but another embodiment may allow fluid passage through the separator by sliding a panel to expose holes through the tank separator 502, or opening valves to enable fluid to pass through pipes through the separator structure.

Figure 19E:
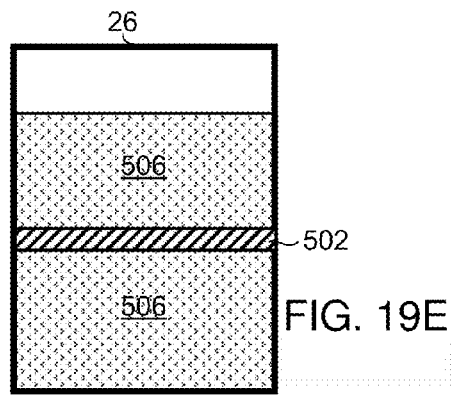

Since the tank separator 502 is buoyant, opening the louvers 503 (or other valve structures) enables the tank separator 502 to begin floating towards the top of the tank. This is illustrated in FIG. 19E which shows the tank separator 502 floating back to the top of the electrolyte tank 26 as the electrolyte 506 flows through the open louvers 503. While the tank separator 502 may simply float to the top, a magnetic coupling may also be provided to assist the tank separator 502 in moving back up to the top.

Figure 19F:
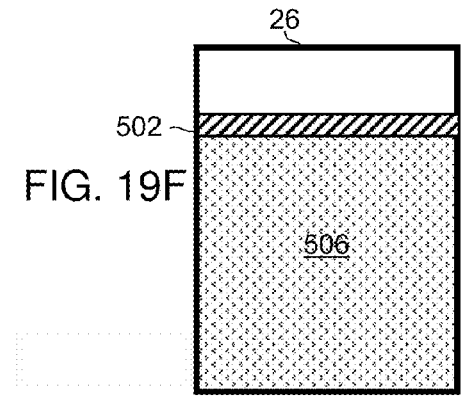

When the tank separator 502 reaches the top of the electrolyte 506 as illustrated in FIG. 19F the next cycle (either charging or discharging) can begin by closing the louvers 503 in the tank separator 502 as illustrated in FIG. 19A before electrolyte 506 from the redox flow battery stack assembly is pumped back into the electrolyte tank 26.

Closing or opening the valve structures of the tank separator 502 can be controlled via an external drive which may be coupled magnetically to the valve mechanism, such as louvers 503. In this manner no wires or other connections are required between an outside controller or power supply and the separator. In a redox flow battery system the electrolyte flows through a completely closed system to avoid contact with air. This makes it difficult to perform maintenance on the valve mechanisms inside the electrolyte tank 26 for long periods. Therefore, an external control mechanism using magnetism as a coupling mechanism, for example, may have advantages for controlling the tank separator 502 inside the electrolyte tank 26.

Alternatively, the valve mechanisms or louvers 503 may be controlled by mechanical mechanisms activated by the position of the tank separator 502 within the tank 26. For example, the valve mechanisms, such as louver 503 may be configured to shut when the structure surfaces, such as a buoyant lever that latches the louvers closed when it rises above the fluid surface, and may be configured to open upon a portion of the structure contacting the bottom of the tank, such as a latch release mechanism.

Figure 20A:
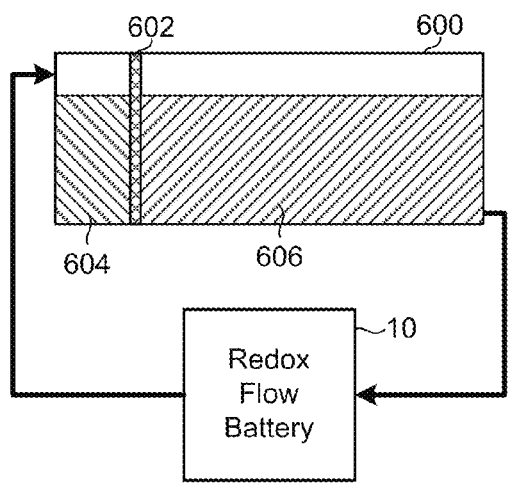
FIGS. 20A-20F are cross sectional diagrams of an embodiment electrolyte storage tank including a tank separator illustrating movement of the tank separator through a charging or discharging operations.
Figure 20B:
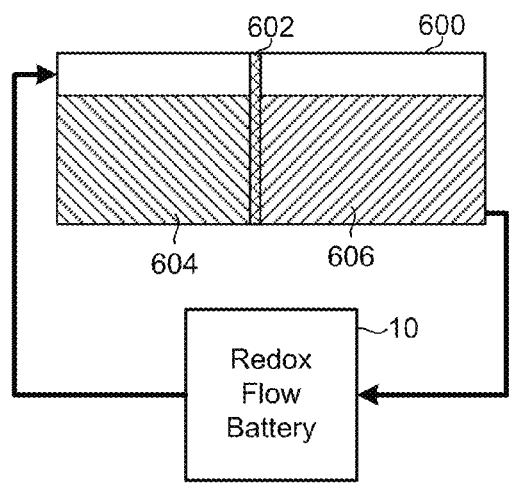
Figure 20C:
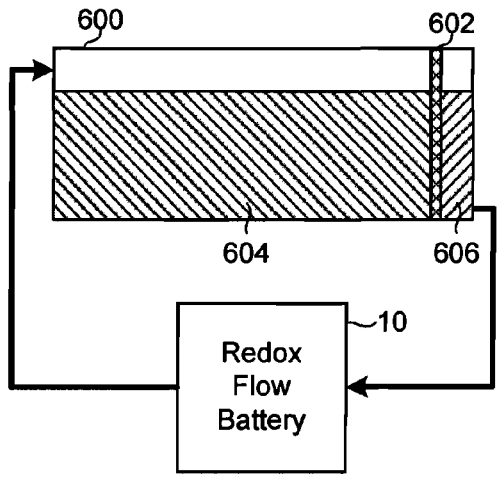

In an alternative embodiment the tank separator 602 may be vertically oriented and configured to traverse the length of a horizontally disposed electrolyte tank 600 as illustrated in FIGS. 20A-20F. In this embodiment the vertical tank separator 602 does not include louvers or valve structures, and instead is configured to inhibit the fluids on either side from mixing at all times. FIG. 20A shows the electrolyte tank 26 with the vertical tank separator 602 positioned near the left end of the electrolyte tank 600 separating discharged electrolyte 606 from charged electrolyte liquid 604. This reflects the start of a charge cycle. FIG. 20B shows a portion of the charge cycle with freshly charged electrolyte 604 being pumped from the redox flow battery stack assembly 10 into the electrolyte tank 600 on one side of the vertical tank separator 602 while discharged electrolyte 606 exits the electrolyte tank 600 to flow through the redox flow battery stack assembly 10. As shown in FIG. 20B the vertical tank separator 602 inhibits the charged electrolyte 604 and discharged electrolyte 606 from mixing. FIG. 20C shows the system at a point part near the end of the charge cycle with the vertical tank separator 602 nearing the right end of the electrolyte tank 600.

Figure 20D:
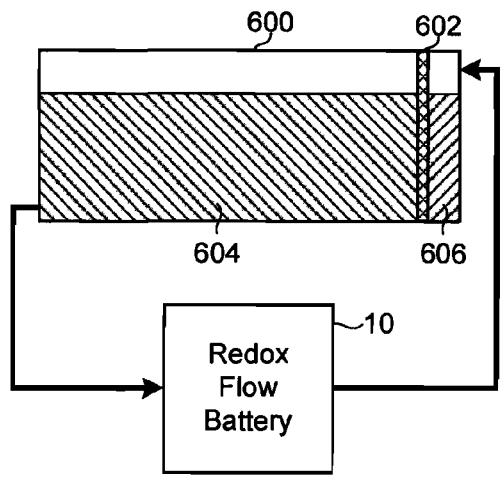
Figure 20E:
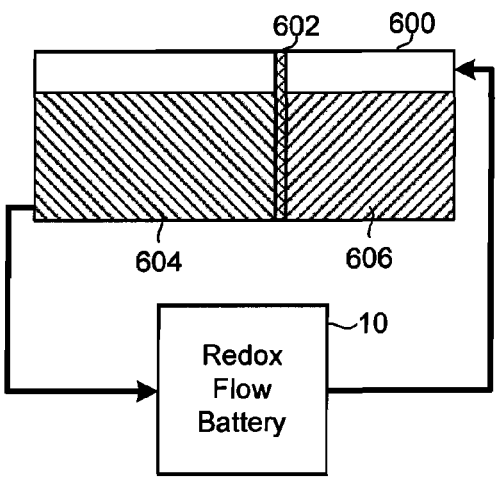

To begin discharging the battery, the direction of the electrolytes flowing through the redox flow battery stack assembly 10 are reversed as shown in FIG. 20D. As discharged electrolyte is pumped into the electrolyte tank 600, the vertical tank separator 602 traverses back along the length of the electrolyte tank 600 as illustrated in FIG. 20E. Thus, as the redox flow battery system is discharged, for example, the vertical tank separator 602 traverses the electrolyte tank 600 in the other direction.

Figure 20F:
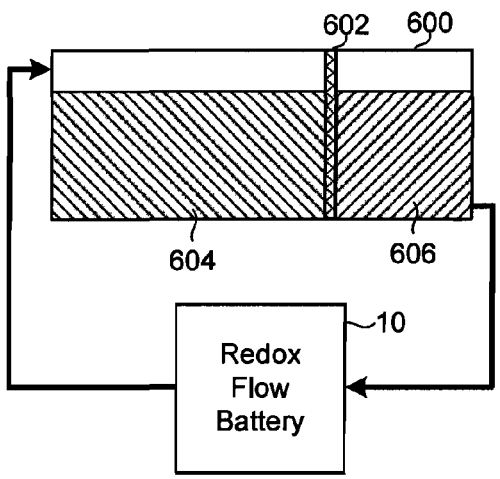

At any time the flow through the redox flow battery stack assembly 10 can be reversed in order to switch from charging to discharging, or discharging to charging. Thus, as illustrated in FIG. 20F, before the battery is fully discharged, the flow can be reversed by pumping discharged electrolyte 606 from the electrolyte tank 600 through the redox flow battery stack assembly 10 and back into the electrolyte tank 600 on the other side of the vertical tank separator 602, such as to return to storing energy.

In the embodiment illustrated in FIGS. 20A-20F the vertical tank separator 602 may be a plastic member that keeps the charged and discharged fluid apart to prevent dilution. The vertical tank separator 602 in this embodiment does not require external control since its position within the electrolyte tank 600 is controlled by the direction of the flow through redox flow battery stack assembly 10. Thus, the vertical tank separator 602 can be a relatively simple plastic panel that is suspended or configure to move freely horizontally through the electrolyte tank 600.

The seal between the tank separator 502, 602 and the electrolyte tank 26, 600 does not need to exceptionally leak proof because a small amount of leakage around the edges will have very little impact on the overall system efficiency if the tank volume is sufficiently large. Also some leakage, while undesirable, does not pose any threat to the flow battery system other than slightly reducing its overall efficiency.

Since the tank separator moves due to electrolyte being extracted from the tank when it is in one state-of-charge and reinjected when it is in the opposite state-of-charge, the position of the tank separator can function as a state-of-charge indicator. By incorporating a passive or active signaling device, such as a RFID chip or a large piece of metal, the position of the tank separator and hence the system state-of-charge, can be determined by a position sensitive reader of the signal from the RFID chip or induced magnetic field of the metal piece. Multiple RFID chips or metal pieces can be used to increase signal strength and/or provide redundancy.

The horizontal or vertical tank embodiments described in FIGS. 17, 19, and 20 can be used in the system designs described above with reference to FIGS. 13A, 13B, 13C, and 13D to create a backup power capability within the systems.

As mention above, the electrolytes stored within the tanks 214, 218 in FIG. 13A also provides a back up power capability in the power system. As an example, when the energizing sources for the charging stack (stack 1) in FIG. 13A are disconnected or go down, the discharged electrolyte from the discharging stack 212 can be directed by a 3-way valve down a piping run (not shown) that bypasses the charging stack 210 and brings the discharged electrolytes into the backend of the tank, behind a tank separator (as illustrated in FIGS. 17, 19, and 20). Charged electrolyte that feeds the discharge stack may be extracted from the front end of the tanks 214, 218 and therefore, in front of the tank separator.

Other design approaches may be used to keep charged and discharged electrolytes separate. In a first alternative approach, a bladder can be provided inside each tank for each electrolyte. The bladder could be sealed to the tank and be sized appropriately to accommodate the full volume of charged and discharged electrolytes. Discharged electrolyte may be pumped into the bladder portion of the tank, with the bladder preventing the discharged electrolyte from mixing with the charged electrolyte in the remainder of the tank. The use of an in-tank bladder is similar to the movable partition embodiment described above with reference to FIGS. 19 and 20 with the tradeoff of a sealed part for a moving part.

In a second alternative approach, a series of tanks is used for each electrolyte that in aggregate have a larger volume than the volume of electrolyte. The tanks for an electrolyte are coupled to the redox flow battery stack assembly such that the discharged and charged electrolytes are distributed among the tanks during each half cycle of the battery system. This "N+1" configuration obviates the need for a movable partition or sealed part with the tradeoff of additional plumbing, valves, and control complexity.

Other alternative designs may leverage the fact that in the discharged state the two electrolytes in the Fe/Cr mixed reactant system have identical chemical compositions. Thus, for a system that is designed to operate over a state-of-charge range that goes to full discharge (i.e., zero state-of-charge), a three tank system may be used where a first tank holds charged anolyte, a second tank holds charged catholyte, and a third, larger tank, holds the combined discharged electrolytes. In a further alternative design, one tank may be sized to hold at minimum the volumes of both the anolyte and catholyte. In a further approach, the one tank may include two partitions inside which move from the middle of the tank to the two ends. In this alternative, charged anolyte is pumped into/out of one end of the tank while charged catholyte is pumped into/out of the other end of the tank, and discharged anolyte and catholytes are pumped into/out of the middle of tank. As discharged electrolyte fills the inner section, its expanding volume pushes the partitions towards each end, compensating for the decreasing volume of the charge electrolytes. In a further alternative, bladders may be used instead of partitions to create the three separate volumes within a single tank.

All tanks in the redox flow battery system embodiments described above (except for those illustrated in FIGS. 14 and 15) can be freestanding inside a building, freestanding outdoors, placed inside a below-grade vault, or buried. Additionally, the tanks can be designed to fit within the volume of standard shipping containers. This not only makes the tanks easy to transport, when suitably sealed the outer skin of the containers can serve as secondary containment for the electrolytes.

Containerizing the electrolyte tanks described above may enable them to be more easily deployed than tanks that are constructed onsite or require custom foundations that must be built onsite. Also packaging the stacks, redox flow battery control system, and the power conditioning system inside standard shipping containers can create an entire system configuration that is easily shipped by rail and/or tractor trailer and deployed with relatively minimal onsite work. Thus, containerized redox flow battery systems can provide turn-key power energy storage systems that need only be connected to a utility grid or other source of electric power. A system design in which the containers housing the redox flow battery stacks, control system, and power conditioning system are placed above containers housing the electrolyte storage tanks yields an energy storage system that can be readily transported and set-up at the destination, and that facilitates control over electrolyte flows and full or partial draining of the stacks when the battery system is idle for short or extended periods of time.

In a further embodiment, the redox flow battery stack assembly may be configured so that the battery can perform charging and discharging operations with reactants flowing in a single direction. In one configuration, electrolyte tanks 26, 28 that allow mixing of charge and discharge electrolytes, such as shown in FIG. 1, may be used to enable rapid switching between charging and discharging modes for short periods of time by using an electrical switch 44. While compromises in design parameters may be made, such as favoring charging over discharging to enable such operations, such an embodiment can switch very quickly from charging to discharging, or from discharging to charging simply by electrically switching connections (e.g., via switch 44) between the stack and the charging power source 45 or the load 46. By maintaining reactant flows in one direction through the redox flow battery stack assembly, the delay in switching modes associated with reversing reactant flows can be avoided. In an alternative configuration, multiple tanks (e.g., described above with reference to FIG. 14) or separator tanks (e.g., described above with reference to FIGS. 17-19E) may be used in this embodiment, with valves, pumps and piping configured to direct charge or discharged electrolytes (depending upon the mode of operation) through the redox flow battery stack assembly in a single direction.

Alternative embodiments of redox flow battery systems will now be described with reference to FIGS. 21 through 31.

As used herein, the term "cell" or "electrochemical cell" carries its ordinary meaning, and refers, without limitation to a discrete arrangement of structural and chemical elements configured to allow an electrochemical reaction to occur. In some embodiments, two or more cells may be combined in a single structure to form a cell block. A cell block can include any number of cells in any configuration. In some embodiments, a cell block will include a common unitary housing, while in other embodiments, a cell block can include a plurality of individual cells, each having its own separate enclosure while being logically combined in a block. A plurality of cell blocks can be combined to form a stack assembly. A stack assembly can include a plurality of cell blocks connected to one another in any electrical and hydraulic configuration to form a battery pack that can be charged and/or discharged as a single unit.

Figure 21:
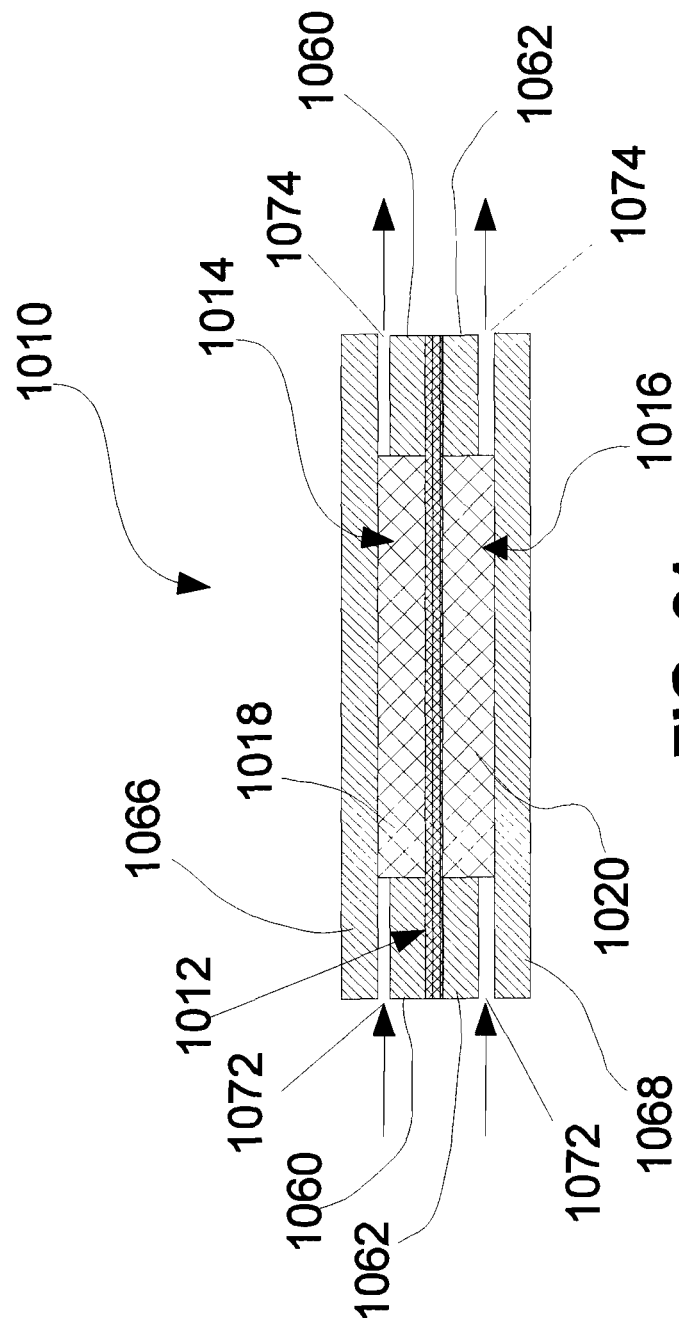
FIG. 21 is a schematic cross-sectional view of an electrochemical cell in a redox flow battery.

FIG. 21 shows a cross-sectional view of an embodiment of a single electrochemical cell 1010 of a flow battery. The cell 1010 generally includes a positive electrode space 1014 separated from a negative electrode space 1016 by a membrane separator 1012. In some embodiments, the positive 1014 and negative 1016 electrode spaces are entirely filled by respective electrically conductive positive and negative porous electrodes 1018, 1020. In alternative embodiments, the positive and/or negative electrode spaces additionally include flow channels configured to increase electrolyte flow through the chamber without substantially reducing reaction efficiency. In the illustrated embodiment, the membrane separator 1012 is sandwiched between and supported by a pair of separator support plates 1060, 1062. A pair of backing plates 1066, 1068 may surround and enclose the positive and negative electrode spaces 1014, 1016. Inlet ports 1072 direct positive and negative electrolytes into the positive and negative electrode spaces 1014, 1016 respectively, and outlet ports 1074 carry electrolytes out of the cell.

In some embodiments, the backing plates 1066, 1068 are electrically conductive throughout their entire area. For example, such entirely conductive plates can be made of carbon or any other suitable electrically conductive material. In alternative embodiments, the backing plates 1066, 1068 can be configured in a multi-layer or composite material construction in which only the surfaces immediately adjacent to and in physical contact with porous electrodes 1014, 1016 are electrically conductive. In the latter embodiments, the portions of the backing plate 1066, 1068 surrounding the conductive surfaces may be electrically insulating. In further embodiments, the backing plates 1066, 1068 may include a multiple layer construction including an electrically conductive layer made of a substantially electrically conductive material, and an outer structural layer made of a material that is not necessarily electrically conductive but which provides mechanical and structural support. In some embodiments, the size, material, or other properties of the backing plates 1066, 1068 of each cell 1010 may be configured based on a cascade-stage position of the cell and/or the expected state of charge of electrolyte reactants flowing through the cell which may depend upon the position of the cell within the cascade. Such optimizations are discussed in further detail below.

In some embodiments, inlet and outlet ports 1072, 1074 are formed as channels in the backing plates 1066, 1068. In alternative embodiments, inlet and outlet ports 1072, 1074 are formed as channels in the membrane support plates 1060, 1062. In still further embodiments, the inlet and outlet ports 1072, 1074 include separate and independent structures. The inlet and outlet ports 1072, 1074 are typically constructed with small cross sectional areas to minimize shunt currents. In some embodiments, the inlet and/or outlet ports 1072, 1074 may include flow directing structures to cause proper mixing of the electrolytes as they enter and/or exit each electrode space 1014, 1016. In some embodiments, the cross-sectional dimensions, length, tortuosity or other aspects of the inlet 1072 and/or outlet 1074 ports may be configured based on a cascade-stage position of the cell and/or the expected state of charge of electrolyte reactants flowing through the cell. Such optimizations are discussed in further detail below.

In some embodiments, the porous electrodes 1018, 1020 may be made from carbon fiber or graphite felt materials. Such materials are commonly available, and are typically used in thermal insulation, air or other gas filters and other applications. Carbon felt materials generally include an open mesh of carbon fibers. Other porous, electrically conductive materials can also be used as porous electrodes in a flow battery. The porous electrode may be configured with properties, such as overall thickness, fiber size, fiber density, porosity, average pore size, tortuosity, and other properties, based on a cascade-stage position of the cell and/or the expected state of charge of electrolyte reactants flowing through the cell so as to improve or optimize the electrical efficiency of the cell and/or the entire flow battery system. Such optimizations are discussed in further detail below.

In some embodiments, materials may be bonded or plated onto one or both porous electrodes 1018, 1020 in order to modify the rate at which electrochemical reactions occur at that electrode. For example, such materials may include electro-catalysts selected to increase a rate at which reactions occur. Alternatively, such reaction rate modifying materials may be reaction suppressants which are selected to reduce the rate at which select reactions occur. The porous electrode may be configured with catalyst and/or suppressant materials, thicknesses and other catalyst and/or suppressant parameters (such as loading and activity) based on a cascade-stage position of the cell and/or the expected state of charge of electrolyte reactants flowing through the cell so as to improve or optimize the electrical efficiency of the cell and/or the entire flow battery system. Such optimizations are discussed in further detail below.

In some embodiments, the porous electrodes 1018, 1020 may be bonded, welded or otherwise physically and electrically joined to their respective backing plate 1066, 1068. In alternative embodiments, the porous electrodes may be formed integrally with at least a portion of the backing plate 1066, 1068.

The separator membrane 1012 may be made of any material capable of allowing ions to pass through while limiting the migration of other particles from one side to the other. Several separator membrane materials are known in the art. Separator membranes may also be selected or configured to improve cell characteristics based on a cascade-stage position of the cell and/or the expected state of charge of electrolyte reactants flowing through the cell. Such optimizations are discussed in further detail below.

Within some embodiments of a single redox flow battery, individual cells or groups of cells may use different separator materials than other cells in the battery. For example, the membrane separator 1012 may be made from different materials in different cells so as to exhibit varying diffusion selectivity and ionic resistance. These and other properties of membrane separators can be configured based on an expected state of charge within a cascade stage. Optimization of separator materials and material properties based on a cascade-stage position of a cell and/or the expected state of charge of electrolyte reactants flowing through the cell is discussed in more detail below.

One source of losses in a redox flow battery is due to mixing or leakage of reactants along the edges of the membrane separator 1012. Such losses may be eliminated by sealing the membrane separator material edges. Such edge sealing may be accomplished by fusing the material by heating it to an elevated temperature while compressing it, such as with an iron or vise, such as described above with reference to FIG. 8. Alternatively, gaskets may be positioned around the periphery of each cell chamber for sealing. In further alternative embodiments, the separator membrane may be bonded to a frame or backing material as described, for example in US Patent Application Publication No. 2010/0092757, filed on Oct. 9, 2009. In some embodiments, a separator material may be sandwiched between two layers of frame material and bonded with adhesives or solvents. Any other method of sealing a separator membrane to edge-leakage can also be used in connection with the systems herein.

Electrolytes used in redox flow batteries are typically substantially caustic, i.e., significantly acidic or basic aqueous solutions. Therefore, any flow battery components directly contacting the liquid electrolyte are preferably made of or coated with materials that will not significantly dissolve or degrade in contact with the electrolyte. Additionally, it is desirable to prevent the dissolution of additional metals into the electrolytes, since such additional metals can act as impurities, which can significantly negatively affect flow battery performance.

Figure 22:
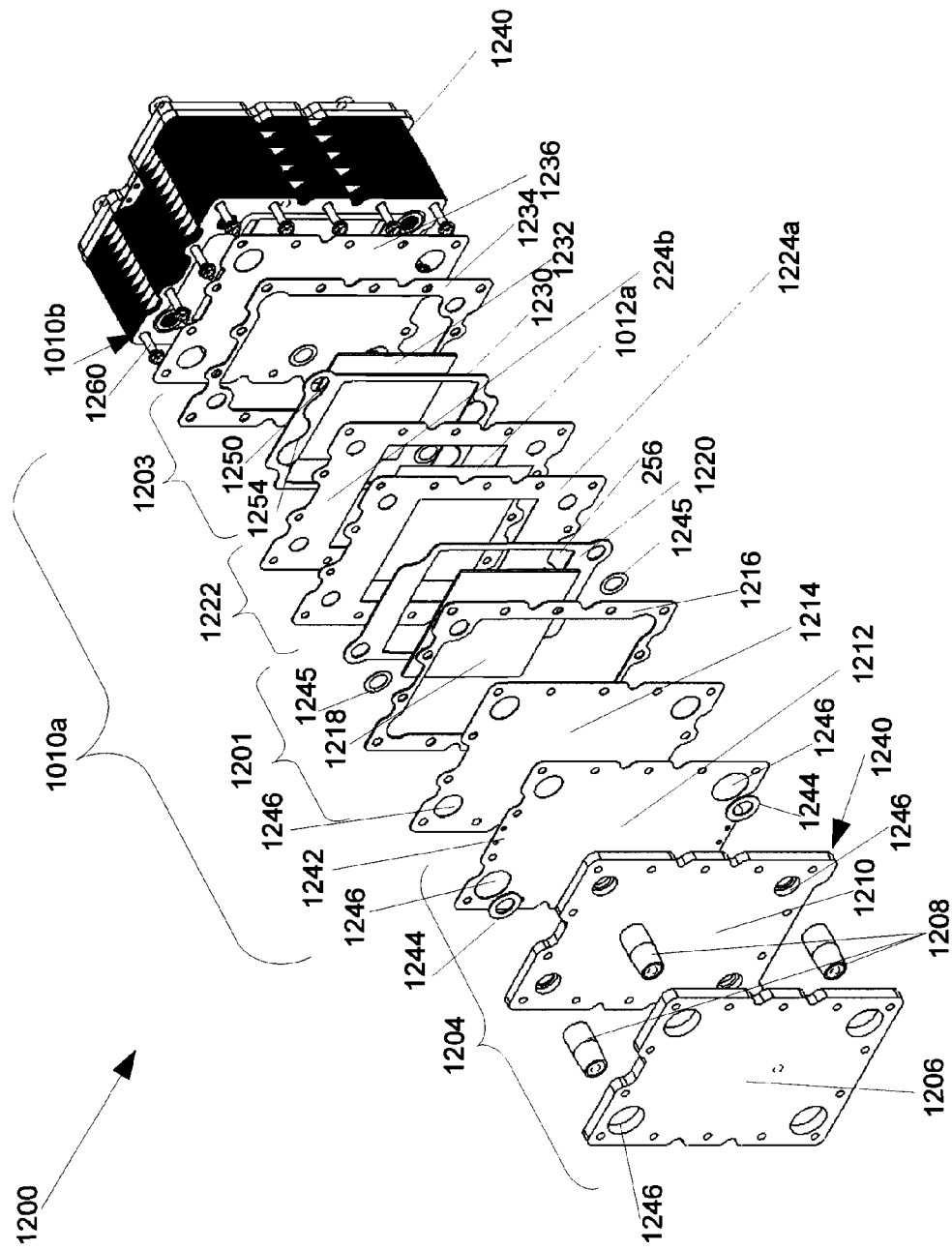
FIG. 22 is an exploded perspective view of one embodiment of a block of electrochemical cells configured for use in a redox flow battery system.
Figure 23:
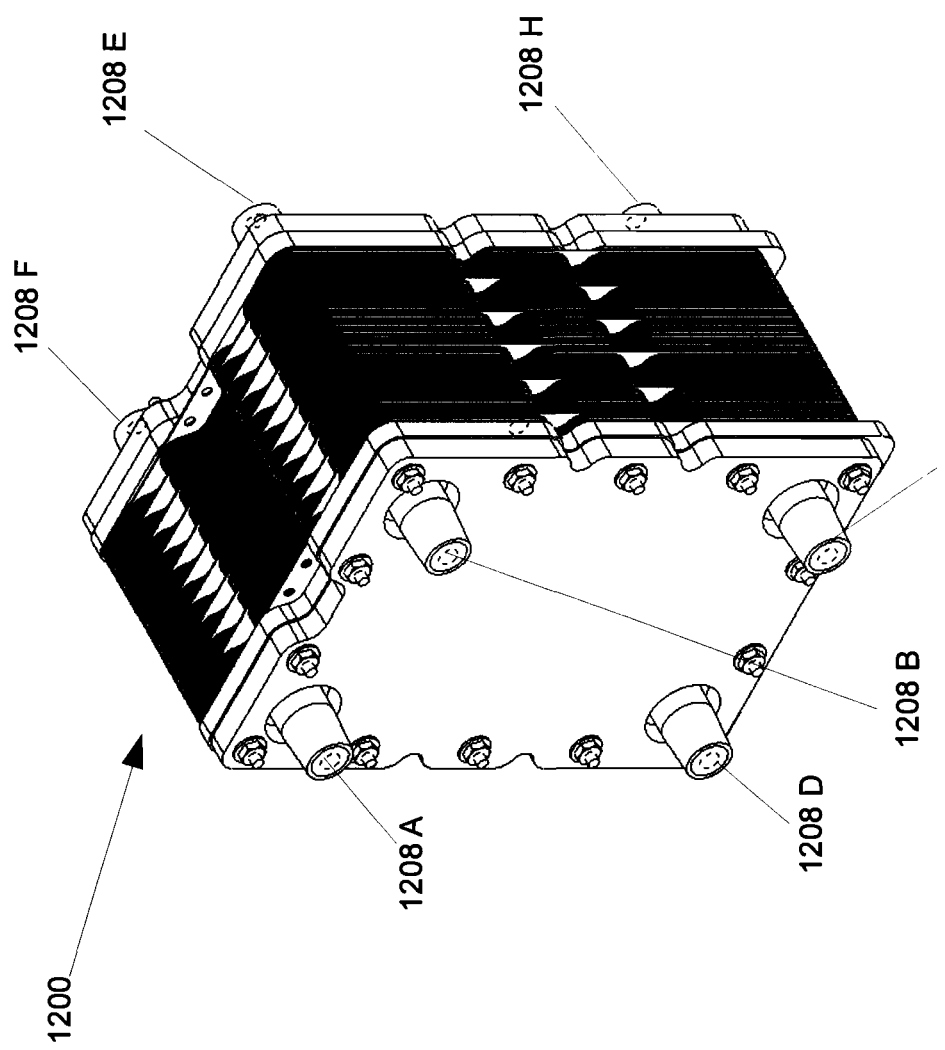
FIG. 23 is a perspective view of an assembled cell block similar to that of FIG. 3.

FIGS. 22 and 23 illustrate embodiments of a flow battery cell block 1200 made up of a plurality of single cells 1010 combined and assembled into a single cell block structure 1200. The flow battery cell block 1200 illustrated in FIGS. 22 and 23 efficiently utilizes thin layers of various materials to form a block of many cells in a relatively small package. The illustrated cell block 1200 may be configured such that electrolytes flow in parallel through all cells in the block before exiting the block.

FIG. 22 illustrates an exploded view of one embodiment of a 16-cell block 1200. Components of the cell block will be described from left-to-right as shown. For simplicity of description, the first cell 1010*a* of the block 1200 will now be described assuming the left side electrode of the first cell 1010*a* is a positive electrode 1014. As will be clear from the figures and the following description, the cell block 1200 could just as easily be arranged such that the left side electrode of the first cell 1010*a* is negative. The cell block 1200 generally includes a plurality of cell elements sandwiched between outer common elements 1204.

From left-to-right the common elements of the example cell block 1200 include an outer structural support plate 1206, four electrolyte inlet/outlet ports 1208, a fitting plate 1210, and an electric terminal plate 1212. A first electrochemical cell 1010*a* includes a first conductive bipolar plate 1214, a first positive half-cell 1201 including a first positive-side gasket 1216, a first positive porous electrode 1218, and a first catholyte flow channel layer 1220. A first separator assembly 1222 includes a separator membrane 112*a* sandwiched between first 1124*a* and second 1224*b* window frames. To the right of the first separator assembly 1222 may be a first negative half-cell 1203 including a first anolyte flow channel layer 1230, a first negative porous electrode 1232 and a first negative-side gasket 1234. A second bipolar plate 1236 may enclose the negative half-cell and be shared with the second cell 1010*b* which lies to the right of the second bipolar plate 1236. The second and subsequent cells may include all of the same elements as the first cell 1010*a*, with bipolar plates being shared by adjacent cells. The outer common elements 1204 may also be repeated at the right side of the stack. These include a second terminal plate 1212, a second fitting plate 1210, a second group of inlet/outlet ports 1208 and a second outer structural support plate 1206. All elements of the cell block 1200 may include fluid pass-through holes 1246 through which electrolyte will flow.

This simple layered design allows additional cells to be added with minimal effort. Thus, while the illustrations of FIGS. 22 and 23 show cell blocks 1200 with 16 cells 1010, cell blocks 1200 of this design could also be assembled with any number of cells.

The structural support plates 1206 generally provide structural rigidity to the cell block 1200, and may therefore be made from a substantially rigid material. Since the support plates 1206 are not in direct contact with the caustic electrolytes, they can be made from low-cost, high-strength materials such a steel or aluminum. In alternative embodiments, the support plates can be made of titanium or other more costly metals. In further alternative embodiments, the support plates 1206 can be made of high-strength polymers, such as polycarbonate or some forms of HDPE. The support plates 1206 are preferably of a sufficient thickness and strength that they provide the desired degree of rigidity at the center of the plate to counteract internal pressures, but sufficiently thin to fit within desired physical dimension and weight requirements. In some embodiments, the support plate 1206 may be coated or painted with a non-reactive and non-conductive coating.

The fitting plate 1210 may provide electrical insulation (if needed) and a hydraulic seal between the support plate 1206 and the conductive terminal plate 1212. The fitting plate may also provide a surface against which the fluid inlet and outlet ports 1208 will seal once the cell block 1200 is assembled. As such, the fitting plate 1210 is preferably made of an electrically insulating material that is also impervious to the caustic electrolytes. Thus, in some embodiments, the fitting plate may be made of polypropylene, polyethylene, high density polyethylene, polyvinyl chloride, or another suitable material. The fitting plate is typically between about 0.25 inches and about 1.0 inch thick. In some embodiments, the thickness of the fitting plate 1210 may be selected based on characteristics of a seal with the inlet/outlet ports. In some embodiments, the inlet/outlet ports may solvent welded to the fitting plate 1210.

In some embodiments, the fitting plates 1210 and/or the support plates 1206 may include feet 1240 projecting beyond the outer boundaries of other cell block elements, thereby providing a support stand for the cell block 1200. In alternative embodiments, the illustrated feet 1240 may be replaced by larger and/or differently shaped projections configured for attaching the cell block 1200 to other support structures as needed.

The terminal plate 1212 may include terminal tabs 1242 providing an electrical connection point for electrically joining the cell block 1200 to a charge/discharge circuit, other cell blocks, measurement/monitoring equipment, or any other electric circuit. Electrical connections may be made with simple clamps or alligator clips. Alternatively, more permanent electrical connections may be made by bolting or otherwise joining electrical contacts through holes in the tabs 1242. The terminal plate 1212 may physically contact an outer bipolar plate 1214 to capture and conduct electric current from the cells through the outer bipolar plate 1214. Therefore, the terminal plate 1212 is preferably made of a highly electrically conductive material. In the illustrated embodiment, the terminal plate 1212 is insulated from the caustic electrolytes by the outer bipolar plate 1214. Thus, in the illustrated embodiment, the terminal plate 1212 may be made of copper, aluminum, or other relatively inexpensive, electrically conductive materials. In some embodiments, the terminal plate 1212 may be omitted by providing a conductive surface on the fitting plate 1210.

In some embodiments, a rubber, silicone or other non-reactive, compressible plastic ring gasket 1244 is positioned within electrolyte-pass-through holes 1246 in the terminal plate 1212. The ring gasket 1244 may be sized such that its outer diameter fits within the inner diameter of a pass-through hole 1246 in the terminal plate 1212. A corresponding pass-through hole 1246 in the bipolar plate 1214 may be sized such that its internal diameter is substantially the same as an internal diameter of the ring gasket 1244. Thus, in an assembled state, the ring gasket may be compressed between an inlet/outlet port 1208 and the outer surface of the outer bipolar plate 1214. The ring gasket seals the electrolyte passageway, preventing electrolyte from contacting the terminal plate 1212.

In some embodiments, a washer 1245 may be provided which fits inside the inner diameter of a pass-through hole 1246 in the bipolar plate 1214 and seals against a portion of the ring gasket 1244 to protect an internal edge surface of the bipolar plate from the caustic electrolytes. In some embodiments, the washer 1245, which may be made of any suitable plastic material, may be bonded to or integrally formed with the flow channel layer 1220 and/or 1230. In alternative embodiments, an edge surface of the bipolar plate may be treated and/or sealed to resist electrolyte absorption or degradation.

In some embodiments, the first bipolar plate 1214 may be a solid carbon plate. The purpose of the bipolar plate is to collect electric current from the porous electrode and electrolyte which directly contacts the bipolar plate 1214 in the assembled cell block 1200. Thus, the bipolar plate 1214 may be made of a highly electrically conductive material impervious to the caustic environment of the electrolytes. A bipolar plate thickness is preferably selected by balancing a desired conductivity with the mechanical strength of the plate. A thinner plate is better for electrical conductivity, but some degree of mechanical strength may be needed. In some embodiments bipolar plates may have a thickness of 0.5 mm or less, depending on the mechanical strength needed. Plates with a greater thickness, e.g., up to 1 mm or more, may also be used.

In alternative embodiments, the terminal plate 1212 may be integrally formed with the outer bipolar plate 1214, such as by providing electrical connection points directly on the bipolar plate 1214. Alternatively, electrical connection tabs of copper, aluminum or another suitable metal may be welded, soldered, mechanically joined or otherwise attached to portions of the outer bipolar plate 1214.

In the cell block of FIG. 22, a first positive electrode chamber may be formed by the interaction of a combination of elements. The positive-side gasket 1216 may be sized and shaped to substantially exactly surround the catholyte flow channel layer 1220, thereby sealing the periphery of the flow channel layer 1220. The positive-side gasket 1216 seals against the outer bipolar plate 1214 and the first separator window frame 1222. Thus, the positive electrode space is defined as the space within the internal cutout of the catholyte flow channel layer and between the right surface of the first bipolar plate 1214 and the left surface of the separator membrane 1012*a*.

The gasket 1216 may have a thickness sized to be substantially equal to a thickness of the flow channel layer 1220 in an assembled state. In some embodiments, the gasket 1216 may be sized to be slightly thicker than the flow channel layer 1220 such that the thickness of the gasket 1216 can be reduced under the clamping pressure. For example, in one embodiment, a flow channel layer has a thickness of about 0.118 inch and a gasket 1216 has a thickness of about 0.125 inch. The gasket 1216 may be made of any suitable material capable of being compressed and sealing against the bipolar plate 1214 and the separator window frame 1222. For example, the gasket 1216 may be made of rubber, silicone, ethylene propylene diene monomer (EPDM) rubber, or any other suitable material.

The porous electrodes 1218, 1232 are preferably sized to fit exactly within their respective electrode space. In some embodiments, the porous electrodes 1218, 1232 may be sized to be slightly compressed when the cell block is assembled. In alternative embodiments, the porous electrodes 1218, 1232 may be sized to have substantially zero clearance within the electrode space. For example, in one embodiment, the thickness of the electrode space may be equal to the thickness of the flow channel layer 1220. In some embodiments, this electrode space thickness is about 3 mm (0.118 in.) and the thickness of the porous electrode is nominally about 5 mm. In alternative embodiments, the positive and/or negative electrode spaces may be sized and/or configured to include flow channels configured to decrease an internal pressure within the electrode space without substantially reducing reaction efficiency.

The porous electrodes and corresponding electrode spaces may be configured with a variety of combinations of aspect ratio (i.e., length/width), volume and total surface area. Electric power generated by a flow battery reaction cell is proportional to the active area of the electrodes and separator membrane. In some embodiments, the electrodes may be sized with an aspect ratio of about 1:1 (i.e., square), 1:2, 2:1, or any other ratio as desired. The separator membrane will typically have an aspect ratio and dimensions corresponding to the electrodes. In some embodiments, the electrodes and/or separator membranes may have a shape other than rectangular.

The flow channel layer 1220 includes an inlet 1250 in fluid communication with a fluid pass-through hole 1246. Flow channels 1254 join the pass-through holes 1246 of the flow channel layer 1220 with the electrode space 1256 in the interior of the flow channel layer 1220. In some embodiments, inlets and/or outlets in the flow channel layer 1220 may include pressure-reducing deltas shaped like a river delta, in order to facilitate smooth flow of electrolyte into and/or out of the electrode space. In some embodiments, the flow channel 1254 includes a cutout extending entirely through the flow channel layer 1220. In alternative embodiments, the flow channel 1254 includes a trench in only one side of the flow channel layer 1220. In still further embodiments, the flow channel 1254 includes a trench on both sides of the flow channel layer with a strip of material in between.

The flow channel layer 1220 may be made of a plastic material such as polyethylene, polypropylene, polyvinyl chloride or any other material capable of withstanding the caustic environment of the electrolytes.

The separator window 1222 includes a top layer 1224*a* a membrane separator 1012*a*, and a bottom layer 1224*b*. In the illustrated embodiment, the top layer 1224*a* and the bottom layer 1224*b* may be substantially identical to one another. In alternative embodiments, the top layer 1224*a* and bottom layer 1224*b* may be minor images of one another. In some embodiments, the separator membrane 1012*a* may be secured between the top 1224*a* and bottom 1224*b* window layers by compression alone. In alternative embodiments, the separator membrane 1012*a* may be secured between the top 1224*a* and bottom 1224*b* window layers by an adhesive, a solvent, heat bonding, welding, or any other method or procedure.

As can be seen in FIG. 22, the negative flow channel layer 1230, negative porous electrode 1232, negative-side gasket 1234 and the second bipolar plate 1236 may be all identical to the same elements on the positive side of the separator window 1222. The negative flow channel layer may be rotated 180 degrees about a vertical axis relative to the positive flow channel layer 1220. This re-use of elements within the cell block 1200 advantageously reduces the number of different parts, thereby reducing manufacturing costs.

As will be clear to those skilled in the art, the second bipolar plate 1236 collects a negative electric charge on its left surface and a positive electric charge on its right surface (in this example). In this way, all cells in a flow battery cell block 1200 of this design may be joined in electrical series with one another. Any number of additional cells may be added by repeating the positive half-cell 1201, separator window 1222, and negative half-cell 1203 elements described above.

In some embodiments, the layered components of the cell block 1200 may be clamped together with bolts 1260 extending through bolt holes in each element. The size, number and arrangement of bolt holes may be varied as needed for a particular set of design requirements. In the illustrated embodiment, a cell block includes 14 bolt holes around the periphery of the each element. This provides adequate clamping pressure to ensure tight seals at all fluid junctions within the cell block.

For the purpose of the present example, the top-left inlet/outlet port 1208 in the first (i.e., left) structural support plate 1206 will be described as a catholyte inlet port. Continuing with this example, operation of a cell block embodiment illustrated in FIG. 22 will now be described.

As catholyte is pumped into the inlet port 1208, the catholyte may pass through the ring gasket 1244 without contacting the first terminal plate 1212. Catholyte then may pass through the corresponding pass-through holes 1246 in the first bipolar plate 1214 and the first positive flow channel layer 1220. Once sufficient downstream pressure builds up, catholyte will flow through the inlet channel of the flow channel layer 1220 and into the positive electrolyte space occupied by the positive porous electrode 1218. After flowing through the electrode 1218, the catholyte may exit the positive electrode space through the outlet channel in the flow channel layer 1220 and then through the lower-right pass-through hole 1246. The catholyte may then bypass the negative electrode space by passing through the lower-right pass-through holes 1246 in the negative-side gasket 1216 and the second bipolar plate 1214. Catholyte may then enter the positive electrode space of the second cell via the bottom-right pass-through hole.

FIG. 23 illustrates an assembled cell block of the embodiment of FIG. 22. For description purposes, the eight inlet/outlet ports 1208 in the cell block 1200 are labeled A-H clockwise beginning with the upper-left inlet port in the left support plate 1206. In the illustrated embodiments, diagonally-opposite inlet/outlet ports form inlet/outlet pairs for the same electrolyte. For example, if the first top-left port A is selected as the catholyte inlet port, the bottom-right port on the opposite end of the cell block H will be the catholyte outlet port. In the same example, electrolyte can be easily pumped in the opposite direction, thereby making port H the inlet, and port A the outlet.

Under normal operation, the ports exactly opposite the active ports will be closed, such as by valves or caps. For example, if port A is used as the catholyte inlet port, port E will be closed, thereby forcing electrolyte through the cells and out of the cell block through port H. If it is desirable to bypass the entire cell block (using the same example), port E can be opened while optionally closing port H. Electrolyte will thereby be directed through the top-left fluid bypass holes in every cell block element. With port E open, this bypass operation is likely to occur in substantially the same way even without closing port H, since an incompressible electrolyte will tend to follow a path of least resistance to flow. Thus, depending on the desired configuration and mode of operation, any of the eight ports may be an inlet or an outlet for either anolyte or catholyte.

The inlet/outlet ports 1208 may be hydraulically connected to tanks, pumps and/or other cells in any configuration as needed to form a complete flow battery stack assembly. For example, by joining a plurality of cell blocks 1200 in hydraulic series, such that outlet ports of a first cell block are joined to inlet ports of a second cell block (via inter-stage components, in some embodiments), a multi-stage cascade can be assembled. In such a system, each cell block makes up a cascade stage with a plurality of cells. In some embodiments, components of a single block/stage may be configured according to the expected state-of-charge of electrolytes at that point in the cascade as discussed herein.

FIGS. 7B, 7C, 24 and 25 illustrate embodiments of flow battery stack assemblies including multiple electrochemical cells configured in a "cascade" or "stepped" arrangements. In a cascade arrangement, electrolyte is directed to flow in series through a plurality of steps or stages. At each stage along the series, electrolyte reacts inside one or more electrochemical cells before proceeding into the next stage. A stage may include a single cell, a single cell block made up of multiple cells, or a plurality of cell blocks.

Figure 24:
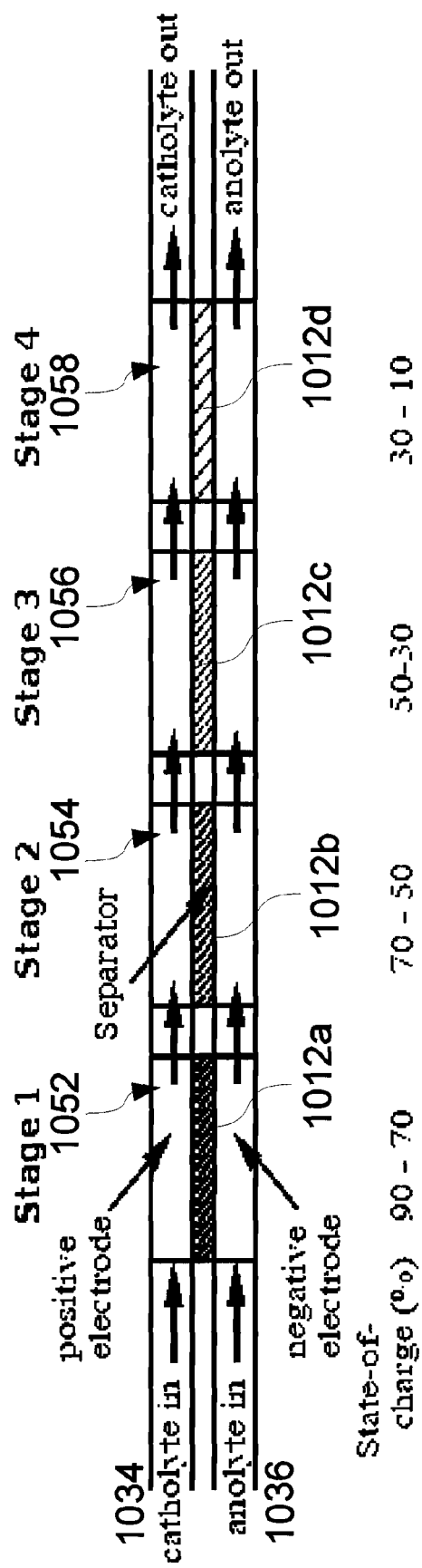
FIG. 24 is a schematic illustration of an embodiment of a flow battery stack assembly comprising a four-stage cascade arrangement.

Embodiments of redox flow battery systems described herein advantageously include cells or cell blocks in engineered cascade arrangements as shown, for example, in FIG. 24. A cascade redox flow battery includes a plurality of electrochemical cells arranged in stages, such that electrolyte flows from a storage tank 1034, 1036, to the cell or cells of a first stage 1052, then from the cell or cells of the first stage 1052 to the cell or cells of a second stage 1054. Electrolyte then flows from the second stage 1054 to the cell or cells of a third stage 1056 and from the third stage 1056 to the cell or cells of a fourth stage 1058, etc. During a discharge cycle, as electrolytes travel through and react in the cell or cells at each cascade stage, the chemical compositions of the electrolytes change in a way that decreases the overall state-of-charge of the battery, thereby creating a state-of-charge gradient between electrolyte in a first stage 1052 adjacent an inlet end of the cascade flow path, and electrolyte in a final stage 1058 adjacent an outlet of the cascade flow path.

For example, the system of FIG. 24 can be described as a cascade flow battery in a discharge cycle with electrolytes flowing from left to right. As shown, the electrolytes entering the first stage 1052 have a state-of-charge of about 90%. The electrolytes will react in the electrochemical cell or cells of the first stage 1052 such that the electrolyte concentrations change from a first (higher SOC) state to a second (lower SOC) state. After reacting in the cell or cells of the first stage 1052, the electrolytes will have a decreased state-of-charge (i.e., an overall decreased stored electrical energy), such that electrolytes entering the second stage will have an overall state-of-charge of about 70%. The electrolytes will again electrochemically react in the cell or cells of the second stage 1054, thereby reducing the electrolyte concentrations from a second state of about 70% state-of-charge to a third state of about 50% state-of-charge. The electrolytes will again electrochemically react in the cell or cells of the third stage 1056, thereby further reducing the electrolyte concentrations to a fourth state of about 30% state-of-charge. The electrolytes will react in the fourth stage 1058, further reducing the state-of-charge to a fifth state of about 10% state-of-charge.

In an engineered cascade arrangement, the configurations of the cells at each stage may be configured for the expected state-of-charge condition of the electrolytes at that stage or in those cells. Therefore, physical and chemical characteristics of the cell or cells in the first stage 1052 may be configured so as to provide conditions for an efficient electrochemical reaction with the expected state of charge of the electrolytes ranging from the first state (e.g., about 90% SOC) to the second state (e.g., about 70% SOC), and the cell or cells of the second stage 1054 may be configured so as to provide conditions for an efficient electrochemical reaction from the second state (e.g., about 70% SOC) to the third state (e.g., about 50% SOC), and so on.

The number of cascade stages and the number of cells per stage are additional design variables which may be any desired value. Cascade redox flow batteries according to the embodiments herein may include any number of cascade stages, and any number of electrochemical cells in each stage. In some embodiments, engineered cascade redox flow batteries will have between two and ten stages, with each stage having one to about 20 cells.

In the embodiment of FIG. 24, the flow battery is neither 100% charged nor 100% discharged. In some embodiments, this mode of operation may be preferred in order to minimize various adverse reactions which occur in some flow batteries at very high and/or very low states-of-charge. However, in other embodiments, electrolyte entering a first stage 1052 may have a state-of-charge as high as approximately 100%, and the electrolyte exiting the last stage (e.g., the fourth stage 58 in the embodiment of FIG. 24) may have an overall state-of-charge of approximately 0%.

This engineered cascade flow battery arrangement provides several advantages, including limiting shunt currents and improving overall reactant utilization. The engineered cascade flow battery also improves reactant utilization compared to that of a non-cascade redox flow battery. Improving reactant utilization helps to improve the roundtrip DC efficiency of the redox flow battery and reduces or eliminates the need to re-circulate electrolytes multiple times through a stack assembly. Recirculation may be disadvantageous because it may involve more pumping power per kW of stored energy capacity, which increases parasitic losses. Engineered cascade redox flow battery systems also have greater overall electrical storage performance than is possible with a cascade arrangement in which cells at all stages are not configured based on the expected state-of-charge gradient.

Several physical, structural, chemical and other characteristics and properties of the components in the electrochemical cells may be varied when configuring cells based on the cell's position in the cascade or the expected condition (e.g., SOC) of reactants in the cell, which may depend upon the cell's position in the cascade as well as expected or design operating conditions of the cascade flow battery system. For example, any of the following properties may be varied in configuring cells based on their position in the cascade or expected reactant conditions: catalyst loadings; reaction suppressant loadings; catalyst materials; reaction suppressant materials; catalyst activities; reaction suppressant activities; electrode thicknesses; electrode material types; electrode tortuosities; chamber volumes; flow channel dimensions; flow channel shapes; membrane separator porosities; average pore size of membrane separators; separator thicknesses; separator tortuosities; and separator selectivities. These and other parameters may be adjusted to accommodate the variations in reactant concentration (and state-of-charge) expected in each cell according to its position in the flow path of a cascade flow battery. These parameters may be varied individually or collectively (i.e., two or more of the parameters may be adjusted to the match the cell's expected reactant conditions). Other factors that may be considered in selecting and optimizing cell parameters include optimizing coulombic and voltage efficiencies for operation over a range of current densities.

Figure 25:
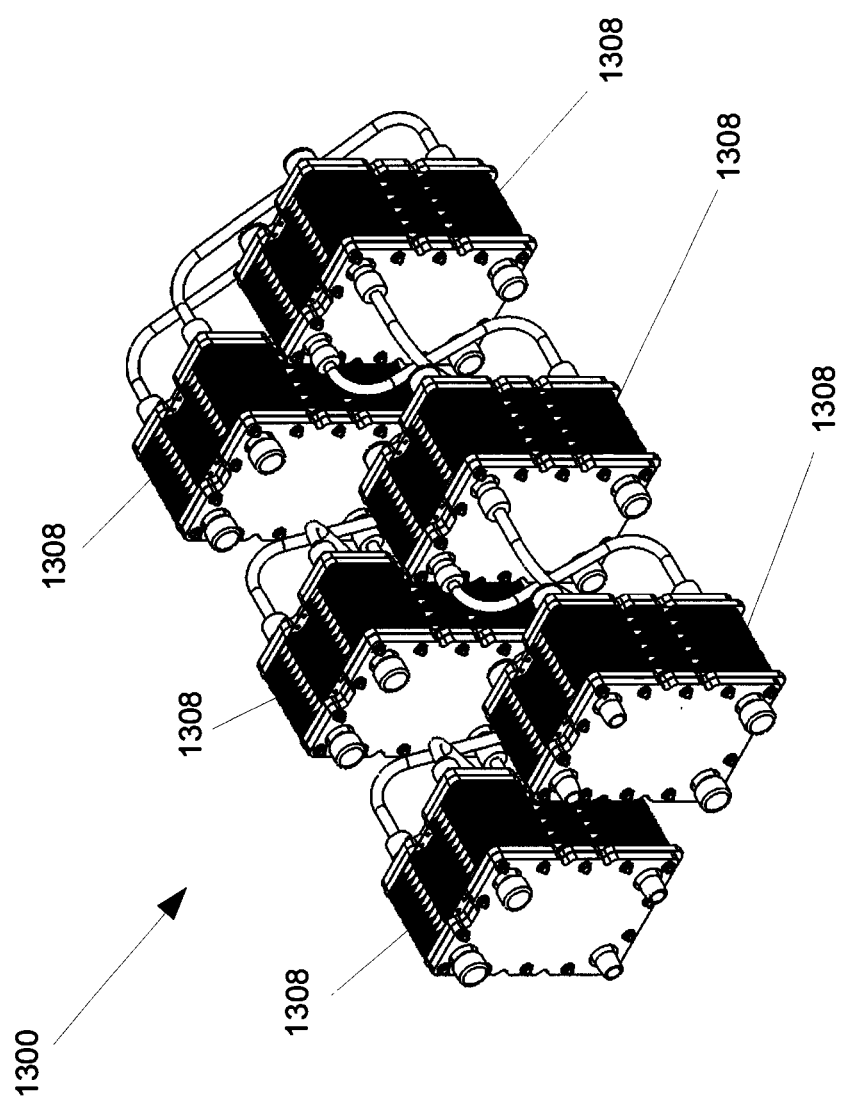
FIG. 25 is a perspective view of a flow battery stack assembly comprising cell blocks in a six-stage cascade arrangement.

Blocks of electrochemical cells may be arranged in cascades in any suitable physical, hydraulic and/or electrical arrangement meeting a desired set of design parameters. FIGS. 7B, 7C and 25 illustrate some embodiments of cascade flow battery designs. However, these are only examples, and many other suitable arrangements utilizing the features and advantages described herein are also possible.

FIG. 7B illustrates one embodiment of a cascade redox flow battery stack assembly 10 made up of a plurality of multi-cell layers 48 in a unitary enclosure. In some embodiments, each layer 48*a*, 48*b*, 48*c* may include a plurality of electrochemical cells in a cascade arrangement. In the embodiment illustrated in FIG. 7B, the collection of "cell 1" cells 52 form a first cascade stage, the collection of "cell 2" cells 54 form a second cascade stage, and the collection of "cell 3" cells 56 form a third cascade stage. A plurality of these multi-cell layers may be stacked together and electrically connected to one another in order to achieve the desired output voltage. For example, in some embodiments, all of the cells may be electrically connected in series. In alternative embodiments, the cells of a single layer may be electrically connected to one another in parallel, while layers may be connected to one another in series. For example, the "cell 1" 52*a* of the first layer 48*a* may be electrically connected in series with the "cell 1" 52*b* of the second layer 48*b*, and the "cell 1" 52*c* of the third layer 48*c*, while "cell 2" 54*a* of the first layer 48*a* may be electrically connected in parallel to one or more of the "cell 1" cells 52. In an alternative embodiment, all cells in the FIG. 7B stack assembly may be connected in electrical series to achieve a higher voltage. Any other electrical connection arrangement, including various combinations of parallel and series connections, may also be used depending on the particular requirements at hand.

In engineered cascade embodiments, the design parameters of each one of the first cells 52*a*, 52*b*, 52*c* may be configured according to the expected state-of-charge of the electrolytes in those cells, and thus may be different from the design parameters of each second cell 54*a*, 54*b*, 54*c* and each third cell 54*a*, 54*b*, 54*c* within the cell layers 48*a*, 48*b*, 48*c*.

FIG. 7C illustrates an alternative embodiment in which cells are constructed independently rather than constructed as multiple cells in a single unibody frame. Independently constructed cells may then be physically, hydraulically and electrically connected to one another in any arrangement providing the desired energy storage and delivery properties. For example, a plurality of cells can be stacked vertically together to form independent stacked-stages, as shown in FIG. 7C. In some embodiments, the stacked stages may be combined into a unitary enclosure to form a unitary stack assembly. In alternative embodiments, each stacked stage may have its own enclosure separate from other stacked stages.

FIG. 25 illustrates an embodiment of a cascade flow battery stack assembly including a plurality of cell blocks 1208, each including its own enclosure and inlet/outlet ports. The cell blocks of FIG. 25 may be those of the embodiments illustrated in FIGS. 22 and 23, for example. In the embodiment illustrated in FIG. 25, the cell blocks 1200 may be connected to one another in hydraulic series such that each block is a separate cascade stage. Thus, the system illustrated in FIG. 25 includes a six-stage cascade, where each stage includes a block of many cells. In some embodiments, the cells within each cell block may be configured with characteristics configured for an expected state-of-charge condition within the cascade.

FIG. 6 illustrates the performance advantages achieved by configuring electrochemical cell components based on the position of the cell within a cascade (i.e., the cell's cascade-stage position) or on the expected state of the reactants flowing through the cell (which, again, will typically depend upon its position in the cascade). The polarization curve 122 illustrates the output voltage as a function of output current of a conventional redox flow battery that does not include engineered cascade cells. This poor performance curve 122 falls well below the ideal performance curve 120 which may be approached by the embodiments of redox flow battery designs implementing the engineered cascade configurations of the various embodiments.

Figure 26:
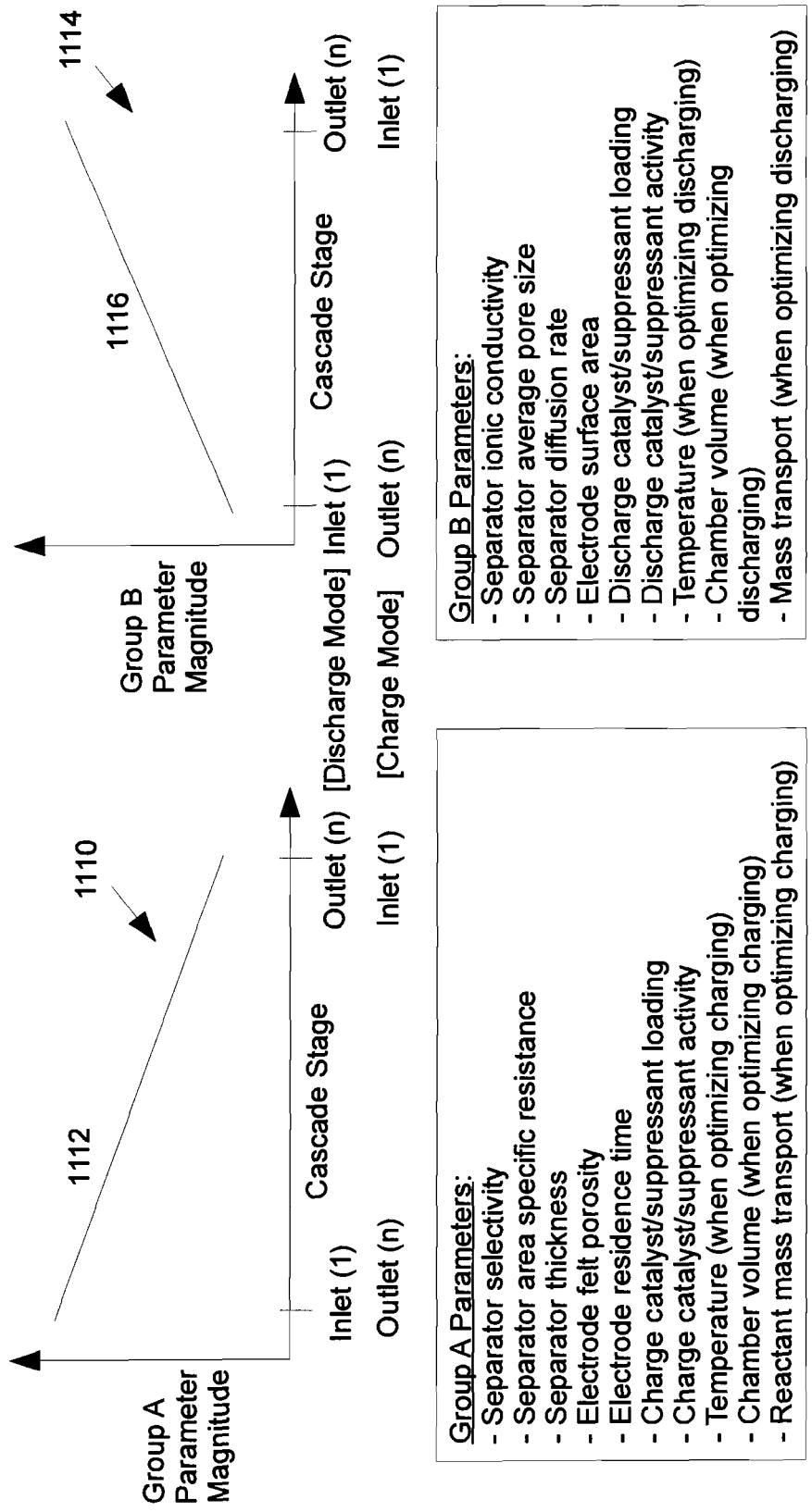
FIG. 26 illustrates a pair of design trend lines and parameters for use in optimizing cells in a flow battery stack assembly with a cascade arrangement.

FIG. 26 summarizes some of the design configuration parameters that may be controlled and the manner in which the parameters are varied along the reactant flow path in order to improve electrical performance of each independent cell in the redox flow battery based on its position and/or the expected state of reactants flowing through the cell. As illustrated in design trend line 1112, for some design parameters—illustrated as Group A parameters—the performance of cells may be improved in a discharge mode by may be configured by quantitatively decreasing the parameter from a higher value in the first stage (i.e., closest to the stack assembly inlet) to a lower value at the nth stage (i.e., closest to the stack assembly outlet). For the same Group A parameters performance of cells in a charging mode can be improved by quantitatively increasing the parameter from a lower value in the first stage (i.e., closest to the stack assembly inlet) to a higher value at the nth stage (i.e., closest to the stack assembly outlet). In some embodiments, stages between the first and nth stage will have properties generally between the properties of the first stage and properties of the nth stage. In some embodiments, the design trend line is linear as shown in FIG. 26, while in other embodiments, design trend lines may follow another curve, but will typically exhibit the start-to-finish differences discussed above.

As illustrated in design trend line 1116, for other design parameters—illustrated as Group B parameters—the performance of cells may be improved in a discharge mode by quantitatively increasing the parameter from a lower value in the first stage (i.e., closest to the stack assembly inlet) to a higher value at the nth stage (i.e., closest to the stack assembly outlet). For the same Group B parameters the performance of cells may be improved in a charge mode by quantitatively decreasing the parameter from a higher value in the first stage (i.e., closest to the stack assembly inlet) to a lower value at the nth stage (i.e., closest to the stack assembly outlet). In some embodiments, stages between the first and nth stage will have properties generally between the properties of the first stage and properties of the nth stage. Such intermediate stages will generally have Group B properties falling along the trend line 1116.

In some flow battery systems, the reaction rate of the anolyte charge reaction may be more limited than other reactions. In such embodiments, it may be advantageous to configure each cell design parameters based on the design curve 1112 shown in FIG. 26. As illustrated, the Group A design parameters that may be varied to improve battery cell performance based on the position in the cascade (and thus state of reactants flowing through the cell) according to design trend line 1112 include: separator membrane selectivity; separator area specific resistance; separator thickness; electrode felt porosity; electrode residence time; charge catalyst loading; charge catalyst activity; reaction suppressant loading; reaction suppressant activity; temperature (when configuring cells for charging); chamber volume (when configuring cells for charging); and reactant mass transport (when configuring cells for charging).

In some embodiments of an engineered cascade flow battery stack assembly, cells may be configured with design parameters selected for the average electrolyte concentration (i.e., state-of-charge condition) expected within each cascade stage, which may provide a stair step approximation of the design trend lines illustrated in FIG. 26. By increasing the number of independent cascade stages along the reactant flow path, the cell design parameters can better match the design trend lines to improve the flow battery's energy efficiency.

The Group B design parameters that may be varied to configure battery cell designs according to design trend line 1116 include: ionic conductivity; separator average pore size configuring cells for separator diffusion rate configuring cells for electrode surface area configuring cells for discharge catalyst/suppressant loading; discharge catalyst/suppressant activity; temperature (when optimizing discharging); chamber volume (when optimizing discharging); and mass transport rate (when optimizing discharging).

In some embodiments, only one or two parameters may be adjusted in configuring cells for each cascade stage position. In alternative embodiments, as many as all of the parameters described herein may be adjusted in configuring cells for each cascade stage position. In some embodiments, configuration design choices may be made on a cost-savings basis, by selecting higher-cost elements for stages with particularly high and/or low state-of-charge conditions, while using less-costly elements for stages with state-of-charge conditions closer to 50%. Thus, cells may be configured based on their location in the cascade or expected reactant state to achieve performance that is less than some possible or theoretical optimum in order to meet a variety of design, cost and performance objectives.

Embodiments of further representative engineered cascade stack assembly design parameters and performance characteristics for a three-stage engineered cascade configuration are listed in Table 2 below. Ranges of the state-of-charge of reactants at each stage are provided for reference, although alternative embodiments may utilize different state-of-charge ranges.

TABLE 2

Cell Configuration Design Variables vs. Expected State-of-Charge

| Expected State of Charge (%) | 90%-62% | 62%-34% | 34%-6% |
|---|---|---|---|
| Electrode Surface Area | Lower | Medium | Higher |
| Electrode Felt Porosity | Higher | Medium | Higher |
| Electrode Discharge Catalyst Loading | Lower | Medium | Higher |
| Electrode Charge Catalyst Loading | Higher | Medium | Lower |
| Electrode Residence Time | Longer | Medium | Shorter |
| Separator Selectivity | More Selective | Medium | Less Selective |
| Separator Area Specific Resistance | Higher | Medium | Lower |
| Separator Diffusion Rate | Lower | Medium | Higher |
| Separator Average Pore size | Smaller | Medium | Larger |
| Separator Thickness | Thicker | Medium | Thinner |

Materials used for porous electrodes in a redox flow battery system typically include porous carbon felt materials. Carbon felts are generally available for use in a variety of applications, including thermal insulation. Carbon felts made for insulation are available at relatively low costs, but are not necessarily sufficiently uniform in their porosity or average pore size. Carbon felts with controlled designed characteristics may be obtained by custom manufacturing processes, but such custom materials will typically be more costly. For example, it may be desirable to use a carbon felt with a relatively high porosity (i.e., a larger ratio of open volume to solid volume) in order to increase a volumetric flow rate of electrolyte through the felt. It may be more desirable to control reactions at relatively high and low states-of-charge than at state-of-charge conditions closer to 50%. Therefore, in some embodiments, higher cost, optimally designed carbon felts may be used in cascade stages with high and/or low state-of-charge conditions, while using less costly felts in stages with expected state-of-charge conditions closer to 50%.

Chamber volume refers to the interior volume of the cell housing, including the space occupied by the combination of any bonding layer between the bipolar plate and negative electrode, the negative electrode, the membrane separator, the positive electrode, and any bonding layer between the positive electrode and the bipolar plate. In some embodiments, configuring the volume of the cell chamber based on position or expected reactant state may entail increasing the volume of the positive or negative electrode side to offset the volume occupied by any gases formed during operation. In an Fe/Cr flow battery system, hydrogen is typically generated at the negative electrode during a discharge reaction, particularly at high state-of-charge. Thus, in some embodiments, a cascade flow battery system utilizing an Fe/Cr chemistry can be configured with a larger negative electrode chamber volume in cells within stages with higher expected state-of-charge conditions relative to other stages in the cascade.

In some embodiments, electrochemical cells may be configured for their cascade-stage position (or expected reactant state) by varying factors affecting the reactant mass transport rate through the cell. The reactant mass transport rate is defined as the mass flow rate of electrochemical reactants passing through and contacting a porous electrode within a cell. The effective reactant mass transport rate through a cell can be varied by increasing or decreasing the physical volume of the cell chamber. For example, decreasing the cell volume will effectively increase the volumetric flow rate of electrolyte within the cell, which will tend to induce more turbulent flow through the porous electrode. Increased turbulence will tend to increase the rate that reactants come into contact with electrode surface, thereby increasing the mass transport rate.

Alternatively, the mass transport rate of a cascade stack assembly can be varied by providing stages with cells having a more restricted flow area closer to one end of the flow path and a more open and less constricted flow area at the other end. In such embodiments, the reactant mass transport rate increases in each stage along the reactant flow path when operated in the charge mode, and decreases in each stage along the reactant flow path when operated in the discharging mode. In some embodiments, the dimensions of a single cell may be varied along its length, such that a cell inlet has a smaller volume than a cell outlet (for example). In alternative embodiments, cells at a first end of a flow path may have uniform, but smaller volume than cells at a second end of a flow path.

The mass transport rate of a cell can also be varied by selecting porous electrodes with materials, shapes or other properties that increase or decrease turbulence within the cells. For example, porous electrode materials with increased tortuosity will tend to exhibit increased electrolyte turbulence and increased mass transport. Overall electrode surface area may also be varied, such as by varying a diameter of graphite fibers making up a porous electrode felt. Increasing electrode surface area will tend to increase mass transport rates.

Thus, in some embodiments where it is desirable to configure a cascade flow battery stack assembly to improve its charge reaction, the cells may be configured so that the reactant mass transport rate decreases in each cell along the flow path from inlet to outlet in the discharge mode, but increases in each cell along the flow path from the inlet to the outlet while in the charging mode. Alternatively, in embodiments for which it is desirable to configure a cascade flow battery stack assembly for a discharge reaction, the cells may be configured such that the reactant mass transport rate increases in each cell along the flow path from inlet to outlet in the discharge mode, and decreases in each cell along the flow path from the inlet to the outlet while in the charging mode.

Electrode residence time is related to the volumetric flow rate of electrolytes through a flow battery cell. An increased volumetric flow rate will result in a decreased electrode residence time, and vice versa. In some embodiments, it may be desirable to express electrode residence time as an optimization parameter for configuring cells. A higher electrode residence time is generally preferred for higher expected reactant concentrations (i.e., higher SOC), in order to allow more time for electrolytes to react within the cell. A lower electrode residence time is preferred for lower reactant concentrations in order to reduce the possibility for parasitic reactions.

Catalysts may be plated, bonded, adhered or otherwise attached to a surface of an electrode in order to increase a rate at which a desired electrochemical reaction occurs. Similarly, reaction suppressants may be applied to an electrode to selectively suppress or reduce the rate at which certain undesirable reactions occur within a cell. The degree of loading and activity of such catalysts or reaction suppressants may be configured based on an expected state-of-charge condition of reactants in a cell and/or the location of the cell within a cascade stage.

In some embodiments, the discharge catalyst loading and discharge catalyst activity (both Group B design parameters) may be configured based on a cell's position in a cascade expected state-of-charge condition of reactants in the cell. Catalyst loading is defined as the quantity of a catalyst that is plated, bonded, coated or otherwise provided on an electrode surface.

Catalyst activity is a measure of the degree of catalysis, or chemical reaction encouragement of a particular catalyst. Catalyst activity can be expressed as the ratio of the rate at which a chemical reaction occurs with the catalyst to the rate at which the same reaction occurs without the catalyst. Similarly, reaction suppressant activity refers to the degree to which a material discourages a particular chemical reaction, and can be expressed in the same terms as catalyst activity. For a given catalyst or suppressant material and a given chemical reaction, catalyst or suppressant activity can be modified by varying factors affecting the rate at which the catalyst or suppressant material come into contact with active species within an electrolyte. Such factors may include surface treatments, crystal size or structure, particle size, etc.

Thus, as used herein discharge catalyst (or suppressant) activity refers to the reaction modifying strength of catalysts (or suppressants) which encourage a discharge reaction (or discourage side-reactions during discharging) within electrochemical cells of a redox flow battery. Similarly, discharge catalyst loading refers to the quantity of a catalyst (or suppressant) covering a surface of the electrode, where the catalyst (or suppressant) encourages a discharge reaction (or discourages side-reactions during discharging) within electrochemical cells of a redox flow battery.

In some embodiments, the discharge catalyst (or suppressant) loading and discharge catalyst (or suppressant) activity may be increased in each cell along the flow path of redox flow battery stack assembly from inlet to outlet in the discharge mode and decreased in each cell along the flow path of redox flow battery stack assembly from inlet to outlet in the charge mode to compensate for decreasing reactant concentrations, as indicated by the design trend line 1116.

Similarly, in some embodiments the charge catalyst (or suppressant) loading and charge catalyst (or suppressant) activity (both Group A design parameters) may be configured based on a cell's position in a cascade. As used herein charge catalyst (or suppressant) activity refers to the reaction modifying strength of catalysts (or suppressants) which encourage a charging reaction (or discourage side-reactions during charging) within electrochemical cells of a redox flow battery. Similarly, charge catalyst loading refers to the quantity of a catalyst (or suppressant) covering a surface of the electrode, where the catalyst (or suppressant) encourages a charge reaction (or discourages side-reactions during charging) within electrochemical cells of a redox flow battery.

Thus, in some embodiments, the charge catalyst (or suppressant) loading and charge catalyst (or suppressant) activity may be decreased in each cell along the flow path of a redox flow battery stack assembly from inlet to outlet in the discharge mode and increased in each cell along the flow path of redox flow battery stack assembly from inlet to outlet in the charge mode to compensate for decreasing reactant concentrations, as indicated by the design trend line 1112. The specific catalyst (or suppressant) loading and activity implemented within each stage in the cascade can be determined using the number of stages in the cascade, the design trend line 1116 with respect to discharging, and trend line 1112 with respect to charging.

Electrical efficiency of the redox flow battery system may be enhanced by heating the reactants to an elevated temperature, such as about 40° to 65° C., using on-site waste heat from equipment or facility cooling systems, geothermal heating systems, solar hot water systems, electrical resistance heaters or any other suitable heat source. In some embodiments, a heating fluid may be heated by such a heat source and pumped through a heat exchanger to heat the electrolytes. Alternatively, heaters or heat exchangers may be incorporated directly into stack assemblies, tank enclosures and/or interstage components.

In some embodiments, the temperature of electrolytes may be controlled as the electrolytes flow through the cascade redox flow battery stack assembly. FIG. 26 illustrates in design curves 1112 and 1116 how the temperature may be controlled along the flow path through the cascade redox flow battery stack assembly. In some embodiments, the temperature of electrolytes may be controlled by heating or cooling electrolytes in storage tanks, while in other embodiments, the electrolyte temperatures may be more discretely controlled by heating or cooling electrolytes at a point just before or just after a cascade stage along a flow path.

The design curve to employ for a given redox flow battery stack assembly may be based on whether a greater improvement in battery efficiency is achieved by configuring the design to improve performance of the discharge reactions or the charge reactions. For example, in an Fe/Cr system, the anolyte charge reaction has the most limited reaction rates, so design trend line 1112 would be selected for the temperature profile design parameter. Thus, for a cascade flow battery stack assembly configured for a charge reaction according to trend line 1112, electrolytes will be heated to a higher temperature for reaction in stages closer to the inlet, and allowed to cool (or actively cooled) for reactions in stages closer to the outlet during a discharge mode. For the same system in a charging mode, electrolytes may be progressively heated along the cascade such that reactants are at a lower temperature in stages closest to an inlet and electrolyte temperatures are higher in stages closer to the outlet.

In a similar manner, embodiment redox flow battery cells may be configured with different membrane separator materials along the cascade flow path. Design curve 1112 shown in FIG. 26 illustrates how membrane separator reactant selectivity may be varied along the cascade flow path.

Membrane selectivity is defined as the inverse of the reactant transport rate through the separator, and in some embodiments can be expressed in units of μg Fe/hr-cm/M or $cm^2$/second. In other words, a separator has a "higher" selectivity when it allows a smaller quantity of reactant ions to pass through the membrane. A separator membrane's selectivity typically correlates positively with the membrane's area specific resistance (e.g., measured in ohm-cm$^2$), and correlates negatively (inversely) with diffusion rate and ionic conductivity.

A number of physical characteristics of a separator membrane material are also strongly correlated with selectivity. For example, both a smaller average pore size and a higher pore tortuosity correlate with higher separator selectivities.

In the discharge mode, cells near the inlet to the cascade redox flow battery stack assembly will experience electrolyte with a high state-of-charge and a high concentration of reactants (e.g., Cr 2+ and Fe 3+). Consequently, transport of the reactants through the membrane separator will result in mixing of reactants with concomitant greater losses of stored energy than is the case in stages near the cascade outlet where the reactant concentrations are diminished. Therefore, flow batteries with engineered cascade stack assemblies achieve greater electrical charge/discharge efficiency by selecting separator membranes that limit the migration of reactants through the membrane separator to a greater degree in stages at which higher reactant concentrations are expected (e.g., near the battery inlet during a discharging operation). On the other hand, membrane separator materials that have high membrane selectivity typically also exhibit high ohmic losses (i.e., electrical resistance, which is the inverse of ionic conductivity through the membrane) that increases energy losses through the battery. Thus, it is generally desirable to use a separator membrane that has a selectivity which is high enough, but no higher than needed for a particular set of reactant concentrations. These countervailing properties result in the design curve 1112 shown in FIG. 26 used to select separator materials based upon the location of stages in the reactant flow path.

The selectivity and electrical resistance of separator membranes may be partially affected and/or described by other physical properties of separator membrane materials, such as membrane average pore size and membrane tortuosity. A membrane's average pore size is a measure of the average size (e.g., in microns) of passageways through the membrane. The average pore size of a membrane tends to be inversely correlated with the membrane's selectivity and electrical resistance. Membrane tortuosity is a measure of the complexity of flow paths through the membrane. A high degree of tortuosity represents a complex flow path with many twists and turns, and tends to be correlated with a higher degree of membrane selectivity.

Another variable affecting membrane selectivity is the membrane's thickness. A thicker membrane layer will also have a higher selectivity, and will result in lower cross-mixing of reactants. In some embodiments, two layers of a separator material may be stacked together to effectively double the selectivity of a single layer. Similarly, a single-layer separator material may be selected based in part on its thickness in order to achieve a desired selectivity.

Thus, in one embodiment, a redox flow battery stack assembly may include cells at one end of the flow path having membrane separators made from a material with high membrane selectivity at the cost of greater ohmic losses, while cells at the other end of the flow path may have membrane separators made from a material with lower selectivities and thereby lower ohmic losses. This design approach may be beneficial partly because the driving force for cross mixing is greatly diminished due to the low concentrations of spontaneously-reacting active species at the outlet end in the discharge mode and at the inlet end in the charge mode. In the case of an Fe/Cr redox flow battery (FIG. 4) the concentration of Cr 2+ and Fe 3+ species are at a minimum at the outlet end in the discharge mode and at the inlet in the charge mode.

In configuring cells based on position or expected reactant state by varying parameters discussed above, the cascade redox flow battery stack assembly may be configured so that reactants flow in one direction for charging and in the other direction for discharging. Additionally, any of the above configuration approaches may be applied to flow battery system designs including two or more separate redox flow battery stack assemblies where at least one stack assembly is configured for charging and at least one other stack assembly is configured for discharging.

A multi-stage cascade redox flow battery may be configured for charging, discharging, or both. In some embodiments, flow battery stack assemblies may be arranged in a bi-directional flow arrangement. In a bi-directional assembly, the electrolytes are directed through the redox flow battery stack assembly in one direction in the charging mode and in the opposite direction in the discharging mode. In such embodiments, one end of the flow battery flow path (or cascade series) will always be the low state-of-charge end, and the opposite end will always be the high state-of-charge end.

In other embodiments, a first stack assembly may be provided for charging and a second, separate stack assembly may be provided for discharging. In such embodiments, electrolytes only flow in one direction through a stack assembly.

In further embodiments, electrolyte reactants may be directed through a single stack assembly in a single direction for both charging and discharging. A single-direction flow battery system allows for relatively fast (e.g., millisecond range) switching between charging and discharging modes simply by electrically disconnecting the redox flow battery from the charging power source and connecting it to the load, or vice versa, such as with an electrical switch. In some embodiments, the charging power source may include the electrical grid.

In such single-direction embodiments (in either single-stack or multi-stack systems), the state-of-charge gradient across the cascade stages will reverse direction when the battery is switched from a charging to a discharging mode. During a charging operation, electrolytes entering an inlet to a single-direction stack assembly will be at a relatively low state-of-charge condition, such that the electrolytes can be converted to a higher state-of-charge condition as they pass through the flow battery stack assembly and charged. When the electrolytes exit the stack assembly during a charge operation, they will be at a higher state-of-charge condition. During a discharge operation, the opposite is true: electrolytes will be at a relatively high state-of-charge condition at the inlet to the single-direction stack assembly and at a relatively low state-of-charge condition at the outlet.

Figure 27A:
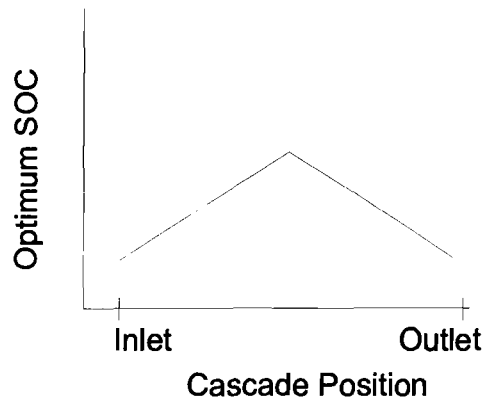
FIGS. 27A-27D illustrate graphs of optimum state-of-charge vs. cascade stage position for embodiments of engineered cascade flow battery stack assemblies.
Figure 27B:
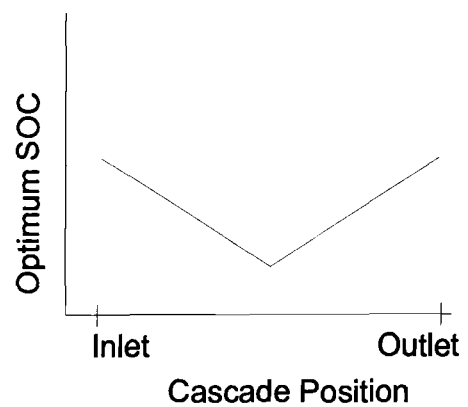

In the case of both single-directional and bi-directional flow stack assemblies, the cells of the cascade stages may be configured as a compromise between charging and discharging. For example, the stage or stages toward the center of the cascade series may be configured for a relatively higher state-of-charge condition than the stages on the outer ends of the cascade series as shown for example in FIG. 27A. Alternatively, as shown in FIG. 27B, the stage or stages toward the center of the cascade series may be configured for a relatively lower state-of-charge condition than the sages on the outer ends of the cascade series.

Figure 27C:
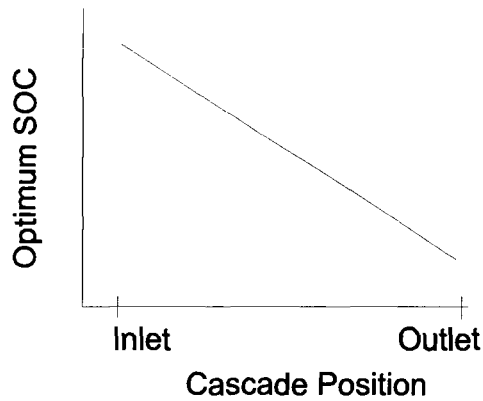
Figure 27D:
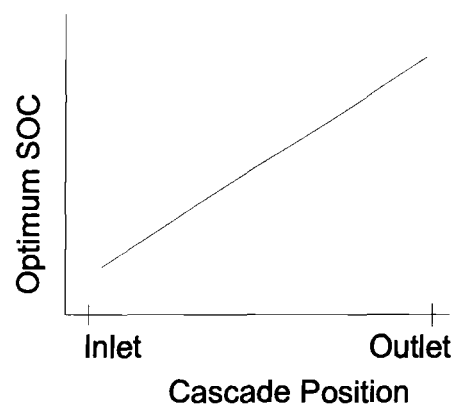

In some embodiments, as illustrated for example in FIGS. 27C and 27D, a flow battery stack assembly may be configured primarily for either a charging or a discharging operation. FIG. 27C illustrates the relationship between cascade-stage position and optimum state-of-charge for a stack assembly configured primarily for a discharge operation. In such an embodiment, the cells in stages closer to the cascade series inlet will be configured for a higher state-of-charge condition than cells in stages located at an outlet of the cascade series. A stack assembly of this type may be configured for single-directional or bi-directional flow of electrolytes.

Similarly, FIG. 27D illustrates the relationship between cascade-stage position and optimum state-of-charge for a stack assembly configured primarily for a charging operation. In this embodiment, cells in stages closer to the cascade series inlet may be configured for a relatively lower state-of-charge condition than cells at the outlet of the cascade series. A stack assembly of this type may be configured for single-directional or bi-directional flow of electrolytes.

Hydraulically, electrolyte flows in series from one cascade stage to the next. Between stages, flow batteries may be constructed to include a nearly infinite variety of flow paths, sensors, devices, etc. For example, in some embodiments, electrolyte exiting a first cell in a first stage can flow directly into a first cell of a second stage without mixing with electrolyte from any other source. Such embodiments are referred to herein as "direct cascade" systems. In other embodiments, electrolyte exiting a first cell of a first stage can be mixed with electrolyte exiting a second cell of the first stage or electrolyte from other sources before being directed into one or more cells of a second stage.

While the above description refers to a cascade flow battery stack assembly in a linear orientation, the skilled artisan will recognize that such a system may be arranged in any physical orientation while maintaining a plurality of stages in hydraulic series.

Figure 28:
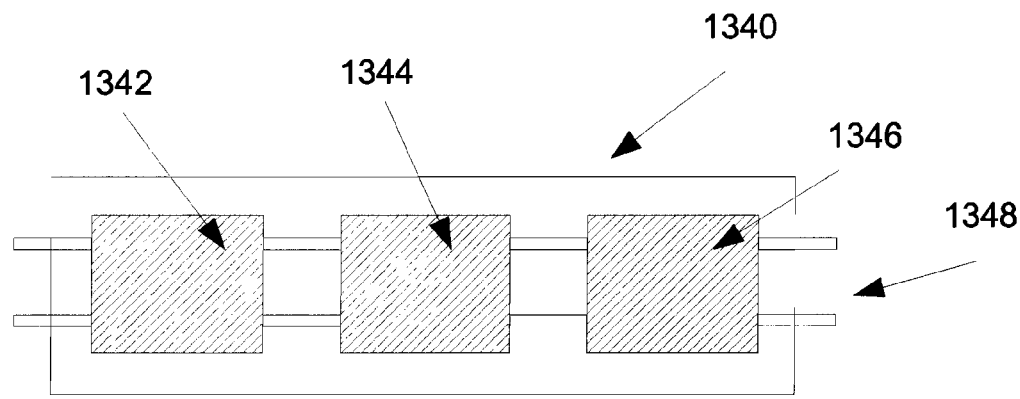
FIG. 28 illustrates an embodiment of a direct cascade flow battery stack assembly with direct hydraulic connections.

FIG. 28 illustrates an embodiment of a direct cascade flow battery cell block 1340. The illustrated embodiment includes three independent single-cell stages 1342, 1344, 1346 arranged in a single layer 1348. In this embodiment, electrolyte flows directly from the first cell 1342 to the second cell 1344 and to the third cell 1346 while remaining in the layer 1348, without mixing with electrolyte in other layers between cascade stages. Additional independent layers 1348 may be added and electrically connected to one another as needed to obtain desired power output or energy storage needs. In some embodiments, hydraulic flow channels between adjacent stages (e.g., 1342 & 1344 or 1344 & 1346) may be simple linear direct flow channels. In alternative embodiments, flow channels between adjacent stages may include complex, tortuous paths, measuring or monitoring equipment or any number of other elements. A direct cascade flow battery system such as that shown in FIG. 28 may include any number of stages in a single layer.

Figure 29:
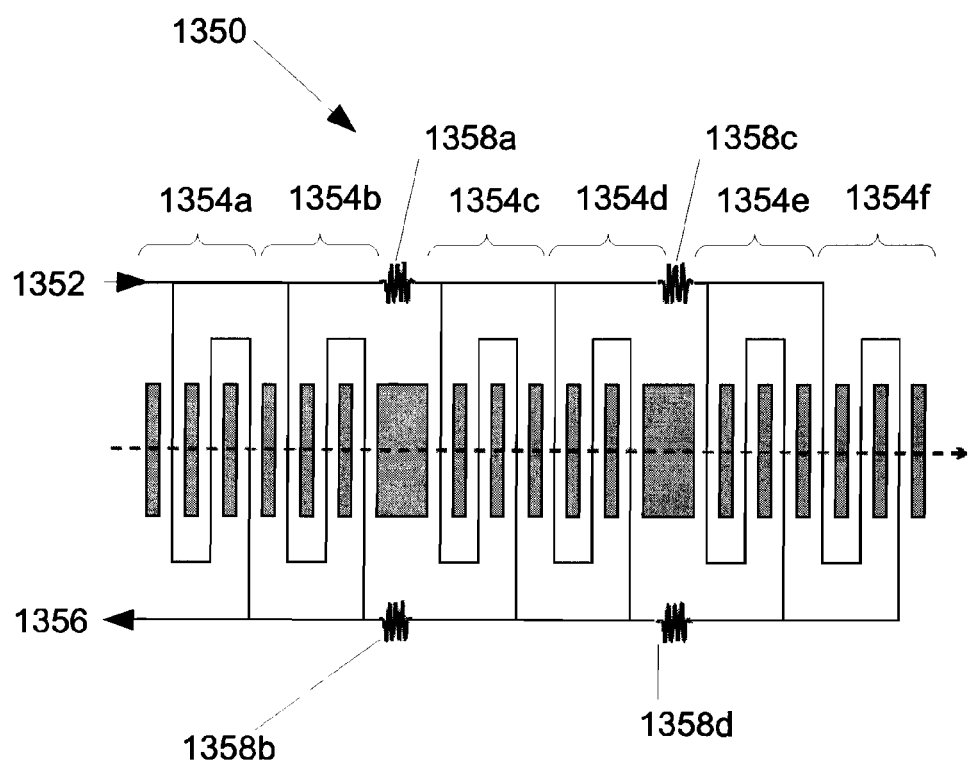
FIG. 29 is a schematic illustration of one embodiment of hydraulic connections for a single electrolyte in a three-stage cascade flow battery stack assembly.

FIG. 29 schematically illustrates an embodiment of a redox flow battery stack assembly 1350 made up of a plurality of direct cascade sections. In some embodiments, each direct cascade section may include a single cell in each stage. In some embodiments, the single-cell stages may be arranged in layers, such as illustrated in FIG. 28 or FIG. 6. In other embodiments, the direct cascade sections may be stacked vertically or otherwise.

In the embodiment illustrated in FIG. 29, electrolyte enters the stack assembly 1350 at an inlet 1352. Electrolyte is then directed through two direct cascade sections 1354*a*, 1354*b* in parallel. After exiting the first two direct cascade sections, electrolyte may be directed to an out-flow channel 1356. From the inflow channel 1352, electrolyte also flows through a first shunt breaker 1358*a* and then into a second pair of direct cascade sections 1354*c*, 1354*d*. After exiting the second pair of direct cascade sections, electrolyte may be directed through a second shunt breaker 1358*b*. In the same way, electrolyte also flows from the inlet channel 1352 through a third shunt breaker 1358*c*, through a third pair of direct cascade sections 1354*e*, 1354*f*, through a fourth shunt breaker 1358*d*, and through the exit channel 1356.

In the illustrated embodiment, shunt breakers 1358 advantageously isolate pairs of direct cascades (which may include more than three stages as needed), thereby limiting shunt currents through the stack assembly 1350. For example, in the illustrated embodiment, electrolyte may be simultaneously directed through two three-stage cascades before being directed to the outflow channel. Placing shunt breakers in both the in-flow and out-flow channels will reduce shunt currents. In alternative embodiments, each single direct cascade section may be isolated by shunt breakers. In further alternative embodiments, direct cascades may be combined into groups of three or more and isolated from other sections of the stack assembly by shunt breakers.

In some embodiments, common inlet and outlet flow channels may be sized to minimize shunt currents while allowing consistent flow rates through the direct cascade sections. The flow channels directing electrolyte through the cells of the direct cascade sections may also be configured to limit shunt currents within a direct-cascade section or blocks of direct cascades.

In some embodiments, each stage of the cascade stack may be configured according to its position along the flow path by optimizing cell characteristics for the state-of-charge of the electrolyte(s) at each stage, as discussed herein.

In some embodiments, the shunt breakers may be configured to substantially reduce or eliminate shunt currents by creating a high electrical resistance in the electrolyte flow path. Various embodiments of suitable shunt breakers are discussed below, but generally any structure capable of substantially reducing or eliminating shunt currents in an electrolyte fluid may be used as a shunt breaker. Shunt currents are a form of short-circuit caused by electrical currents flowing through the liquid electrolyte resulting in a consumption of available discharge energy or delivered charge energy. It is desirable to limit shunt currents to minimize the negative impacts on system efficiency.

Figure 30:
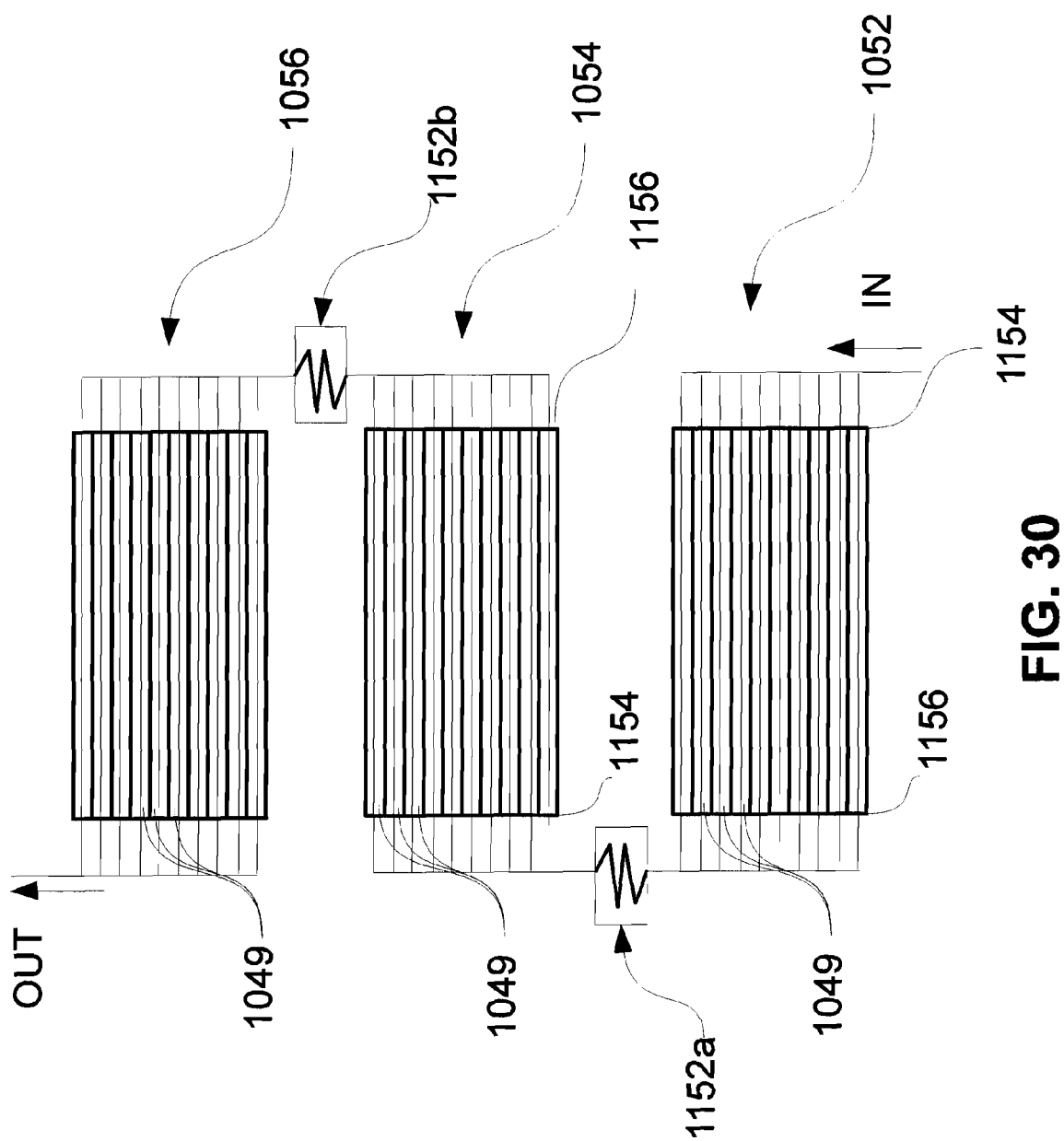
FIG. 30 is a schematic illustration of an alternative embodiment of hydraulic connections for a single electrolyte in a three-stage cascade flow battery stack assembly.

FIG. 30 schematically illustrates an embodiment of an alternate flow path arrangement for a multi-stage cascade flow battery. The flow path arrangement illustrated in FIG. 30 is referred to as a "Z-flow" arrangement. The Z-flow arrangement includes multiple cascaded stages 1052, 1054, 1056 with a plurality of cells in each stage. In the embodiment of FIG. 30, the adjacent stages 1052, 1054, 1056 may be separated by inter-stage components 1152*a*, 1152*b* which may include several functional elements such as "shunt breakers" designed to substantially reduce or entirely prevent electrical shunt currents from flowing between stages.

In the Z-flow arrangement illustrated schematically in FIG. 30, electrolyte is directed through a single stage 1052 such that flow through the cells 1049 of a single stage 1052 occurs in parallel. For example, in the illustrated embodiment, a first stage 1052 includes a plurality of cells 1049, each having an inlet 1154 on the right side and an outlet 1156 on the left side such that electrolyte flows through each of the first-stage cells in the same direction from right to left. Upon exiting the first stage 1052, electrolyte may be directed into the first inter-stage component 1152*a*. After leaving the inter-stage component 1152*a*, the electrolyte may be directed into the second stage 1054 which is illustrated with inlets 1154 on the left side of each cell and outlets 1156 on the right side. Once the electrolyte exits the second stage 1054, it may be directed into the second inter-stage component 1152*b* and then into the third stage 1056 of the cascade. In some embodiments, electrolyte may be directed into a storage tank after exiting the final stage of the cascade.

The name "Z-Flow" is derived from the illustrated schematic and is merely used for convenience to differentiate the arrangement. The name is not intended to limit the scope of the arrangement to any particular physical shape or configuration of elements. The skilled artisan will recognize that the actual spatial orientation of the cells in a Z-flow stack assembly may be arranged in any number of other ways as needed for a particular enclosure, application or other design requirements. For example, in some embodiments, the cells will be positioned in a vertical orientation with inlets at a bottom end and outlets at a top end. Such a vertical orientation has the additional advantage of allowing gas bubbles to be released near the outlet of each cell or each stage. As will also be clear to those skilled in the art, it is not necessary for adjacent stages in a Z-flow arrangement to have alternating inlets and outlets. For example, the arrangement illustrated in FIG. 30 could be modified such that electrolyte flows from left-to-right through all of the three stages by providing an additional flow channel segment in between stages to re-direct flow from the left side to the right side of the cells.

The flow battery stack assembly illustrated in FIG. 30 includes three stages with ten cells in each stage. However, any number of stages and cells per stage may be used. For example, a cascade flow battery stack assembly may be arranged with two, three, four, five, six, seven or more stages, each having any number of cells as needed to achieve a desired power output or input. In many embodiments, cascade flow batteries will have the same number of cells in each stage, but this is not a requirement as a cascade flow battery stack assembly may be designed with different numbers of cells in each stage.

In a direct cascade system, such as that shown in FIG. 28, (in which the stages are joined directly without shunt breakers or other inter-stage components), shunt losses increase in proportion to an increasing number of cells in each stage. As a practical matter, the number of cells in each stage may often be high in order to achieve high input and/or output voltages. A Z-flow arrangement may substantially improve the efficiency of a cascade redox flow battery system by substantially isolating each stage (or cell block) from shunt currents to/from other stages. The Z-flow arrangement allows easier management of a flow battery system including a substantial number of stages joined in hydraulic series.

In some embodiments, inter-stage components 1152 include one or more functional components such as shunt breakers, re-directing flow channels (e.g., to direct flow from the top of one cell block to the bottom of the next), state-of-charge sensors, electrical current sensors, electrical resistance sensors, volt meters, density sensors, spectroscopic sensors, OCV sensors, reactant balance sensors, de-gassing valves, heat exchangers, heaters, sight glasses, cooling devices, flow meters, pressure sensors, pressure relief valves, pressure mediators, pumping devices, etc.

Shunt breakers may include any components capable of substantially reducing or eliminating shunt currents in a fluid electrolyte. In some embodiments, a shunt breaker includes a long flow channel with sufficient length to create a large electrical resistance between stacks connected by the flow channel. For example, in some embodiments, shunt breakers with flow channels of more than 35 cm have been found to be suitable. Shunt breakers with flow channels of 150 cm have been found to reduce shunt currents by as much as 50% relative to arrangements with no shunt breakers in the same 3-stage, 10-cell Z-flow arrangement. In other embodiments, a shunt breaker may include a very narrow or small-diameter flow channel in addition to or in combination with a long flow channel to achieve the same objective.

Other shunt current structures suitable for mitigating or breaking shunt currents may also be used, such as structures which create a physical and/or electrical discontinuity or otherwise create a substantially high electrical resistance between an upstream and a downstream section of a flow path. One example of a structure for creating a physical discontinuity in an electrolyte flow path is described in U.S. Pat. No. 6,475,661, which describes a drip column for creating a discontinuity in a flowing electrolyte.

In some embodiments, a peristaltic pump, which advances fluid by compressing a section of flexible tubing, can be used as both a shunt breaker and as a metering pump between stages of a cascade flow battery system. In such embodiments, the electrolyte is isolated in pockets formed between pinched-together sections of the tubing, with the tubing material (typically plastic or rubber compound) providing a high resistance path between isolated pockets of electrolyte. Two examples of peristaltic pumps are illustrated and described in U.S. Pat. Nos. 4,522,571 and 4,702,679, the entire contents of both of which are hereby incorporated by reference. Many other peristaltic pumps are also known to those skilled in the art.

A variety of reactants and catalysts may be used in the redox flow battery system. One embodiment set of electrolyte reactants is based upon the iron and chromium reactions that is illustrated in FIG. 4. The reactants in the Fe/Cr redox flow battery system stores energy in $FeCl_3$ ($Fe^{3+}$) in the catholyte, which reacts at the positive electrode, and $CrCl_2$ ($Cr^{2+}$) in the anolyte, which reacts at the negative electrode within cells of the battery.

An undesirable non-faradic electron transfer reaction can occur between $Fe^{3+}$ and $Cr^{2+}$ if these ions come into proximity to one another. The non-faradic electron transfer reaction reduces the system's coulombic efficiency within a given charge-discharge cycle. Therefore, to maintain a high level of coulombic efficiency, electrolyte cross-mixing within a charged Fe/Cr redox flow battery stack assembly should be minimized. One way to minimize electrolyte cross-mixing is to use a highly selective membrane separator 12, such as Nafion®-117 ion-exchange membrane (DuPont, USA), that eliminates or severely limits transport of $Fe^{3+}$ and $Cr^{2+}$ through its cross-section. A disadvantage of highly-selective membrane separators is that they have low ionic conductivity which results in lower voltage efficiency within the redox flow battery stack assembly. Additionally, ion-exchange membranes are expensive, with a price in the neighborhood of $500/m^2$. Additionally, long-term stability and increased crossover of "other ions" (e.g., $Fe^{3+}$ and $Cr^{2+}$) can occur at elevated operating temperatures (e.g., 35° C. and higher). Since the DC energy storage efficiency of a redox flow battery is the product of coulombic and voltage efficiencies, an optimization tradeoff exists.

An embodiment of a flow battery system using the Fe/Cr system is known as a mixed reactant system where $FeCl_2$ ($Fe^{2+}$) is added to the anolyte and $CrCl_3$ ($Cr^{3+}$) is added to the catholyte, as described in U.S. Pat. No. 4,543,302, the entire contents of which are incorporated herein by reference. An advantage of the mixed reactant system is that the discharged anolyte and discharged catholyte are identical. Further, when the total concentration of Fe in the anolyte is the same as the catholyte, and the total concentration of Cr in the catholyte is the same as the anolyte, the concentration gradients across the membrane separators 12 may be eliminated. In this way the driving force for cross-mixing between anolyte and catholyte may be reduced. When the driving force for cross-mixing is reduced, less selective membrane separators may be used, thereby providing lower ionic resistance and lower system costs. Examples of less-selective membrane separators include microporous membrane separators manufactured by Celgard LLC, and membrane separators made by Daramic LLC, both of which cost in the neighborhood of $5/m$^2$ to $10/m$^2$. By optimizing the cell characteristics for the reactant state of charge at each cascade stage and completing the charge or discharge in one pass, the embodiments described herein provide suitably high efficiency in a redox flow battery stack assembly including materials that are approximately two orders of magnitude lower in cost than in conventional redox flow battery designs.

The benefits of the iron/chromium mixed reactant embodiment discussed above can also be enjoyed by applying the engineered cascade system embodiments to any other flow battery chemistry in which the chemical compositions of both electrolytes at one end of the state of charge range (e.g., discharged or charged) is exactly the same. For example, with other known flow battery chemistries it is possible to mix electrolytes in such a way that the discharged electrolytes are chemically identical, thus substantially reducing inefficiencies caused by migration of small amounts of electrolyte across the separator membrane, and allowing for the use of less-selective, lower cost separator membrane materials.

Other known flow battery chemistries include V(II)/V(III) (anolyte) and V(IV)/V(V) (catholyte), Sn (anolyte)/Fe (catholyte), Mn (anolyte)/Fe (catholyte), Ti (anolyte)/Fe (catholyte), V (anolyte)/Ce (catholyte), V (anolyte)/Br 2 (catholyte), Fe (anolyte)/Br 2 (catholyte), Cr (anolyte)/Br 2 (catholyte), and S (anolyte)/Br 2 (catholyte). An example of an alternate common discharged electrolyte system is a charged anolyte including Sn 2+ and Fe 2+ and charged catholyte including Fe 3+ and Sn 4+, in which the composition of both discharged electrolytes is Sn 4+ and Fe 2+. A second example of an alternate common discharged electrolyte system is a charged anolyte including Ti 2+ and Fe 2+ and charged catholyte including Fe 3+ and Ti 3+, in which the composition of both discharged electrolytes is Ti 3+ and Fe 2+. Another example of a common discharged electrolyte system includes a charged anolyte including V 3+ and Fe 2+, in which the composition of both discharged electrolytes is V 3+ and Fe 2+. Other common discharged electrolyte systems are also possible.

Another example of an alternate discharged electrolyte is a redox flow battery with semi-solid reactants as described in Chiang et al., U.S. Pat. No. 7,338,734, where the active material in the anolyte and catholyte in the discharged state is based on $LiMn_2O_4$ (lithium manganese spinel). In this system upon charging, Li ions will be extracted from the $LiMn_2O_4$-containing particles in contact with the positive electrode, raising the potential, and inserted into the $LiMn_2O_4$-containing particles in contact with the negative electrode, lowering the potential. The potential difference between the anolyte and catholyte will rise from 0 to approximately 1.5V. Variants of $LiMn_2O_4$ in which an element partially substitutes for the Mn may also be used.

The various system embodiments may employ a variety of electrolyte storage tank configurations, such as those described above with reference to FIG. 1, 14, 15 or 17-20, as well as other tank configurations. For example, in a simple embodiment, a single tank may be used to store each electrolyte as illustrated in FIG. 1. This two-tank configuration reduces the number of tanks and may enable rapid switching from charge to discharge modes (and vice versa). However, such embodiments can suffer from efficiency losses from mixing of charged and discharged electrolytes. Alternatively, 3-tank and 4-tank arrangements may be employed. Further alternative embodiments include tanks with separators which effectively divide a single tank into two electrolyte storage compartments are described above with reference to FIGS. 19A-19F and 20A-20F.

The voltage of a flow battery, and its concomitant power rating, may be adjusted by varying the number of cells in each stage. However, large numbers of cells in a stage can result in shunt currents through the conductive anolyte and catholyte that are parasitic to the flow battery's energy storage efficiency. Alternatively, the power rating of a flow battery may be raised without altering the voltage rating by increasing the area (e.g., $m^2$) or the current density (e.g., $mA/cm^2$) of the cells within one or more cascade stages, thereby increasing the total battery current. Thus, the number of stages, the number of cells in each stage, and the design configurations applied to each cell may be varied based upon the design goals and performance requirements of a particular flow battery system.

One beneficial characteristic of a flow battery including a cascade stack assembly is that the operating voltage is relatively flat due to the constant reactant profiles within each cascade stage during charge and discharge. Steady operating voltages may be advantageous in some embodiments as this may reduce the number of capacitors required within a flow battery's power conditioning system (PCS) that converts the direct current (DC) electricity output to alternating current (AC) electricity. Reducing the number of capacitors within a PCS reduces its cost, increases its reliability, and increases its efficiency.

Typically, for the same general operating conditions (e.g., current density, flow rate, temperature, etc.) the charge voltage from a given collection of cells is higher than the discharge voltage due to internal resistances. To achieve more similar charge and discharge voltages, the charge voltage can be reduced by lowering the reactant flow rate during charge to reduce current density. Alternatively, a larger number of series-connected cells within each stage may be used when the flow battery is in discharge mode. In a bi-direction stack assembly, this may be achieved by incorporating appropriate valve arrangements or other flow bypass mechanisms. Operating voltage may also be tuned by providing a plurality of engineered cascade stack assemblies dedicated to the discharge process in addition to one or more separate engineered cascade stack assemblies dedicated to charging. To make operating voltages more similar, the operating current density, the number of cells, or the area of each cell in the discharge stack assembly may be increased relative to the charge stack assembly.

Figure 31:
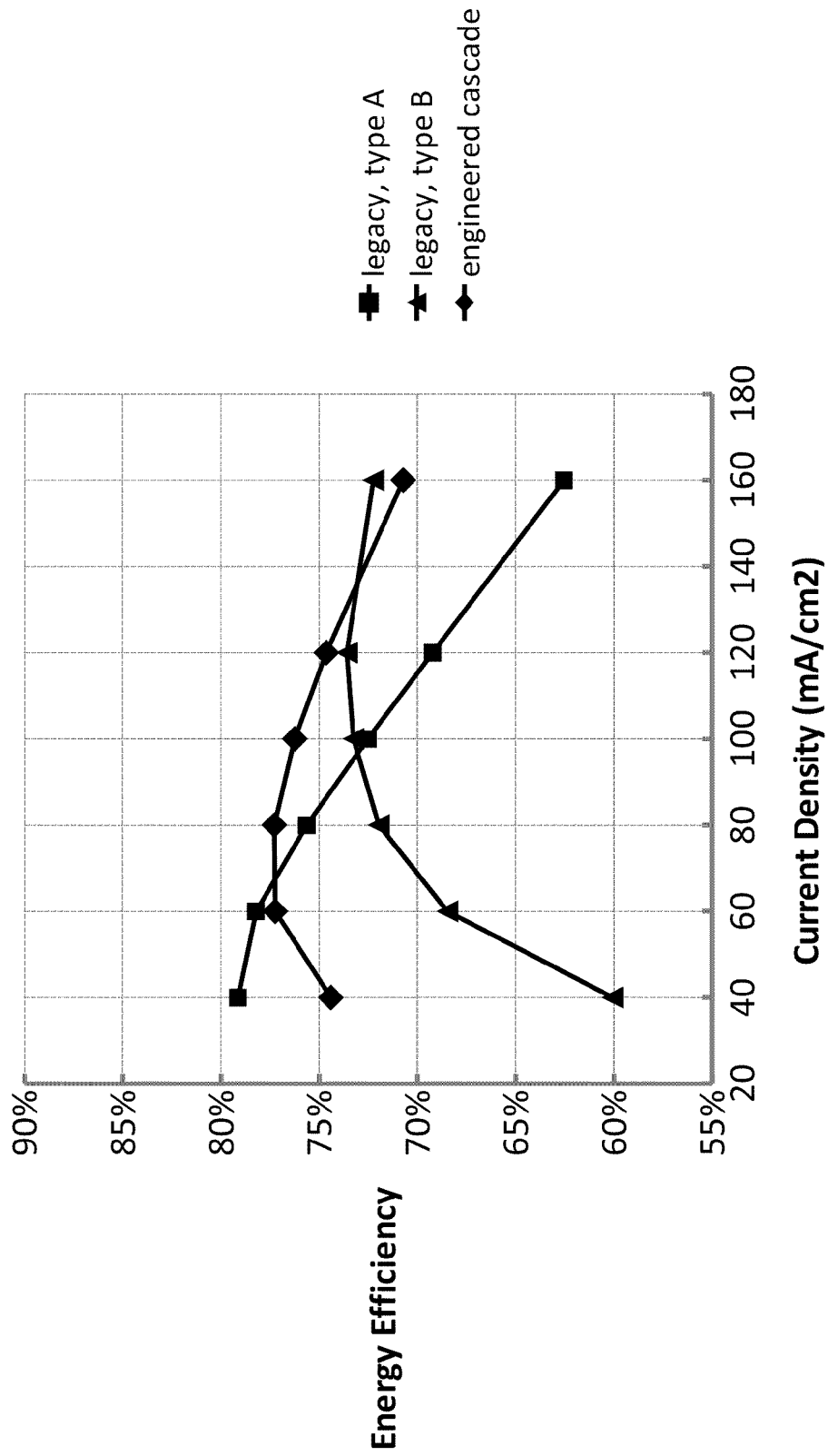
FIG. 31 is a graph of energy efficiency and current density for a plurality of redox flow battery stack assemblies.

Embodiments of flow battery systems utilizing the engineered cascade systems of the various embodiments provide several advantages over non-cascade or non-engineered cascade flow battery systems. For example, as shown in FIG. 31, a redox flow battery system with an engineered cascade stack assembly enjoys a substantially increased efficiency over a broader range of current densities as compared with "legacy" systems (i.e., non-cascade or non-engineered cascades). The Legacy Type A and Legacy Type B lines represent two different flow battery arrangements, each including a 3-stage cascade in which each of the three stages includes cells identical to the cells in other stages. As shown in FIG. 31, an engineered cascade system may be configured to operate at greater than 70% efficiency at current densities of up to 160 mA/cm2.

Embodiments of redox flow battery cells, stack assemblies and systems described herein may be used with any electrochemical reactant combinations that include reactants dissolved in an electrolyte. One example is a stack assembly containing the vanadium reactants V(II)/V(III) or V 2+/V 3+ at the negative electrode (anolyte) and V(IV)/V(V) or V 4+/V 5+ at the positive electrode (catholyte). The anolyte and catholyte reactants in such a system may be dissolved in sulfuric acid. This type of battery is often called the all-vanadium battery because both the anolyte and catholyte contain vanadium species. Other combinations of reactants in a flow battery that can utilize the features and advantages of the systems described herein include Sn (anolyte)/Fe (catholyte), Mn (anolyte)/Fe (catholyte), V (anolyte)/Ce (catholyte), V (anolyte)/Br 2 (catholyte), Fe (anolyte)/Br 2 (catholyte), Ti (anolyte)/Fe (catholyte), and S (anolyte)/Br 2 (catholyte). In each of these example chemistries, the reactants may be present as dissolved ionic species in the electrolytes, which permits the advantageous use of engineered cascade flow battery cell and stack assembly designs in which cells have different physical, chemical or electrochemical properties at different expected state of charge conditions along the cascade flow path (e.g., cell size, type of membrane or separator, type and amount of catalyst, etc.). A further example of a workable redox flow battery chemistry and system is provided in U.S. Pat. No. 6,475,661, which is incorporated herein by reference.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A redox flow battery energy storage system, comprising: a first redox flow battery cell block; and
a second redox flow battery cell block, the first redox flow battery cell block having an outlet fluidically coupled to an inlet of the second redox flow battery cell block,
wherein the first cell block has a first structural configuration based on a first state-of-charge range and the second cell block has a second structural configuration different from the first structural configuration, the second structural configuration based on a second state-of-charge range that is different from the first state of charge range.

2. A redox flow battery energy storage system, comprising: a first redox flow battery cell block configured to operate at a first state of charge range, the first redox flow battery cell block comprising: a first plurality of cells each of which has at least one of: a first structural property and a first material property, the at least one of the first structural property and the first material property based on the first state of charge range; and
a second redox flow battery cell block configured to operate at a second state of charge range different than the first state of charge range, and comprising a second plurality of cells each of which has at least one of: a second structural property and a second material property, the at least one of the second structural property and the second material property based on the second state of charge range, the at least one of: the second structural property and the second material property being different from the at least one of: the first structural property and the first material property,
wherein the first redox flow battery cell block is fluidically coupled in a cascade arrangement along a reactant flow path to the second redox flow battery cell block.

3. A redox flow battery energy storage system, comprising: a plurality of redox flow battery cell blocks fluidically coupled together in fluidic series to form a reactant flow path, an outlet of a first of the plurality of cell blocks coupled to an inlet of a second one of the plurality of cell blocks along the reactant flow path, the plurality of cell blocks operating according to the same one of: a charge mode and a discharge mode;
wherein:
each of the redox flow battery cell blocks comprises a plurality of cells, each of the cell blocks has a physical configuration according to a state of charge of reactant in the respective cell blocks;
the first one of the plurality cell blocks has a first physical configuration according to a first state of charge range;
the second one of the plurality of cell blocks has a second physical configuration according to a second state of charge range;
the first state of charge range and the second state of charge range are different; and
the first physical configuration of the first one of the plurality of cell blocks and the second physical configuration of the second one of the plurality of cell blocks are different.

4. The redox flow battery energy storage system of claim 3, wherein the plurality of redox flow battery cell blocks are fluidically coupled together so that reactant flows through each of the plurality of redox flow battery cell blocks one at a time.

5. The redox flow battery energy storage system of claim 4, wherein:
the plurality of redox flow battery cell blocks are fluidically coupled together so that reactant separates to flow in parallel through the plurality of cells in each redox flow battery cell block and remixes between each of the plurality of redox flow battery cell blocks.

6. The redox flow battery energy storage system of claim 5, wherein each of the plurality of redox flow battery cell blocks further comprises a plurality of shunt breakers arranged between at least some of the plurality of cells in each redox flow battery cell block.

7. The redox flow battery energy storage system of claim 5, further comprising a plurality of inter-stage components fluidically coupled between each of the plurality of redox flow battery cell blocks.

8. The redox flow battery energy storage system of claim 7, wherein the plurality of inter-stage components comprises a plurality of shunt breakers configured to reduce shunt currents flowing in the plurality of redox flow battery cell blocks.

9. The redox flow battery energy storage system of claim 8, wherein the plurality of shunt breakers comprise a peristaltic pump.

10. The redox flow battery energy storage system of claim 7, wherein the plurality of inter-stage components comprises a plurality of sensors.

11. The redox flow battery energy storage system of claim 10, wherein the plurality of sensors includes sensors selected from the group comprising state-of-charge sensors, electrical current sensors, electrical resistance sensors, volt meters, density sensors, spectroscopic sensors, OCV sensors, reactant balance sensors, flow meters, and pressure sensors.

12. The redox flow battery energy storage system of claim 7, wherein the plurality of inter-stage components comprises a plurality of valves.

13. An electrical power system, comprising:
- a source of electrical power; and
- a redox flow battery system configured to receive electrical power from the source of electrical power and provide electrical power to an electrical load, the redox flow battery system comprising:
- a plurality of redox flow battery cell blocks fluidically coupled together in fluidic series to form a reactant flow path, an outlet of a first of the plurality of cell blocks coupled to an inlet of a second one of the plurality of cell blocks along the reactant flow path, the plurality of cell blocks operating according to the same one of: a charge mode and a discharge mode;
- wherein:
  - each of the redox flow battery cell blocks comprises a plurality of cells, each of the cell blocks has a physical configuration according to a state of charge of reactant in the respective cells blocks;
  - the first one of the plurality cell blocks has a first physical configuration according to a first state of charge range;
  - the second one of the plurality of cell blocks has a second physical configuration according to a second state of charge range;
  - the first state of charge range and the second state of charge range are different; and
  - the first physical configuration of the first one of the plurality of cell blocks and the second physical configuration of the second one of the plurality of cell blocks are different.

14. The electrical power system of claim 13, wherein the plurality of redox flow battery cell blocks are fluidically coupled together so that reactant flows through each of the plurality of redox flow battery cell blocks one at a time.

15. The electrical power system of claim 14, wherein:
the plurality of redox flow battery cell blocks are fluidically coupled together so that reactant separates to flow in parallel through the plurality of cells in each redox flow battery cell block and remixes between each of the plurality of redox flow battery cell blocks.

16. The electrical power system of claim 15, wherein each of the plurality of redox flow battery cell blocks further comprises a plurality of shunt breakers arranged between at least some of the plurality of cells in each redox flow battery cell block.

17. The electrical power system of claim 15, further comprising a plurality of inter-stage components fluidically coupled between each of the plurality of redox flow battery cell blocks.

18. The electrical power system of claim 17, wherein the plurality of inter-stage components comprises a plurality of shunt breakers configured to reduce shunt currents flowing in the plurality of redox flow battery cell blocks.

19. The electrical power storage system of claim 18, wherein the plurality of shunt breakers comprise a peristaltic pump.

20. The electrical power system of claim 17, wherein the plurality of inter-stage components comprises a plurality of sensors.

21. The electrical power system of claim 20, wherein the plurality of sensors includes sensors selected from the group comprising state-of-charge sensors, electrical current sensors, electrical resistance sensors, volt meters, density sensors, spectroscopic sensors, OCV sensors, reactant balance sensors, flow meters, and pressure sensors.

22. The electrical power system of claim 17, wherein the plurality of inter-stage components comprises a plurality of valves.

* * * * *